(12) United States Patent
Suwa et al.

(10) Patent No.: US 9,726,944 B2
(45) Date of Patent: *Aug. 8, 2017

(54) LIQUID CRYSTAL DISPLAY DEVICE

(71) Applicant: Sony Corporation, Tokyo (JP)

(72) Inventors: Shunichi Suwa, Kanagawa (JP);
Masashi Miyakawa, Kanagawa (JP);
Chikashi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,461

(22) Filed: Oct. 18, 2016

(65) Prior Publication Data

US 2017/0038645 A1 Feb. 9, 2017

Related U.S. Application Data

(63) Continuation of application No. 14/395,924, filed as application No. PCT/JP2013/002498 on Apr. 11, 2013, now Pat. No. 9,488,878.

(30) Foreign Application Priority Data

Apr. 27, 2012 (JP) ................................. 2012-102884

(51) Int. Cl.
*G02F 1/1337* (2006.01)
*G02F 1/1343* (2006.01)
(Continued)

(52) U.S. Cl.
CPC ...... *G02F 1/134309* (2013.01); *G02F 1/1337* (2013.01); *G02F 1/1339* (2013.01); *G02F 1/13439* (2013.01); *G02F 1/133514* (2013.01); *G02F 1/133707* (2013.01); *G02F 1/133788* (2013.01); *G02F 2001/133749* (2013.01); *G02F 2001/133776* (2013.01)

(58) Field of Classification Search
CPC ......... G02F 1/134309; G02F 1/133514; G02F 1/1337
USPC ........................................................ 349/129
See application file for complete search history.

(56) References Cited

U.S. PATENT DOCUMENTS 5,710,837 A 1/1998 Matsumoto et al.
5,838,407 A 11/1998 Chigrinov et al.
(Continued)

FOREIGN PATENT DOCUMENTS

JP H05-232473 9/1993
JP 2002-357830 A 12/2002
JP 2011-232736 A 11/2011

OTHER PUBLICATIONS

International Search Report issued in connection with International Patent Application No. PCT/JP2013/002498, dated Feb. 13, 2013 (7 pages).

*Primary Examiner* — Lucy Chien
(74) *Attorney, Agent, or Firm* — K&L Gates LLP

(57) ABSTRACT

A liquid crystal display device is provided. The liquid crystal display device including a first substrate; a second substrate; a first electrode provided on a first surface of the first substrate, the first surface facing the second substrate, the first electrode including a plurality of convex and concave portions; a second electrode provided on a second surface of the second substrate; and a liquid crystal layer provided between the first substrate and the second substrate.

9 Claims, 30 Drawing Sheets

(51) Int. Cl.
    *G02F 1/1335*     (2006.01)
    *G02F 1/1339*     (2006.01)

(56) References Cited

U.S. PATENT DOCUMENTS

| | | |
|---|---|---|
| 2002/0089615 A1 | 7/2002 | Sakamoto et al. |
| 2003/0048401 A1 | 3/2003 | Hanaoka et al. |
| 2004/0179157 A1* | 9/2004 | Kim .................. G02F 1/1333 349/114 |
| 2005/0001962 A1 | 1/2005 | Maeda |
| 2005/0128396 A1 | 6/2005 | Tsuchiya et al. |
| 2008/0074599 A1 | 3/2008 | Yamaguchi et al. |
| 2009/0244425 A1* | 10/2009 | Jung ................ G02F 1/133753 349/48 |
| 2011/0134382 A1 | 6/2011 | Miyakawa et al. |
| 2011/0317104 A1 | 12/2011 | Nakamura et al. |

* cited by examiner

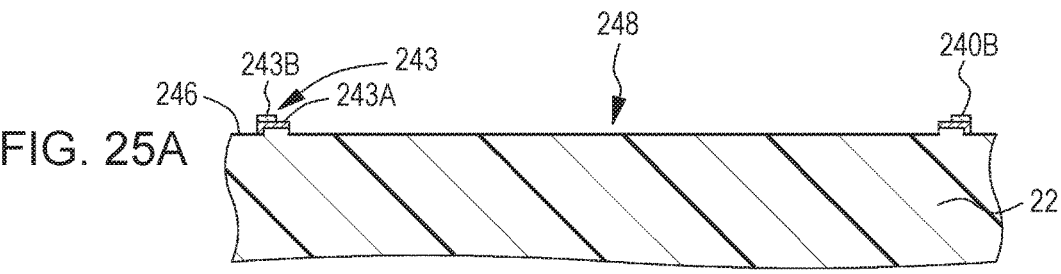
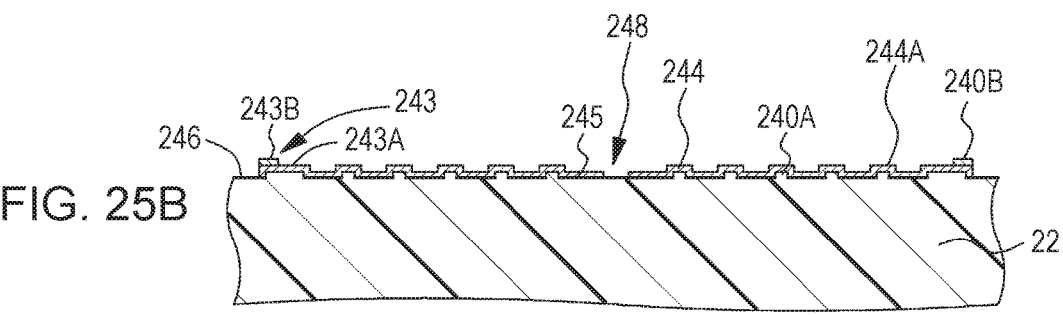
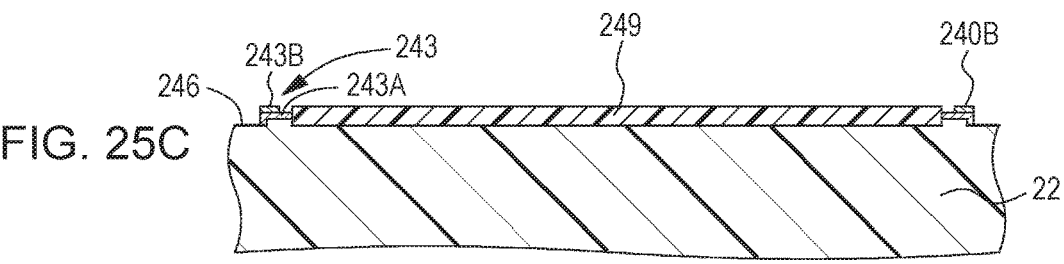
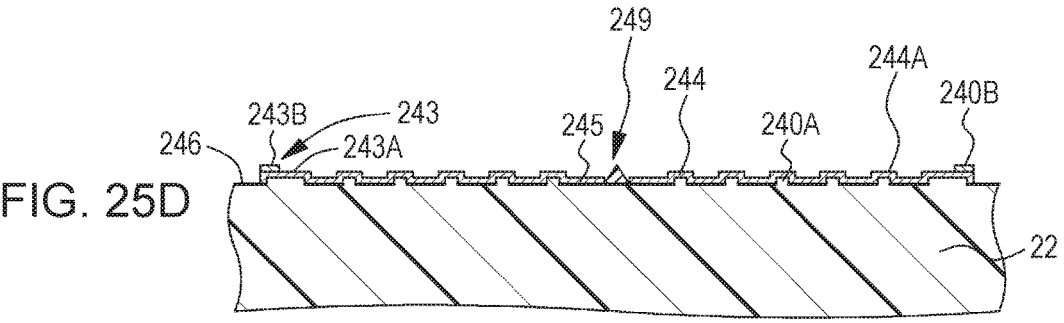

X-DIRECTION (μm)
[PORALYZER 0.0 deg, ANALYZER 90.0 deg]

X-DIRECTION (μm)
[PORALYZER 0.0 deg, ANALYZER 90.0 deg]

X-DIRECTION (μm)
[PORALYZER 0.0 deg, ANALYZER 90.0 deg]

LIQUID CRYSTAL DISPLAY DEVICE

CROSS-REFERENCE TO RELATED APPLICATIONS

The present application is a continuation of U.S. application Ser. No. 14/395,924 filed Oct. 21, 2014, which is a national stage of International Application No. PCT/JP2013/002498 filed Apr. 11, 2013, which claims priority to Japanese Application No. 2012-102884 filed Apr. 27, 2012, the disclosures of which are incorporated herein by reference.

BACKGROUND

The present disclosure relates to a liquid crystal display device provided with a liquid crystal display element in which a liquid crystal layer is sealed between a pair of substrates, each of which has an oriented film on a facing surface.

In recent years, liquid crystal displays (LCDs) have been widely used as display monitors of a liquid crystal television receiver, a note-type personal computer, a car navigation apparatus, and the like. Such liquid crystal displays are classified into various display modes (schemes) depending on molecular alignment (orientation) of liquid crystal molecules included in the liquid crystal layer interposed between substrates. As a display mode, a TN (Twisted Nematic) mode in which the liquid crystal molecules are oriented in a twisted manner in a state in which no voltage is applied has been well known, for example. In the TN mode, the liquid crystal molecules have positive dielectric constant anisotropy, namely, a characteristic that a dielectric constant of the liquid crystal molecules in a long axial direction is greater than that in a short axial direction. For this reason, the liquid crystal molecules have a structure in which the liquid crystal molecules are aligned in a perpendicular direction to a substrate surface while an orientation direction of the liquid crystal molecules is subsequently rotated in a plane which is parallel to the substrate surface.

On the other hand, a VA (Vertical Alignment) mode in which the liquid crystal molecules are oriented so as to be perpendicular to the substrate surface in a state in which no voltage is applied has drawn more attention. In the VA mode, the liquid crystal molecules have negative dielectric constant anisotropy, namely, a characteristic that a dielectric constant of the liquid crystal molecules in the long axial direction is smaller than that in the short axial direction, and it is possible to realize a wider viewing angle than that in the TN mode.

A liquid crystal display in the VA mode as described above has a configuration in which light is transmitted by causing the liquid crystal molecules oriented in the perpendicular direction to the substrate to respond to voltage application so as to lie down in a parallel direction to the substrate due to a negative dielectric constant anisotropy. However, since the direction in which the liquid crystal molecules oriented in the perpendicular direction to the substrate lie down is arbitrary, the orientation of the liquid crystal molecules becomes disorganized due to voltage application, which causes deterioration of a responsive characteristic to voltage.

Thus various methods for regulating the orientation of the liquid crystal molecules during voltage application have been proposed hitherto. For example, an MVA (Multi-domain Vertical Alignment) scheme, a PVA (Patterned Vertical Alignment) scheme, or a method using a photo-alignment film (see PTL 1, for example) have been proposed. According to the PVA scheme, a wide viewing angle is realized while the orientation is controlled by using a slit or a rib (protrusion). In addition to this, a structure (also referred to as a fine slit structure) in which a plurality of minute slits are provided in an electrode (specifically, a pixel electrode) formed in one substrate and an electrode formed (specifically, a facing electrode) in the other substrate is formed as a so-called solid electrode with no slit has been recently proposed (see PTL 2, for example). However, the fine slit structure has a problem that transmittance is lowered since a part to which an electric field is not applied is present in a slit including a minute line and a space and further the orientation state of the liquid crystal molecules takes a twisted structure in the vicinity of an edge of the line during voltage application.

A technique to solve such a problem, namely a technique of forming concave and convex portions instead of the plurality of minute slits has been disclosed in PTL 3.

CITATION LIST

Patent Literature

[PTL 1] Japanese Unexamined Patent Application Publication No. 5-232473

[PTL 2] Japanese Unexamined Patent Application Publication No. 2002-357830

[PTL 3] Japanese Unexamined Patent Application Publication No. 2011-232736

SUMMARY

Technical Problem

Although it is possible to effectively suppress occurrence of the aforementioned problem in the fine slit structure by the technique disclosed in PTL 3, there is a requirement that the occurrence of a dark line is further suppressed, namely a strong requirement to realize further uniform high transmittance. In addition, there is also a strong requirement for a more satisfactory voltage responsive property.

Accordingly, it is desired to provide a liquid crystal display device capable of achieving a more satisfactory voltage responsive property and realizing further uniform high transmittance.

Solution to Problem

There is provided a liquid crystal display device according to Modes 1 to 4 of the present disclosure including: a plurality of aligned pixels, each of which includes a first substrate and a second substrate, a first electrode which is formed on a facing surface of the first substrate facing the second substrate, a first oriented film which covers the first electrode and the facing surface of the first substrate, a second electrode which is formed on a facing surface of the second substrate facing the first substrate, a second oriented film which covers the second electrode and the facing surface of the second substrate, and a liquid crystal layer which is provided between the first oriented film and the second oriented film and includes liquid crystal molecules, wherein a pre-tilt is applied to the liquid crystal molecules by at least the first oriented film.

In the liquid crystal display device according to Mode 1 of the present disclosure, a plurality of concave and convex portions are formed on a flattened layer on which the first electrode is formed, and a plurality of stepped portions are formed at the convex portions included on the first electrode.

In the liquid crystal display device according to Mode 2 of the present disclosure, a plurality of concave and convex portions are formed on a flattened layer on which the first electrode is formed, a convex structure is formed from a part of the first substrate positioned between pixels to a part of the first substrate corresponding to a pixel circumferential portion, and a circumferential portion of the concave and convex portions are formed on the convex structure.

In the liquid crystal display device according to Mode 3 of the present disclosure, a plurality of concave and convex portions are formed on a flattened layer on which the first electrode is formed, the concave and convex portions are configured by convex stem portions which pass through a pixel center portion and extend in a cross shape and a plurality of branched convex portions which extend from the convex stem portions toward a pixel circumferential portion, and an orientation regulating portion is formed at a part of the second electrode corresponding to the convex stem portions.

In the liquid crystal display device according to Mode 4 of the present disclosure, a plurality of concave and convex portions are formed on a flattened layer on which the first electrode is formed, the concave and convex portions are configured by a convex stem portion which is formed in a frame shape at a pixel circumferential portion and a plurality of branched convex portions which extend from the convex stem portion toward the inside of the pixel, and a slit portion or a protruding portion which passes through a pixel center portion and is in parallel with the pixel circumferential portion is formed on the first electrode.

According to one embodiment, the present disclosure provides a liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate. At least one of the convex portions includes a plurality of stepped portions.

According to an embodiment, the present disclosure provides a liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate. A convex structure is formed from a part of the first substrate positioned between pixels to a part of the first substrate corresponding to a pixel circumferential portion, and a circumferential portion of the concave and convex portions is formed on the convex structure.

According to an embodiment, the present disclosure provides a liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate. The convex and concave portions are configured by convex stem portions that pass through a pixel center portion and extend in a cross shape and a plurality of branched convex portions that extend from the convex stem portions toward a pixel circumferential portion. An orientation regulating portion is formed at a part of the second electrode corresponding to the convex stem portions.

According to an embodiment, the present disclosure provides a liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate. The convex and concave portions are configured by a convex stem portion that is formed in a frame shape at a pixel circumferential portion and a plurality of branched convex portions that extend from the convex stem portion toward the inside of a pixel. At least one of a slit portion and a protruding portion is formed on the first electrode, and the at least one of a slit portion and a protruding portion passes through a pixel center portion and is in parallel with the pixel circumferential portion.

According to an embodiment, the present disclosure provides a method of manufacturing a liquid crystal display device comprising: forming a first oriented film on a first electrode, the first electrode formed on a first surface of a first substrate; forming a second oriented film on a second electrode, the second electrode formed on a second surface of a second substrate, the second oriented film facing the first oriented film; sealing a liquid crystal layer between the first and second oriented films; applying a voltage between the first and second electrodes; and irradiating the first and second oriented films with an ultraviolet ray while applying the voltage.

Advantageous Effects of Present Disclosure

Since a plurality of stepped portions (height differences) are formed in the convex stem portions in the liquid crystal display device according to Mode 1 of the present disclosure, the strength of an electric field varies in the convex stem portions, or a horizontal electric field is generated. As a result, it is possible to enhance the orientation regulating force for the liquid crystal molecules in the convex stem portions and reliably define a tilt state of the liquid crystal molecules in the convex stem portions. For this reason, it is possible to reliably suppress an occurrence of a problem that a dark line is generated at a part of an image corresponding to the convex stem portions during display of the image. That is, it is possible to provide a liquid crystal display device capable of realizing further uniform high transmittance while maintaining a satisfactory voltage responsive characteristic, reduce the cost of a light source configuring a back light and power consumption, and also enhance reliability of the TFT.

In addition, since the circumferential portion of the concave and convex portions are formed on the convex structure in the liquid crystal display device according to Mode 2 of the present disclosure, a stronger electric field is generated in the circumference of the concave and convex portions as compared with a case in which the circumferential portion of the concave and convex portions are flat. As a result, it is possible to enhance the orientation regulating force for the liquid crystal molecules in the circumferential portion of the concave and convex portions and reliably define a tilt state of the liquid crystal molecules in the circumferential portion of the concave and convex portions. For this reason, it is possible to maintain a satisfactory voltage responsive characteristic.

Moreover, since the orientation regulating portion is formed at a part of the second electrode corresponding to the convex stem portions in the liquid crystal display device according to Mode 3 of the present disclosure, an electric field generated by the second electrode is deformed in the vicinity of the orientation regulating portion, or otherwise, directions in which the liquid crystal molecules lie down in the vicinity of the orientation regulating portion are defined. As a result, it is possible to enhance the orientation regulating force for the liquid crystal molecules in the vicinity of the orientation regulating portion and reliably define a tilt state of the liquid crystal molecules in the vicinity of the orientation regulating portion. For this reason, it is possible to reliably suppress occurrence of a problem that a dark line is generated at a part of an image corresponding to the convex stem portions during display of the image. That is, it is possible to provide a liquid crystal display device capable of realizing further uniform high transmittance while maintaining a satisfactory voltage responsive characteristic, reduce the cost of a light source configuring a back light and power consumption, and also enhance reliability of the TFT.

Since the slit portion or the protruding portion which passes through the pixel center portion and is in parallel with the pixel circumferential portion is formed on the first electrode in the liquid crystal display device according to Mode 4 of the present disclosure, an electric field generated by the first electrode is deformed, or directions in which the liquid crystal molecules lie down in the vicinity of the projecting portion and the orientation regulating portion are defined as compared with a case in which a flat concave portion with no slit portion and protruding portion is formed on the first electrode. As a result, it is possible to enhance the orientation regulating force for the liquid crystal molecules in the vicinity of the slot portion or the protruding portion and reliably define a tilt state of the liquid crystal molecules in the vicinity of the slit portion or the protruding portion. For this reason, it is possible to reliably suppress a problem that a dark line is generated at a part of an image corresponding to the convex stem portion during display of the image. That is, it is possible to provide a liquid crystal display device capable of realizing further uniform high transmittance while maintaining a satisfactory voltage responsive characteristic, reduce the cost of a light source configuring a back light and a power consumption, and also enhance reliability of the TFT.

Additional features and advantages are described herein, and will be apparent from the following Detailed Description and the figures.

BRIEF DESCRIPTION OF THE FIGURES

FIG. 25A is a partial end surface view schematically showing the first electrode and the like taken along the arrow IIXVA-XXVA in FIG. 21 in the liquid crystal display device according to Example 9.

FIG. 25B is a partial end surface view schematically showing the first electrode and the like taken along the arrow IIXVB-IIXVB in FIG. 21 in the liquid crystal display device according to Example 9.

FIG. 25C is a partial end surface view schematically showing the first electrode and the like taken along the arrow IIXVC-IIXVC in FIG. 23 in the liquid crystal display device according to Example 9.

FIG. 25D is a partial end surface view schematically showing the first electrode and the like taken along the arrow IIXVD-IIXVD in FIG. 23 in the liquid crystal display device according to Example 9.

DETAILED DESCRIPTION

Figure 1:
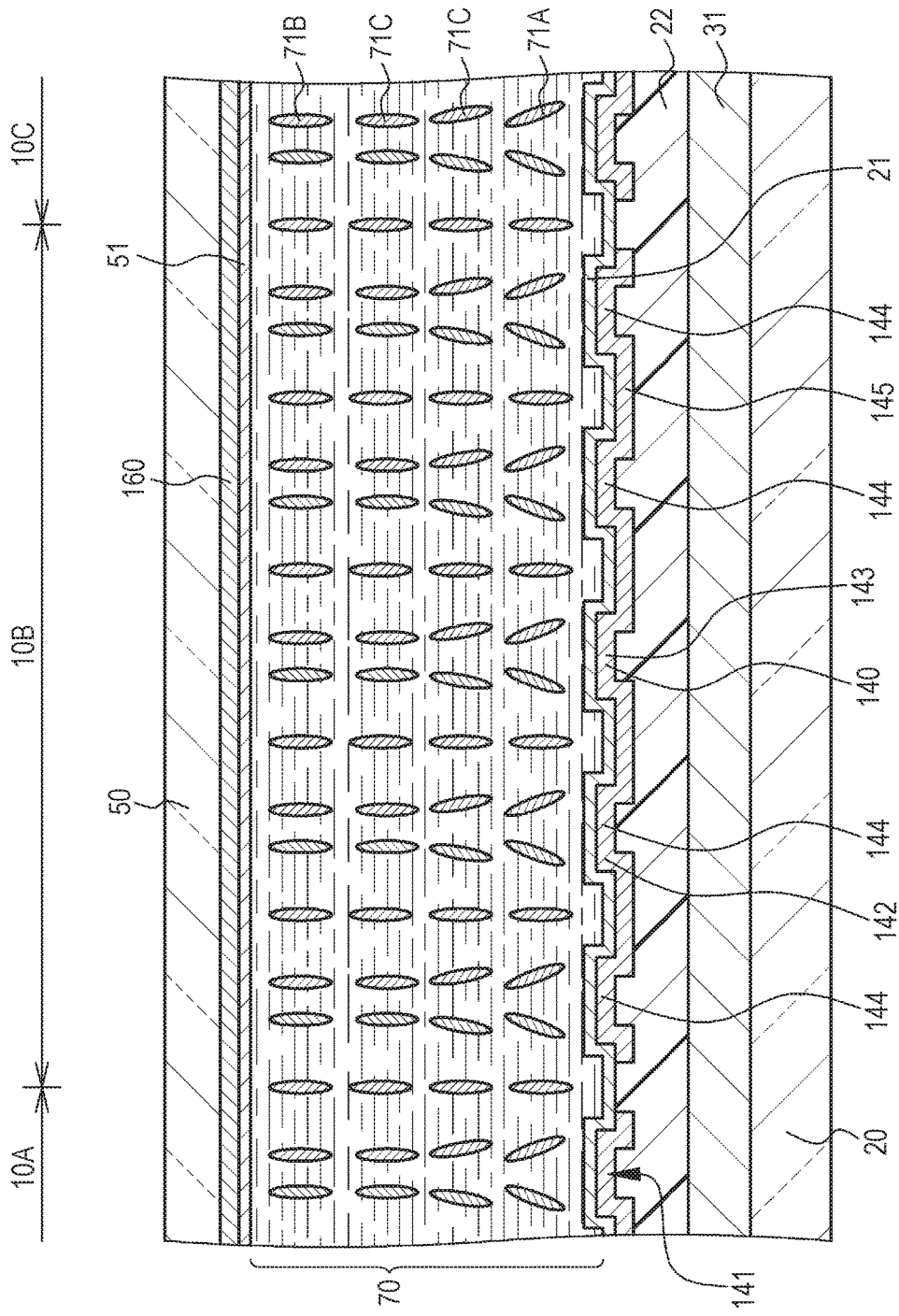
FIG. 1 is a partial end surface view schematically showing a liquid crystal display device according to Example 1.

Although a description will be given of a present disclosure based on examples with reference to the drawings, the present disclosure is not limited to the examples, and various numerical values and materials in the examples are described only for an illustrative purpose. In addition, a description will be given in the following order.

1. Overall Description Relating to Liquid Crystal Display Device According to the First to Fourth Modes of the Present Disclosure 2. Example 1 (Liquid Crystal Display Device According to Mode 1-A of the Present Disclosure)

3. Example 2 (Modification of Example 1)

4. Example 3 (Another Modification of Example 1)

5. Example 4 (Liquid Crystal Display Device According to Mode 1-B of the Present Disclosure)

6. Example 5 (Modification of Example 4)

7. Example 6 (Another Modification of Example 4)

8. Example 7 (Liquid Crystal Display Device According to Mode 2 of the Present Disclosure Including Examples 1 to 6)

9. Example 8 (Liquid Crystal Display Device According to Mode 3 of the Present Disclosure Including Liquid Crystal Display Devices According to Mode 1-A and Mode 2-A of the Present Disclosure)

10. Example 9 (Liquid Crystal Display Device According to Mode 4 of the Present Disclosure Including Liquid Crystal Display Devices According to Mode 1-B and 2-B of the Present Disclosure) and Other Examples 1. Overall Description Relating to Liquid Crystal Display Device According to First to Fourth Modes of the Present Disclosure In a liquid crystal display device according to Mode 1 of the present disclosure, it is possible to employ a configuration in which concave and convex portions includes convex stem portions which pass through a pixel center portion and extend in a cross shape and a plurality of branched convex portions which extend from the convex stem portion to a pixel circumferential portion. In addition, such a mode will be referred to as a "liquid crystal display device according to Mode 1-A of the present disclosure" for convenience. Here, when an (X, Y) coordinate system in which the convex stem portions extending in the cross shape respectively correspond to an X axis and a Y axis is assumed in the liquid crystal display device according to Mode 1-A of the present disclosure, it is possible to employ a configuration in which the plurality of branched convex portions occupying a first quadrant extend in parallel with a direction in which a value of a Y coordinate increases when a value of an X coordinate increases, the plurality of branched convex portions occupying a second quadrant extend in parallel with a direction in which a value of a Y coordinate increases when a value of an X coordinate decreases, the plurality of branched convex portions occupying a third quadrant extend in parallel with a direction in which a value of a Y coordinate decreases when a value of an X coordinate decreases, and the plurality of branched convex portions occupying a fourth quadrant extend in parallel with a direction in which a value of a Y coordinate decreases when a value of an X coordinate increases.

In relation to a cross-sectional shape of the convex stem portion when the convex stem portion is cut by a virtual vertical plane which is perpendicular to an extending direction of the convex stem portion in the liquid crystal device according to Mode 1-A of the present disclosure including the above preferred form, it is possible to employ a configuration in which the convex stem portion has a cross-sectional shape in which a stepped portion declines from a center of the cross-sectional shape of the convex stem portion toward an edge of the cross-sectional shape of the convex stem portion. In relation to a cross-sectional shape of the convex stem portion when the convex stem portion is cut by a virtual vertical plane which is parallel with the extending direction of the convex stem portion in the liquid crystal display device according to Mode 1-A of the present disclosure including the aforementioned various preferred configurations, it is possible to employ a configuration with a cross-sectional shape in which a stepped portion declines from the center portion of the cross-sectional shape of the convex stem portion toward the end of the cross-sectional shape of the convex stem portion.

Moreover, in relation to a cross-sectional shape of the branched convex portion when the branched convex portion is cut by a virtual vertical plane which is orthogonal to an extending direction of the branched convex portion in the liquid crystal display device according to Mode 1-A of the present disclosure including the aforementioned various preferred configurations, it is possible to employ a configuration with a cross-sectional shape in which a stepped portion declines from a center of the cross-sectional shape of the branched convex portion toward an edge of the cross-sectional shape of the branched convex portion. In addition, a cross-sectional shape of the branched concave portion when the branched convex portion is cut by a virtual vertical plane which is parallel with the extending direction of the branched convex portion in the liquid crystal display device according to Mode 1-A of the present disclosure including the aforementioned various preferred configurations, it is possible to employ a configuration with a cross-sectional shape in which a stepped portion declines from the cross-sectional shape of the branched convex portion on a side of the convex stem portion toward an end of the cross-sectional shape of the branched convex portion.

Furthermore, it is possible to employ a configuration in which an orientation regulating portion is formed at a part of a second electrode corresponding to the convex stem portions in the liquid crystal display device according to Mode 1-A of the present disclosure including the aforementioned various preferred configurations. In relation to the orientation regulating portion on this occasion, a configuration including a slit portion provided at the second electrode, a configuration including a protruding portion provided at the second electrode, or a configuration including a part of the second electrode with a protruding shape can be employed. The protruding portion is formed of a resist material, for example, and the second electrode is not formed thereon. In order to provide the part of the second electrode with a protruding shape, a convex portion may be formed below the second electrode, or the part of the second electrode with a protruding shape can be provided by the same method as a method of forming a concave portion in the concave and convex portions at the first electrode. It is desired that a width of the slit portion, the protruding portion, or the part of the second electrode with the protruding shape be narrower than a width of the convex stem portion. The same can be applied to a liquid crystal display device according to Mode 2-A of the present disclosure and a liquid crystal display device according to Mode 3 of the present disclosure, which will be described later.

Alternatively, it is possible to employ a configuration in which the concave and convex portions in the liquid crystal display device according to Mode 1 of the present disclosure are configured by a convex stem portion which is formed in a frame shape at the pixel circumferential portion and a plurality of branched convex portions which extend from the convex stem portion toward the inside of the pixel. In addition, the configuration will be referred to as a "liquid crystal display device according to Mode 1-B of the present disclosure" for convenience. Here, when an (X, Y) coordinate system in which straight lines which pass the pixel center portion and are parallel with the pixel circumferential portion respectively correspond to an X axis and a Y axis is assumed, in the liquid crystal display device according to Mode 1-B of the present disclosure, it is possible to employ a configuration in which the plurality of branched convex portions occupying a first quadrant extend in parallel with a direction in which a value of a Y coordinate increases when a value of an X coordinate increases, the plurality of branched convex portions occupying a second quadrant extend in parallel with a direction in which a value of a Y coordinate increases when a value of an X coordinate decreases, the plurality of branched convex portions occupying a third quadrant extend in parallel with a direction in which a value of a Y coordinate decreases when a value of an X coordinate decreases, and the plurality of branched convex portions occupying a fourth quadrant extend in parallel with a direction in which a value of a Y coordinate decreases when a value of an X coordinate increases.

In relation to a cross-sectional shape of the convex stem portion when the convex stem portion is cut by a virtual vertical plane which is orthogonal to an extending direction of the convex stem portion in the liquid crystal display device according to Mode 1-B of the present disclosure including the above preferred form, it is possible to employ a configuration with a cross-sectional shape in which a stepped portion declines from an external edge of the cross-sectional shape of the convex stem portion toward an inner edge of the cross-sectional shape of the convex stem portion.

Furthermore, in relation to a cross-sectional shape of the branched convex portion when the branched convex portion is cut by a virtual vertical plane which is orthogonal to an extending direction of the branched convex portion in the liquid crystal display device according to Mode 1-B of the present disclosure including the aforementioned various preferred configurations, it is possible to employ a configuration with a cross-sectional shape in which a stepped portion declines from the center of the cross-sectional shape of the branched convex portion toward an edge of the cross-sectional shape of the branched convex portion. In relation to a cross-sectional shape of the branched convex portion when the branched convex portion is cut by a virtual vertical plane which is in parallel with the extending direction of the branched convex portion in the liquid crystal display device according to Mode 1-B of the present disclosure including the aforementioned various preferred configurations, it is possible to employ a configuration with a cross-sectional shape in which a stepped portion declines from the cross-sectional shape of the branched convex portion on a side of the convex stem portion toward an end portion of the cross-sectional shape of the branched convex portion.

Furthermore, it is possible to employ a configuration in which a slit portion or a protruding portion which passes through a pixel center portion and is parallel with the pixel circumferential portion is formed at the first electrode in the liquid crystal display device according to Mode 1-B of the present disclosure including the aforementioned various preferred configuration. The protruding portion is formed of a resist material, for example, and the first electrode is not formed thereon. Alternatively, it is possible to employ a configuration in which a convex portion with a cross-shape which passes through the pixel center portion is formed at the first electrode so as to be surrounded by a concave portion. Such a convex portion with a cross shape can be provided by forming a convex portion with a cross shape below the first electrode or by the same method as a method of forming the concave and convex portions at the first electrode. Alternatively, it is also possible to provide a concave portion with a cross shape which passes through the pixel center portion instead of the slit portion or the protruding portion (rib). The same can be applied to a liquid crystal display device according to Mode 2-B of the present disclosure and a liquid crystal display device according to Mode 4 of the present disclosure, which will be described later.

Furthermore, it is also possible to employ a configuration in which a convex structure is formed from a part of a first substrate positioned between pixels and a part of the first substrate corresponding to the pixel circumferential portion and the circumferential portion of the concave and convex portions are formed on the convex structure in the liquid crystal display device according to Mode 1-A or Mode 1-B of the present disclosure including the aforementioned various preferred configuration. In addition, it is possible to employ a configuration in which the convex structure is formed based on a black matrix formed of an existing material.

In addition, it is possible to employ a configuration in which the concave and convex portions are configured by convex stem portions which pass through the pixel center portion and extend in a cross shape and a plurality of branched convex portions which extend from the convex stem portions toward the pixel circumferential portion. Moreover, such a configuration will be referred to as a "liquid crystal display device according to Mode 2-A of the present disclosure" for convenience. Here, when an (X, Y) coordinate system in which the convex stem portions extending in the cross shape respectively correspond to an X axis and a Y axis is assumed in the liquid crystal display device according to Mode 2-A of the present disclosure, it is possible to employ a configuration in which the plurality of branched convex portions occupying a first quadrant extend in parallel with a direction in which a value of a Y coordinate increases when a value of an X coordinate increases, the plurality of branched convex portions occupying a second quadrant extend in parallel with a direction in which a value of a Y coordinate increases when a value of an X coordinate decreases, the plurality of branched convex portions occupying a third quadrant extend in parallel with a direction in which a value of a Y coordinate decreases when a value of an X coordinate decreases, and the plurality of branched convex portions occupying a fourth quadrant extend in parallel with a direction in which a value of a Y coordinate decreases when a value of an X coordinate increases.

In addition, it is possible to employ a configuration in which an orientation regulating portion is formed at a part of a second electrode corresponding to the convex stem portions in the liquid crystal display device according to Mode 2-A of the present disclosure including the aforementioned preferred configuration. In relation to the orientation regulating portion on this occasion, a configuration including a slit portion provided at the second electrode or a configuration including a protruding portion provided at the second electrode can be employed.

Alternatively, it is possible to employ a configuration in which the concave and convex portions are configured by a convex stem portion which is formed in a frame shape at the pixel circumferential portion and a plurality of branched convex portions which extend from the convex stem portion toward the inside of pixel. In addition, such a configuration will be referred to as a "liquid crystal display device according to Mode 2-B of the present disclosure" for convenience. Here, when an (X, Y) coordinate system in which straight lines which pass through the pixel center portion and are in parallel with the pixel circumferential portions respectively correspond to an X axis and a Y axis is assumed in the liquid crystal display device according to Mode 2-B of the present disclosure, it is possible to employ a configuration in which the plurality of branched convex portions occupying a first quadrant extend in parallel with a direction in which a value of a Y coordinate increases when a value of an X coordinate increases, the plurality of branched convex portions occupying a second quadrant extend in parallel with a direction in which a value of a Y coordinate increases when a value of an X coordinate decreases, the plurality of branched convex portions occupying a third quadrant extend in parallel with a direction in which a value of a Y coordinate decreases when a value of an X coordinate decreases, and the plurality of branched convex portions occupying a fourth quadrant extend in parallel with a direction in which a value of a Y coordinate decreases when a value of an X coordinate increases.

In addition, it is possible to employ a configuration in which a slit portion or a protruding portion which passes through the pixel center portion and is in parallel with the pixel circumferential portion is formed at the first electrode in the liquid crystal display device according to Mode 2-B of the present disclosure including the aforementioned preferred configuration.

Furthermore, it is possible to employ a configuration in which the convex structure is formed based on a black matrix formed of an existing material in the liquid crystal display device according to Mode 2 of the present disclosure including the aforementioned various preferred configurations.

Moreover, it is possible to employ a configuration in which an orientation regulating portion includes a slit portion provided at a second electrode or a configuration in which the orientation regulating portion includes a protruding portion provided at the second electrode in the liquid crystal display device according to Mode 3 of the present disclosure.

In addition, it is possible to employ a configuration in which a black matrix is formed such that a projected image of a part of a first substrate positioned between pixels and a projected image of the black matrix are overlapped or a configuration in which the black matrix is formed such that a projected image of a region from the part of the first substrate positioned between the pixels to an end portion of concave and convex portions overlap each other in a liquid crystal display device according to Mode 4 of the present disclosure.

It is possible to employ a configuration in which the liquid crystal molecules have a negative dielectric constant anisotropy in the liquid crystal display devices according to Modes 1 to 4 of the present disclosure including the aforementioned various preferred configurations (hereinafter, they will be collectively and simply referred to as a "liquid crystal display device of the present disclosure" in some cases).

The liquid crystal display device or the liquid crystal display element of the present disclosure is produced by a process in which the first electrode is formed on the first substrate, and a first oriented film is formed on a facing surface of the first substrate, which faces the second substrate, and the first electrode, a process in which the second electrode is formed on the second substrate, and a second oriented film is formed on a facing surface of the second substrate, which faces the first substrate, and the second electrode, a process in which the first substrate and the second substrate are arranged such that the first oriented film and the second oriented film face each other, and the liquid crystal layer is sealed between the first oriented film and the second oriented film, and a process in which the liquid crystal molecules are oriented by causing a reaction (cross-link or deformation) of a polymer compound configuring at least the first oriented film while a predetermined electric field is applied to the liquid crystal layer.

In such a case, it is preferable to apply the electric field to the liquid crystal layer such that the liquid crystal molecules are aligned in an oblique direction with respect to a surface of at least one of the pair of substrates. Basically, an orientation angle (deviation angle) of the liquid crystal molecules when a pre-tilt is applied is defined depending on strength and a direction of the electric field and a molecular structure of a material of the oriented films, and a polar angle (zenithal angle) is defined depending on the strength of the electric field and the molecular structure of the material of the oriented films.

The pair of substrates are configured by a substrate which includes a pixel electrode and a substrate which includes a facing electrode. For example, the first substrate may be the substrate which includes the pixel electrode, and the second substrate may be the substrate which includes the facing electrode. A color filter layer is formed on the side of the substrate which includes the facing electrode (second substrate), or alternatively, the color filter layer is formed on the side of the substrate which includes the pixel electrode (first substrate). A circuit for driving pixels such as a TFT is provided on the substrate which includes the pixel electrode (first substrate). In addition, the layer which includes the circuit for driving the pixels such as the TFT will be referred to as a "TFT layer" in some cases. When the color filter layer is formed on the side of the substrate which includes the facing electrode, a flattened layer is formed on the TFT layer, and the first electrode is formed on the flattened layer. On the other hand, when the color filter layer is formed on the side of the substrate which includes the pixel electrode (first substrate), the color filter is formed on the TFT layer, and the first electrode is formed on the color filter layer, or on an overcoat layer which is formed on the color filter layer, or on a passivation film formed of an inorganic material. When a pixel is configured by a plurality of sub pixels in the liquid crystal display device, the pixel herein can be understood as a sub pixel. The first electrode and the second electrode may be configured by a transparent material such as ITO (indium tin oxide), IZO, ZnO, or SnO. In addition, the second electrode may be formed as a so-called solid electrode (an electrode on which no patterning is performed). It is possible to exemplify a range from 1 micrometer to 20 micrometers, and more preferably a range from 2 micrometers to 10 micrometers as widths of the branched convex portion and the concave portion. When the widths of the branched convex portion and the concave portion are less than 1 micrometer, it is difficult to form the branched convex portion and the concave portion, and there is a concern that a sufficient fabrication yield might not be secured. On the other hand, when the widths of the branched convex portion and the concave portion exceed 20 micrometers, there is a concern that a satisfactory oblique electric field might not be easily generated between the first electrode and the second electrode when drive voltage is applied to the first electrode and the second electrode. It is possible to exemplify a range from $2*10^{-6}$ m to $2*10^{-5}$ m, and more preferably a range from $4*10^{-6}$ to $1.5*10^{-5}$ m as a width of the convex stem portion. It is possible to exemplify a range from $5*10^{-8}$ m to $1*10^{-6}$ m, and more preferably a range from $1*10^{-7}$ m to $5*10^{-7}$ m as a height from the concave portion and the convex portion which is the closest to the concave portion, and it is possible to exemplify a range from $5*10^{-8}$ m to $1*10^{-6}$ and more preferably a range from $1*10^{-7}$ m to $5*10^{-7}$ as a height of each stepped portion in the convex portion (a height difference between adjacent top surfaces of the convex portion which configures the stepped portion). In so doing, it is possible to satisfactorily control the orientation, secure a sufficient fabrication yield, and prevent a decrease in transmittance and extension of process time.

EXAMPLE 1

Figure 2:
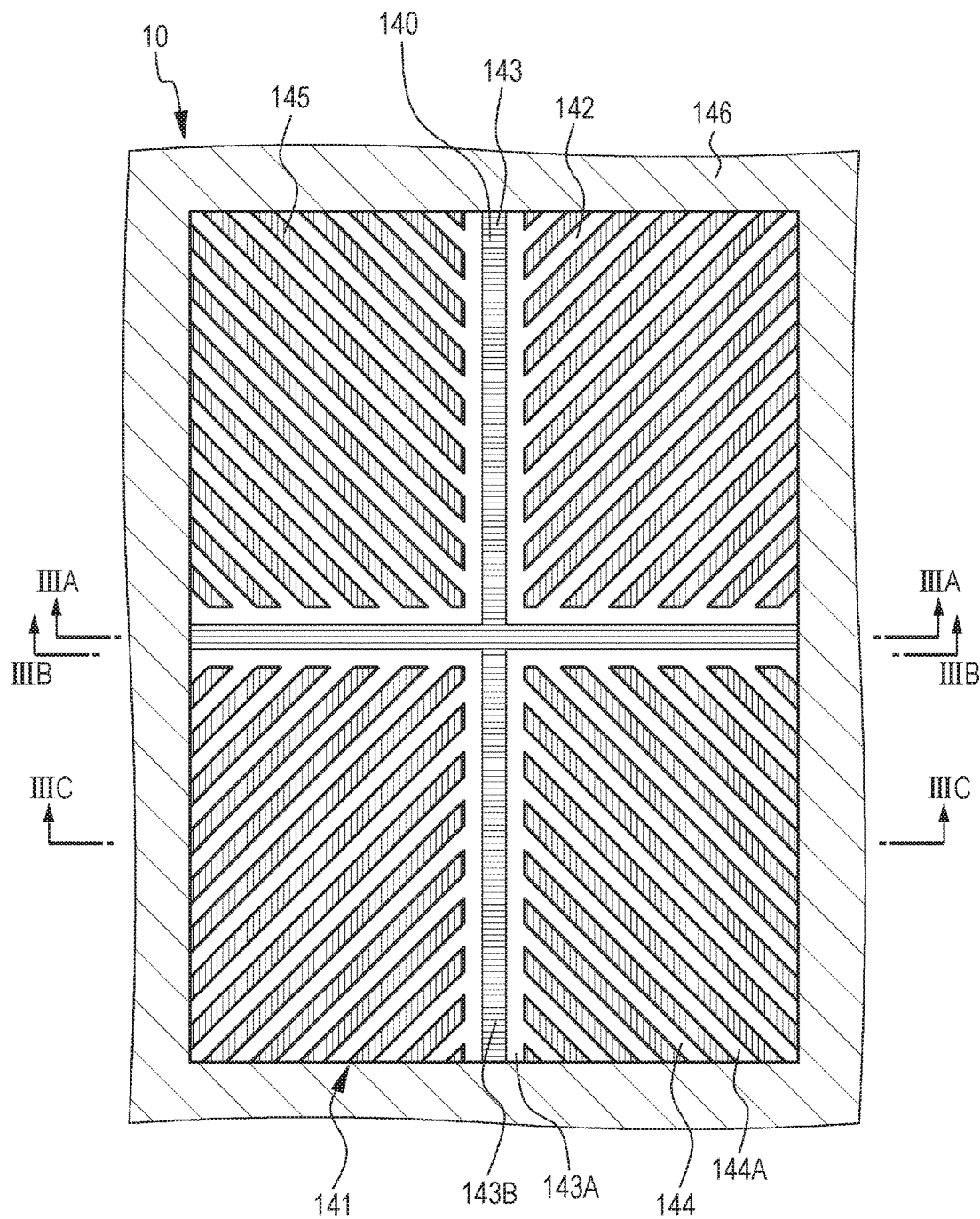
FIG. 2 is a planar view schematically showing a first electrode corresponding to a pixel, which configures the liquid crystal display device according to Example 1.
Figure 3A:
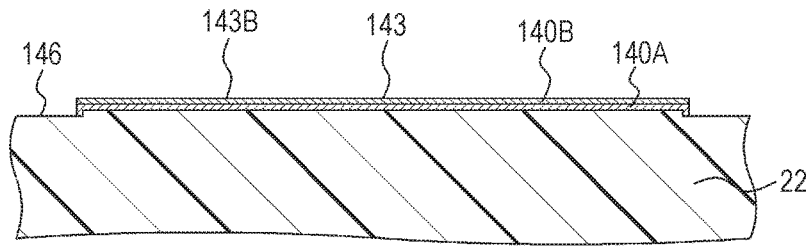
FIG. 3A is a partial cross-sectional view schematically showing a first electrode and the like taken along the arrow IIIA-IIIA in FIG. 2 in the liquid crystal display device according to Example 1.
Figure 3B:
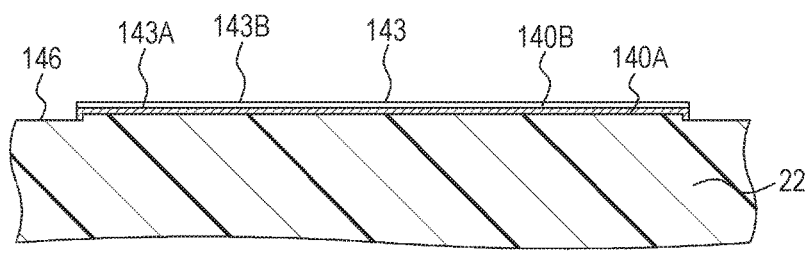
FIG. 3B is a partial cross-sectional view schematically showing a first electrode and the like taken along the arrow IIIB-IIIB in FIG. 2 in the liquid crystal display device according to Example 1.
Figure 3C:
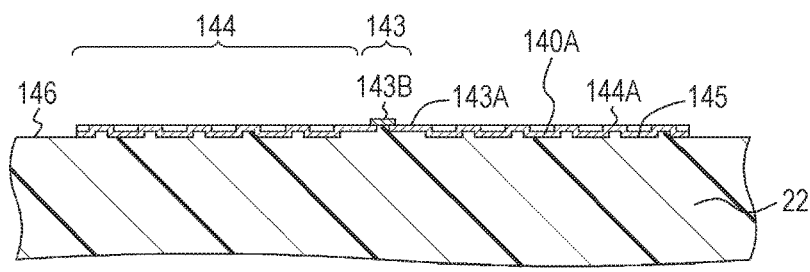
FIG. 3C is a partial cross-sectional view schematically showing a first electrode and the like taken along the arrow IIIC-IIIC in FIG. 2 in the liquid crystal display device according to Example 1.
Figure 3D:
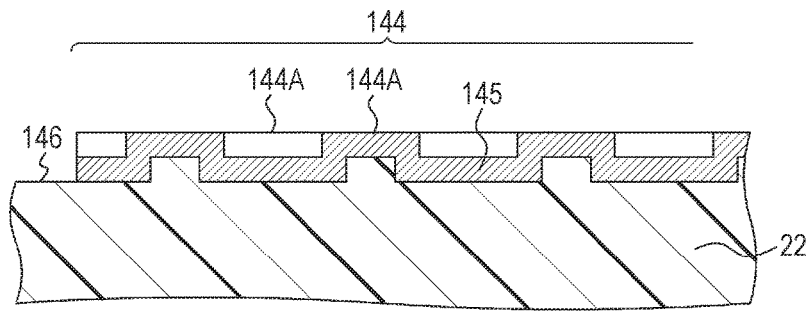
FIG. 3D is a partial cross-sectional view schematically showing a part of FIG. 3C in an enlarged manner.

Example 1 relates to a liquid crystal display device according to Mode 1 of the present disclosure, and more specifically to a liquid crystal display device according to Mode 1-A of the present disclosure. FIG. 1 shows a partial end surface view schematically showing the liquid crystal display device according to Example 1. FIG. 2 is a planar view schematically showing the first electrode corresponding to a pixel configuring the liquid crystal display device according to Example 1. FIGS. 3A, 3B, and 3C are partial cross-sectional views schematically showing the first electrode and the like taken along the arrow IIIA-IIIA, the arrow IIIB-IIIB, and the arrow IIIC-IIIC in FIG. 2. FIG. 3D is a partial cross-sectional view schematically showing a part of FIG. 3C in an enlarged manner.

The liquid crystal display device according to Example 1 or Examples 2 to 9, which will be described later, is a liquid crystal display device in which a plurality of pixels 10 are aligned such that each of the plurality of pixels 10 includes a first substrate 20 and a second substrate 50, a first electrode (pixel electrode) 140, 240, 340, or 440 which is formed on a facing surface of the first substrate 20 which faces the second substrate 50, a first oriented film 21 which covers the first electrode 140, 240, 340, or 440 and the facing surface of the first substrate 20, a second electrode (facing electrode) 160 which is formed on a facing surface of the second substrate 50 which faces the first substrate 20, a second oriented film 51 which covers the second electrode 160 and the facing surface of the second substrate 50, and a liquid crystal layer 70 which is provided between the first oriented film 21 and the second oriented film 51 and includes liquid crystal molecules 71A, 71B, and 71C. To the liquid crystal molecules, a pre-tilt is applied by at least the first oriented film 21. In addition, the liquid crystal molecules have negative dielectric constant anisotropy.

Figure 26A:
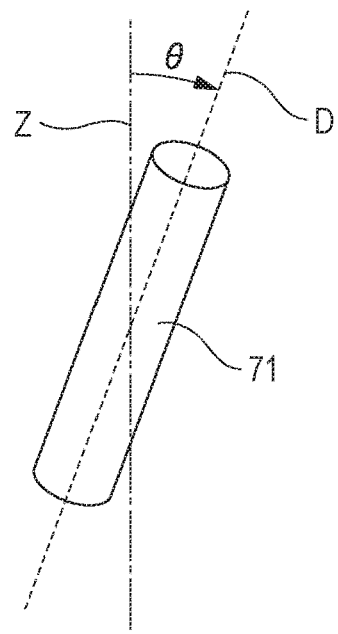
FIG. 26A is a diagram schematically illustrating a pre-tilt of liquid crystal molecules.

The liquid crystal molecules 71 can be classified into the liquid crystal molecules 71A which are held by the first oriented film 21 in the vicinity of a boundary with the first oriented film 21, the liquid crystal molecules 71B which are held by the second oriented film 51 in the vicinity of a boundary with the second oriented film 51, and other liquid crystal molecules 71C. The liquid crystal molecules 71C are positioned in an intermediate region in a thickness direction of the liquid crystal layer 70 and aligned such that long axial directions (directors) of the liquid crystal molecules 71C are substantially perpendicular to the first substrate 20 and the second substrate 50 in a state in which the drive voltage is turned off. Here, when the drive voltage is turned on, the directors of the liquid crystal molecules 71C are inclined and oriented so as to be in parallel with the first substrate 20 and the second substrate 50. Such a behavior is caused by a characteristic of the liquid crystal molecules 71C that the dielectric constant in the long axial direction is smaller than that in the short axial direction. Since the liquid crystal molecules 71A and 71B have the same characteristic, the liquid crystal molecules 71A and 71B basically exhibit the same behavior as that of the liquid crystal molecules 71C in accordance with a variation in ON and OFF states of the drive voltage. However, a pre-tilt $theta_1$ is applied to the liquid crystal molecules 71A by the first oriented film 21, and the directors thereof are in a posture inclined from a normal direction of the first substrate 20 and the second substrate 50. Similarly, a pre-tilt $theta_2$ is applied to the liquid crystal molecules 71B by the second oriented film 51, and the directors thereof are in a posture inclined from a normal direction of the first substrate 20 and the second substrate 50. In addition, the term "held" means a state in which the oriented films 21 and 51 and the liquid crystal molecules 71A and 71B are not fixedly adhered to each other and regulate the orientation of the liquid crystal molecules 71. In addition, the pre-tilt theta ($theta_1$, $theta_2$) represents an inclination angle of a director D of the liquid crystal molecule 71 (71A, 71B) with respect to a Z direction in a state in which the drive voltage is turned off when Z represents a direction which is perpendicular to the surfaces of the first substrate 20 and the second substrate 50 (normal direction) as shown in FIG. 26A.

In the liquid crystal layer 70, both the pre-tilt $theta_1$ and the pre-tilt $theta_2$ are greater than 0 degrees. In the liquid crystal layer 70, the pre-tilt $theta_1$ and the pre-tilt $theta_2$ may be the same angle ($theta_1$=$theta_2$). However, it is preferable that the pre-tilt $theta_1$ and the pre-tilt $theta_2$ be different angles ($theta_1$ is not equal to $theta_2$). In so doing, it is possible to enhance a response speed in response to application of the drive voltage than a case in which both the pre-tilt $theta_1$ and the pre-tilt $theta_2$ are 0 degrees and obtain substantially the same contrast as that in the case in which both the pre-tilt $theta_1$ and the pre-tilt $theta_2$ are 0 degrees. Accordingly, it is possible to reduce the light transmittance during a black display and enhance contrast while enhancing the response characteristic. When the pre-tilt $theta_1$ and the pre-tilt $theta_2$ are differently set, it is desirable that a greater pre-tilt theta of the pre-tilt $theta_1$ and the pre-tilt $theta_2$ be 1 degree or more and 4 degrees or less. By setting the greater pre-tilt theta in the above range, an especially large effect can be achieved.

In addition, a TFT layer 30 (which will be described later in detail) is formed on the first substrate 20, a flattened layer 22 formed of a photosensitive organic insulating material such as polyimide resin or acrylic resin is formed on the TFT layer 30, and the first electrode 140, 240, 340, or 440 is formed on the flattened layer 22. Each of reference numerals 146 and 246 represents a part of the first substrate positioned between pixels. The flattened layer 22 may be formed of an inorganic insulating material such as $SiO_2$, SiN, or SiON.

In the liquid crystal display device according to Example 1, a plurality of concave and convex portions 141 (convex portions 142 and concave portions 145) are formed on the flattened layer 22, and a plurality of stepped portions are formed on the convex portions 142 included on the first electrode 140.

Specifically, in the liquid crystal display device according to Example 1, the concave and convex portions 141 includes convex stem portions (main convex portions) 143 which pass the pixel center portion and extend in a cross shape and a plurality of branched convex portion (sub convex portions) 144 which extend from the convex stem portions 143 toward the pixel circumferential portion. More specifically, when an (X, Y) coordinate system in which the convex stem portions 143 extending in the cross shape respectively corresponds to an X axis and a Y axis is assumed, the plurality of branched convex portions 144 occupying a first quadrant extend in parallel with a direction in which a value of a Y coordinate increases when a value of an X coordinate increases, the plurality of branched convex portions 144 occupying a second quadrant extend in parallel with a direction in which a value of a Y coordinate increases when a value of an X coordinate decreases, the plurality of branched convex portions 144 occupying a third quadrant extend in parallel with a direction in which a value of a Y coordinate decreases when a value of an X coordinate decreases, and the plurality of branched convex portions 144 occupying a fourth quadrant extend in parallel with a direction in which a value of a Y coordinate decreases when a value of an X coordinate increases.

In addition, a cross-sectional shape of the convex stem portion 143 when the convex stem portion 143 is cut by a virtual vertical plane which is orthogonal to an extending direction of the convex stem portion 143 is a cross-sectional shape in which the stepped portion declines from the center of the cross-sectional shape of the convex stem portion 143 toward the edge of the cross-sectional shape of the convex stem portion 143. Specifically, the top surface of the convex stem portion 143 is configured by a top surface 143B at the center of the convex stem portion 143 and a top surface 143A positioned on both sides of the top surface 143B. When two stepped portions are present in the convex stem portion 143 as described above, and the concave portion 145 is regarded as a reference, the top surface 143A and the top surface 143B are higher in this order. The top surface of the branched convex portion 144 is represented by a reference numeral 144A, and the top surface 143A of the convex stem portion 143 and the top surface 144A of the branched convex portion 144 are in the same level. In the drawing, the top surface plane 143B of the convex stem portion 143 is hatched in the horizontal direction, and the concave portion 145 is hatched in the vertical direction.

The stepped portion of the convex stem portion or the branched convex portion, which will be described later, can be obtained by (a) forming a resist material layer on a flattened layer as a base (or a color filter layer which will be described later) (the flattened layer and the color filter layer will be collectively referred to as "flattened layer and the like"), (b) forming the concave and convex portions in the resist material layer by exposure and development, (c) forming the concave and convex portions in the flattened layer and the like by etching back of the resist material layer and the flattened layer and the like, and (d) forming and patterning of a transparent conductive material layer on the flattened layer and the like, for example.

Alternatively, the stepped portion of the convex stem portion or the branched convex portion, which will be described later, can be obtained by (a) forming a resist material layer on a base layer formed on the flattened layer and the like, (b) forming the concave and convex portion in the resist material layer by exposure and development, (c) forming the concave and convex portion in the base layer by etching back the resist material layer and the flattened layer and the like, and (d) forming and patterning a transparent conductive material layer on the base layer, for example.

Alternatively, the stepped portion of the convex stem portion or the branched convex portion, which will be described later, can be obtained by (a) forming an insulating material layer which is patterned on the flattened layer and the like as a base and (b) forming and patterning a transparent conductive material layer on the flattened layer and the like and the insulating material layer, for example.

Alternatively, the stepped portion of the convex stem portion or the branched convex portion, which will be described later, can be obtained by (a) forming a transparent conductive material layer on the flattened layer and the like as a base, (b) forming a resist material layer on the transparent conductive material layer, (c) forming the concave and convex portions in the resist material layer by exposure and development, and (d) etching back of the resist material layer and the transparent conductive material layer, for example.

Alternatively, the stepped portion of the convex stem portion or the branched convex portion, which will be described later, can be obtained by (a) forming and patterning a first transparent conductive material layer (see a reference numeral 140A in FIGS. 3A and 3B) in the flattened layer as a base and (b) forming and patterning of a second transparent conductive material layer (see a reference numeral 140B in FIGS. 3A and 3B) with etching selectivity with the first transparent conductive material layer on the first transparent conductive material layer, for example.

Alternatively, the stepped portion of the convex stem portion or the branched convex portion, which will be described later, can be obtained by optimizing a thickness of the flattened layer and thereby forming a convex portion on the flattened layer by an influence of a thickness of components of the liquid crystal display device (various signal lines, auxiliary capacity electrodes, a gate electrode, source/drain electrodes, and various kinds of wiring, for example) formed on or above the first substrate.

The side surface of the convex stem portion or the branched convex portion, which will be described later, may be a vertical surface or regularly or reversely tapered.

The above descriptions relating to the convex stem portion and the branched convex portion can be applied to other examples.

Figure 27:
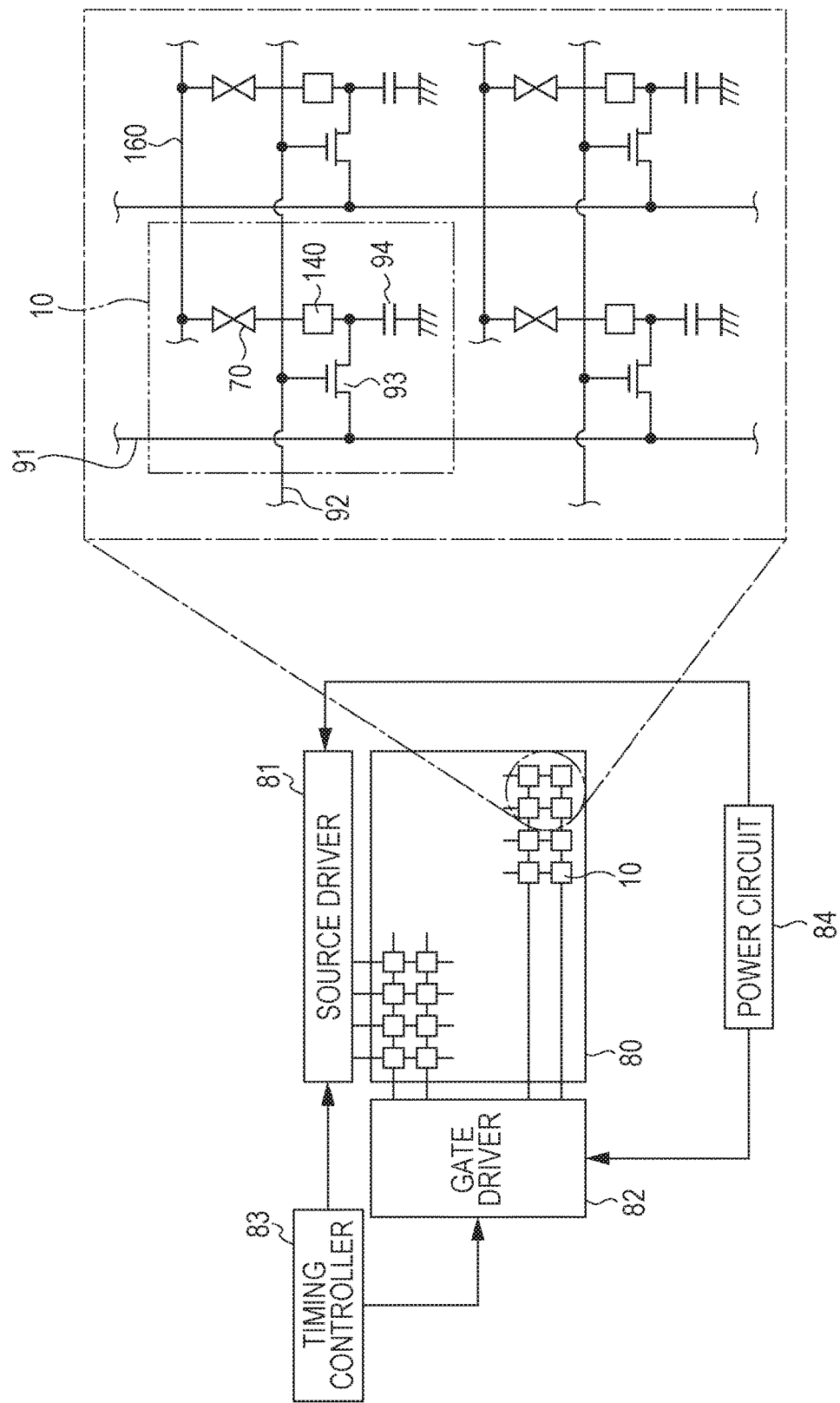
FIG. 27 is a circuit configuration diagram of the liquid crystal display device shown in FIG. 1.

FIG. 27 shows a circuit configuration in the liquid crystal display device shown in FIG. 1 or a liquid crystal display device according to Examples 2 to 9 which will be described later.

As shown in FIG. 27, the liquid crystal display device includes a liquid crystal display element which includes a plurality of pixels 10 provided in a display region 80. According to the liquid crystal display device, a source drive 81, a gate driver 82, a timing controller 83 which controls the source driver 81 and the gate driver 82, and a power circuit 84 which supplies power to the source driver 81 and the gate driver 82 are provided in the circumference of the display region 80.

The display region 80 is a region in which a video image is displayed, namely a region which is configured to be capable of displaying a video image by aligning the plurality of pixels 10 in a matrix shape. In addition, FIG. 27 also shows a region corresponding to four pixels 10 in an enlarged manner as well as the display region 80 including the plurality of pixels 10.

In the display region 80, a plurality of source lines 91 are aligned in a row direction, a plurality of gate lines 92 are aligned in a column direction and pixels 10 are respectively arranged at positions at which the source lines 91 intersect the gate lines 92. Each of the pixels 10 is configured so as to include a TFT 93 and a capacitor 94 as well as the first electrode 140 and the liquid crystal layer 70. At each TFT 93, a source electrode is connected to the source line 91, a gate electrode is connected to the gate line 92, and a drain electrode is connected to the capacitor 94 and the first electrode 140. Each source line 91 is connected to the source driver 81, and an image signal is supplied thereto from the source driver 81. Each gate line 92 is connected to the gate driver 82, and a scanning signal is sequentially supplied thereto from the gate driver 82.

The source driver 81 and the gate driver 82 select a specific pixel 10 from among the plurality of pixels 10.

The timing controller 83 outputs image signals (various video signal of RGB corresponding to red, green, and blue, for example) and a source driver control signal for controlling operations of the source diver 81, for example, to the source diver 81. In addition, the timing controller 83 outputs a gate driver control signal for controlling operations of the gate driver 82, for example, to the gate driver 82. Examples of the source diver control signals include a horizontal synchronization signal, a start pulse signal, and a clock signal for the source driver. Examples of the gate driver signals include a vertical synchronization signal and a clock signal for the gate driver.

In fabricating the liquid crystal display device according to Example 1, the first oriented film 21 is firstly formed on the surface of the first substrate 20, and the second oriented film 51 is formed on the surface of the second substrate 50. Specifically, the first substrate 20 is firstly fabricated by providing the first electrode 140 in a matrix shape, for example, on the surface of the first substrate 20. In addition, the second substrate 50 is fabricated by providing the second electrode 160 on a color filter of the second substrate 50 with the color filter formed thereon.

Then, a material of the oriented film is applied or printed on each of the first electrode 140 and the second electrode 160, and a heat treatment is then performed thereon. A temperature of the heating treatment is preferably 80 degrees Celsius or higher and more preferably 150 degrees Celsius or higher and 200 degrees Celsius or lower. In addition, the heat treatment may be performed while the heating temperature is changed in a stepwise manner. In so doing, solvent contained in the applied or printed material of the oriented film evaporates, and the oriented films 21 and 52 containing polymer compounds are formed. Thereafter, a treatment such as rubbing may be performed thereon as necessary.

Next, the first substrate 20 and the second substrate 50 are arranged such that the oriented film 21 and the oriented film 51 face each other, and the liquid crystal layer 70 containing the liquid molecules 71 is sealed between the oriented film 21 and the oriented film 51. Specifically, spacer protrusions such as plastic beads for securing a cell gap are dispersed on the surface, on which the oriented film 21 or 51 is formed, of one of the first substrate 20 and the second substrate 50, and a sealing portion is printed by using an epoxy adhesive agent or the like by a screen printing method, for example. Thereafter, the first substrate 20 and the second substrate 50 are adhered via the spacer protrusions and the sealing portion such that the oriented films 21 and 51 face each other, and a liquid crystal material containing the liquid crystal molecules 71 is poured therebetween. Then, the liquid crystal material is sealed between the first substrate 20 and the second substrate 50 by hardening the sealing portion by heating, for example.

Then, voltage is applied between the first electrode 140 and the second electrode 160 by using a voltage applying unit. Voltage of 3 volts to 30 volts is applied, for example. In so doing, an electric field (electrical field) in a direction at a predetermined angle with respect to the surfaces of the first substrate 20 and the second substrate 50 is generated, and the liquid crystal molecules 71 are oriented so as to incline in a predetermined direction from a vertical direction of the first substrate 20 and the second substrate 50. That is, the orientation angle (deviation angle) of the liquid crystal molecules 71 at this time is defined depending on strength and a direction of the electric field and a molecular structure of the material of the oriented films, and a polar angle (zenithal angle) is defined depending on the strength of the electric field and the molecular structure of the material of the oriented films. Therefore, it is possible to control values of the pre-tilt $theta_1$ and the pre-tilt $theta_2$ of the liquid crystal molecules 71A and 71B by appropriately adjusting the voltage.

Furthermore, the oriented films 21 and 51 are irradiated with an energy line (specifically, ultraviolet ray (UV)) from the outside of the first substrate 20, for example, while the voltage is applied. That is, the liquid crystal layer is irradiated with an ultraviolet ray while an electric field or a magnetic field is applied thereto so as to align the liquid crystal molecules 71 in an oblique direction with respect to the surfaces of the pair of substrates 20 and 50. In so doing, a cross-linkable functional group or a polymerizable functional group contained in the polymer compounds in the oriented films 21 and 51 is made to react to cause a cross-link. In so doing, the polymer compounds memorize a direction in which the liquid crystal molecules 71 are to respond and the pre-tilt is applied to the liquid crystal molecules 71 in the vicinity of the oriented films 21 and 51. As a result, the pre-tilt $theta_1$ and the pre-tilt $theta_2$ are applied to the liquid crystal molecules 71A and 71B positioned in the vicinity of the boundaries with the oriented films 21 and 51 in the liquid crystal layer 70 in a non-driven state. As the ultraviolet ray (UV), an ultraviolet ray which contains many optical components with a wavelength from about 295 nm to about 365 nm is preferable. If an ultraviolet ray which contains many optical components in a shorter wavelength band than preferable is used, there is a concern that the liquid crystal molecules 71 photodegrade and deteriorate. Although the irradiation with the ultraviolet ray (UV) is performed from the outside of the first substrate 20 in the above description, the irradiation may be performed from the outside of the second substrate 50 or may be performed from the outside of both the first substrate 20 and the second substrate 50. In such a case, it is preferable that the irradiation with the ultraviolet ray (UV) be performed from the side of the substrate with higher transmittance. In addition, when the irradiation with the ultraviolet ray (UV) is performed from the outside of the second substrate 50, there is a concern that the ultraviolet ray is absorbed by the color filter depending on a wavelength band of the ultraviolet ray (UV) and the cross-link reaction might not be easily caused. For this reason, it is preferable to perform the irradiation from the outside of the first substrate 20 (the side of the substrate which includes the pixel electrode).

It is possible to complete the liquid crystal display device (liquid crystal display element) shown in FIG. 1 by the above processes.

For operating the liquid crystal display device (liquid crystal display element), the orientation state of the liquid crystal molecules 71 included in the liquid crystal layer 70 changes in accordance with a potential difference between the first electrode 140 and the second electrode 160 in the selected pixel 10 when the drive voltage is applied. Specifically, the liquid crystal molecules 71A and 71B positioned in the vicinity of the oriented films 21 and 51 lie down in their own inclination directions and the operations are propagated to the other liquid crystal molecules 71C in the liquid crystal layer 70 in response to the application of the drive voltage from the state before the application of the drive voltage, which is shown in FIG. 1. As a result, the liquid crystal molecules 71 respond by taking a posture in which the liquid crystal molecules are substantially horizontal (parallel) with the first substrate 20 and the second substrate 50. In so doing, an optical characteristic of the liquid crystal layer 70 changes, incident light on the liquid crystal display element is changed into a modulated outgoing light, and a video image is displayed by gradation expression on the basis of the outgoing light.

In the liquid crystal display device, a video image is displayed by applying drive voltage between the first electrode (pixel electrode) 140 and the second electrode (facing electrode) 160 as follows. Specifically, the source driver 81 supplies an individual image signal to a predetermined source line 91 based on an image signal input from the timing controller 83 in response to an input of a source diver control signal which is similarly sent from the timing controller 83. In addition, the gate driver 82 sequentially supplies scanning signals to the gate line 92 at predetermined timing in response to an input of a gate driver control signal from the timing controller 83. In so doing, a pixel 10 positioned at an intersection between the source line 91 to which the image signal is supplied and the gate line 92 to which the scanning signal is supplied is selected, and the drive voltage is applied to the pixel 10.

Figure 28A:
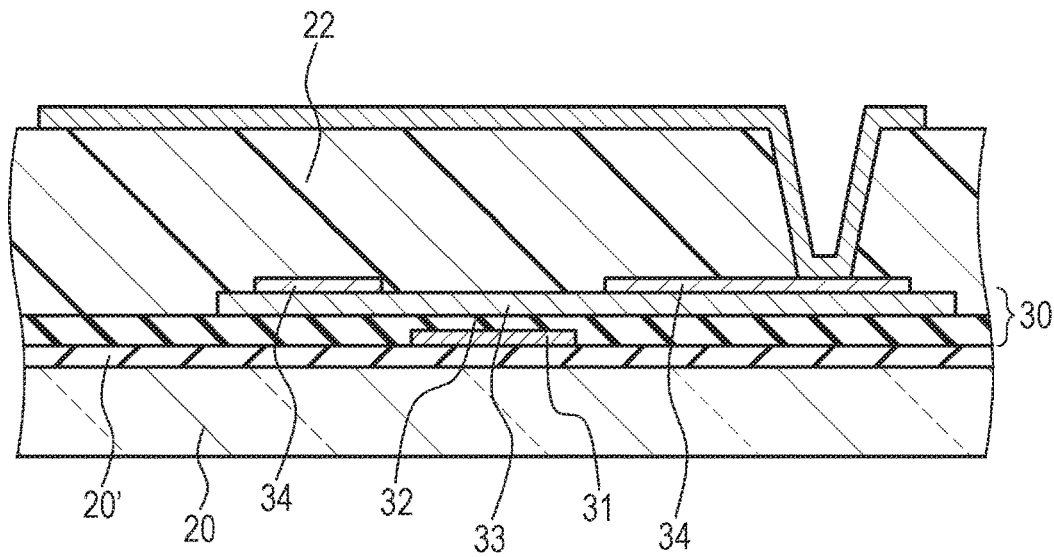
FIG. 28A is a partial end surface view schematically showing a first substrate before concave and convex portions are formed on the flattened layer, in which a TFT and the like are formed.

Specifically, the TFT is formed based on a method described below, and further, a transparent conductive material layer formed of ITO with an average film thickness of 2.5 micrometers is formed on the facing surface of the first substrate 20 on which the flattened layer 22 has been formed. In addition, the first substrate 20 is formed of a glass substrate with a thickness of 0.7 mm That is, a gate electrode 31 is formed on an insulating film 20 formed on the first substrate 20, and a gate insulating layer 32 is formed on the gate electrode 31 and the insulating film 20'. The gate insulating layer 32 is formed of $SiO_2$, SiN, SiON, or metal oxide, for example. Next, a semiconductor layer 33 as a channel formation region is formed on the gate insulating layer 32, and source/drain electrodes 34 are then formed on the semiconductor layer 33. The semiconductor layer 33 is formed of polysilicon or amorphous silicon, and the source/drain electrodes 34 are formed of metal films of titanium, chromium, aluminum, molybdenum, tantalum, tungsten, copper, or the like, or an alloy film or a laminated film thereof. As described above, the TFT layer 30 can be obtained. The above formation of the TFT layer 30 can be performed based on an existing method. In addition, the TFT is not limited to such a so-called bottom-gate/top-contact type, and can be a bottom-gate/bottom contact type, a top-gate/top-contact type, or a top-gate/bottom contact type. Then, the flattened layer 22 is formed over the entire surface, and a connection hole 35 is then formed on the flattened layer 22 above one of the source/drain electrodes 34. Then, a conductive material layer for forming the first electrode 140 is formed on the flattened layer 22 including the connection hole 35 (see FIG. 28A).

Then, the resist material layer is formed on the transparent conductive material layer, and the concave and convex portions are then formed on the resist material layer by performing an exposure and then development. Then, it is possible to form the concave and convex portions 141 (the convex stem portion 143, the branched convex portion 144, and the concave portion 145) by etching back the resist material layer and the transparent conductive material layer. Thereafter, a transparent conductive material layer formed of ITO with a thickness of 0.1 micrometers is formed on the entire surface. Specifications of the convex stem portion 143, the branched convex portion 144, and the concave portion 145 are as shown in Tables 1 and 2 below. Next, spacer protrusions (photosensitive acrylic resin PC-335 manufactured by JSR Corporation) with a size of 3.0 micrometers are formed on the first electrode 140. Meanwhile, a color filter is formed on the second substrate 50 formed of a glass substrate with a thickness of 0.7 mm, and the second electrode 160 which is a so-called solid electrode is formed on the color filter.

[Table 1]

Height Difference between Top Surface 143A of Convex Stem Portion 143 and Concave Portion 145: 0.20 micrometers on Average Height Difference between Top Surface 144A of Branched Convex Portion 144 and Concave Portion 145: 0.20 micrometers on Average Width of Convex Stem Portion 143 (Width of Top Surface 143A of Convex Stem Portion 143): 8.0 micrometers Width of Top Surface 143B of Convex Stem Portion 143: 4.0 micrometers Width of Branched Convex Portion 144 (Width of Top Surface 144A of Branched Convex Portion 144): 2.5 micrometers Interval between Branched Convex Portion 144 and Branched Convex Portion 144 (Space): 2.5 micrometers

[Table 2]

Height Difference between Top Surface 143B and Top Surface 143A of Convex Stem Portion 143

Example 1-A: 0.10 micrometers on Average
Example 1-B: 0.20 micrometers on Average
Example 1-C: 0.30 micrometers on Average
Example 1-D: 0.60 micrometers on Average Thereafter, the first oriented film 21 is formed on the first electrode 140, and the second oriented film 51 is formed on the second substrate 160. Specifically, JALS2131-R6 manufactured by JSR Corporation is used as a material of the vertical oriented films for the first oriented film 21 and the second oriented film 51, and the material of the vertical oriented films is coated on the first electrode 140 and the second electrode 160 based on a spin coating method. Then, a drying process at 80 degrees Celsius is performed on a hot plate for 80 minutes, baking at 200 degrees Celsius is performed in a clean oven in a nitrogen atmosphere for 60 minutes, and the first oriented film 21 and the second oriented film 51 are obtained.

Then, a sealing portion is formed at an outer edge on the second substrate 50 by applying ultraviolet curable resin containing silica particles with a particle diameter of 3.5 micrometers, and a liquid crystal material which is obtained by mixing 0.3% by mass of acrylic monomer (A-BP-2E manufactured by Shin-Nakamura Chemical Co., Ltd.) with a negative liquid crystal is dripped into a part surrounded by the sealing portion. Such a fabrication scheme of the liquid crystal display device is called a PSA scheme (Polymer Stabilized Alignment scheme). Thereafter, the first substrate 20 and the second substrate 50 are adhered to each other, and the sealing portion is cured. Subsequently, heating is performed thereon in an oven at 120 degrees Celsius for one hour to completely cure the sealing portion. In so doing, the liquid crystal layer 70 is sealed, and the liquid crystal cell can be completed. In addition, an FPA scheme (Field-induced Photo-reactive Alignment scheme) in which a negative liquid crystal is injected and sealed after an oriented film with a function of memorizing the pre-tilt is applied on at least one electrode may also be employed.

Thereafter, the thus fabricated liquid crystal cell is uniformly irradiated with ultraviolet rays of 10 J (measured at a wavelength 360 nm) while an alternating electric field (60 Hz) of a rectangular wave at effective voltage of 7 volts is applied, and the polymer compounds in the oriented films 21 and 51 are made to react. In addition, an oblique electric field is applied to the first substrate 20 and the second substrate 50 by the concave and convex portions 141 formed on the flattened layer 22. As described above, the liquid crystal display device (liquid crystal display element) shown in FIG. 1, in which the liquid crystal molecules 71A on the sides of the first substrate 20 and the second substrate 50 incline at the pre-tilt can be completed. Finally, a pair of polarizing plates (not shown) are attached to the outside of the liquid crystal display device such that the absorption axes intersect each other.

In addition, the liquid crystal display devices according to Examples 2 to 9, which will be described later, can be manufactured by substantially the same methods.

Meanwhile, a liquid crystal display device in which a stepped portion is not formed on the convex portion included on the first electrode while the plurality of concave and convex portions are included on the first electrode, namely a liquid crystal display device provided with a first electrode in which the convex stem portion 143 is configured only by the top surface 143A is manufactured as a liquid crystal display device according to a Comparative Example.

Figure 30A:
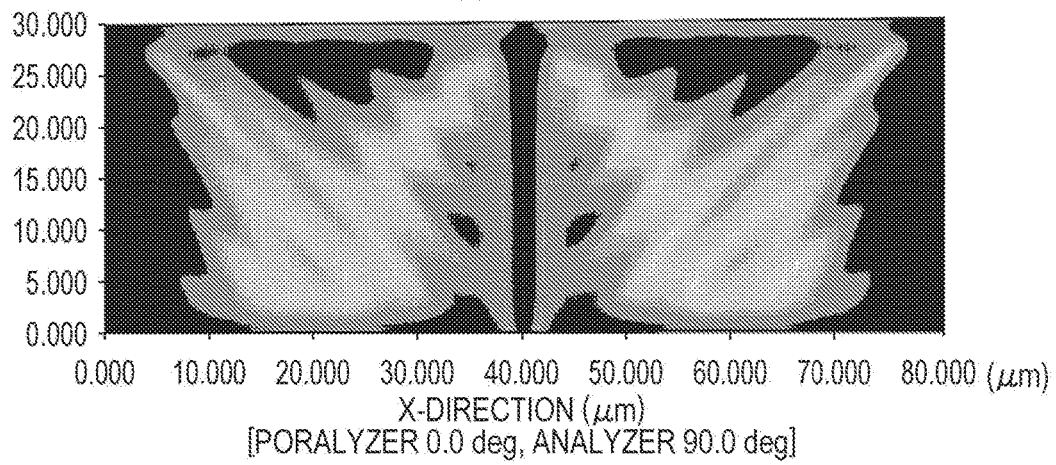
FIG. 30A is an image showing a transmittance simulation result in Example 1-D.
Figure 30B:
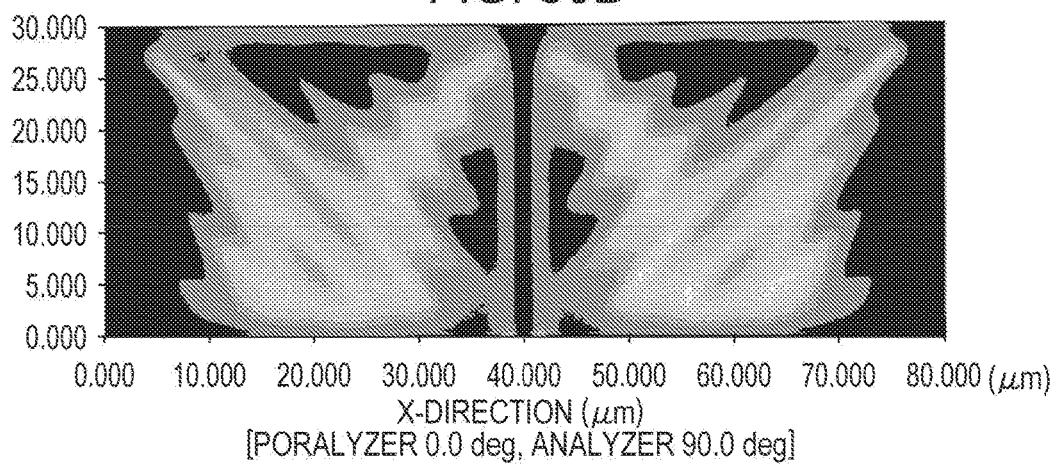
FIG. 30B is an image showing a transmittance simulation result in Example 8.
Figure 30C:
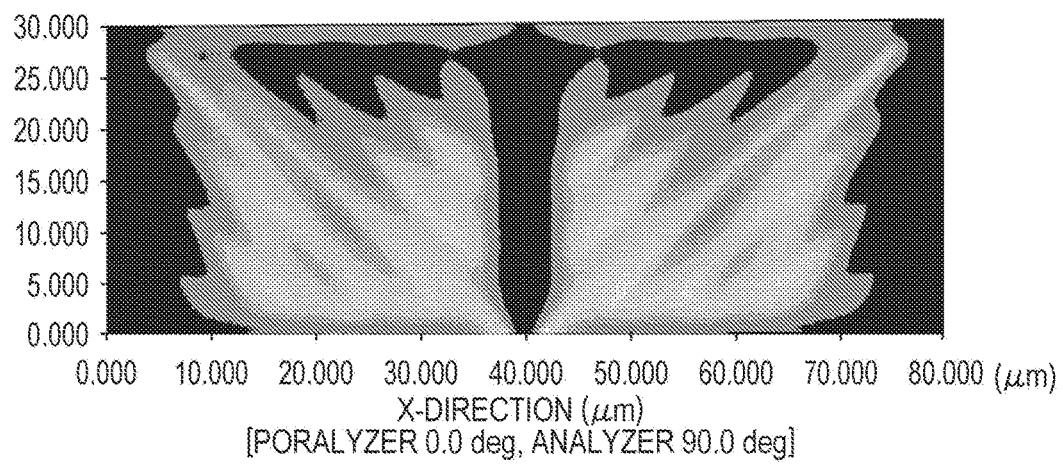
FIG. 30C is an image showing a transmittance simulation result in a Comparative Example.

Characteristics of the thus obtained liquid crystal display devices according to Example 1 and Comparative Example were evaluated. In addition, transmission was evaluated based on a simulation by a three-dimensional liquid crystal director, electric field, and optical computation software (LCD Master 3DFEM Version 7.31 manufactured by Sintec Inc.). In the simulation, a simulation result of the liquid crystal display device according to Comparative example was regarded as a reference, and only a parameter for a designed part, the transmittance of which has been improved as compared with the reference, was changed and studied. The results of the transmittance improved rate when voltage of 7.5 V was applied will be shown in Table 3. In addition, images showing transmittance simulation results in Examples 1-A, 1-B, 1-C, 1-D, and 8 and Comparative example will be shown in FIGS. 29A, 29B, 29C, 30A, 30B, and 30C. As compared with a width of a dark line (a part in which an amount of light transmission is locally small) by the liquid crystal display device according to Comparative Example shown in FIG. 30C, widths of dark lines in Examples 1-A, 1-B, 1-C, 1-D, and 8 are narrower.

[Table 3]

Transmittance Improved Rate

| Example 1-A | 3.1% |
| Example 1-B | 5.0% |
| Example 1-C | 4.7% |
| Example 1-D | 2.1% |
| Example 8 | 1.8% |

Furthermore, in relation to response speeds, similar values were obtained for the liquid crystal display devices according to Examples 1-A, 1-B, 1-C, and 1-D and Comparative Example. For measuring the responsive time, LCD 5200 (manufactured by Otsuka Electronics Co., Ltd.) was used to measure time for reaching luminance of 90% of gradation in accordance with drive voltage from luminance of 10% by applying the drive voltage (2.5 volts to 7.5 volts) between the first electrode 140 and the second electrode 160.

Figure 28B:
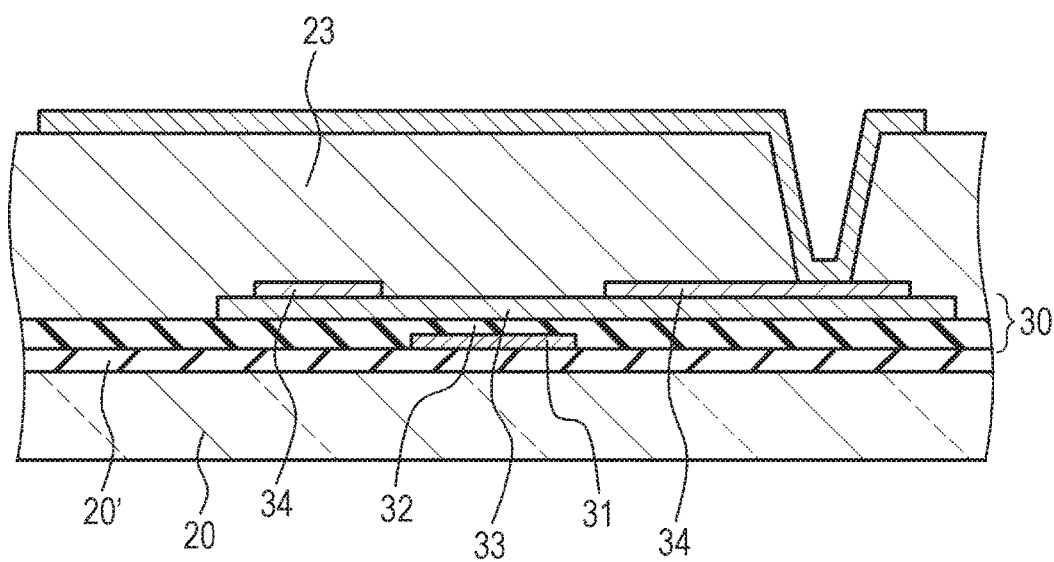
FIG. 28B is a partial end surface view schematically showing the first substrate before the concave and convex portions are formed on the flattened layer, in which the TFT and the like are formed.
Figure 29A:
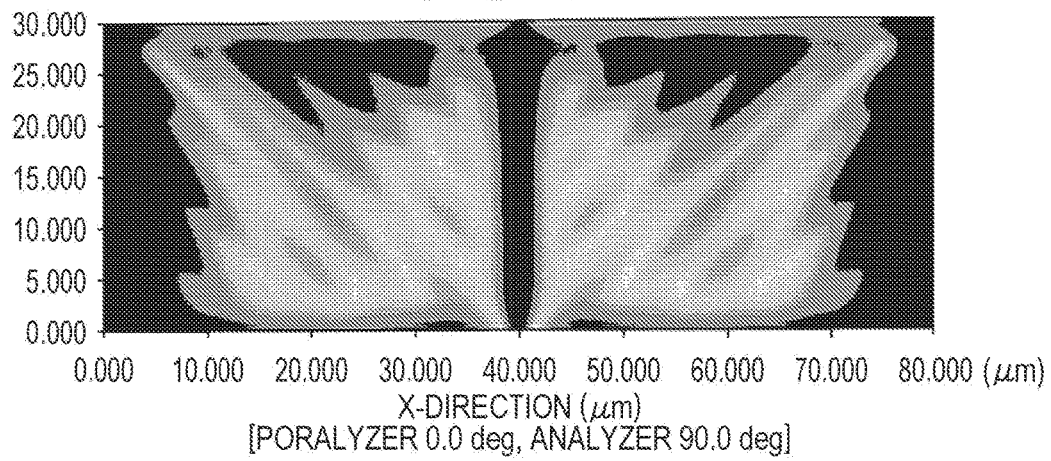
FIG. 29A is an image showing a transmittance simulation result in Example 1-A.
Figure 29B:
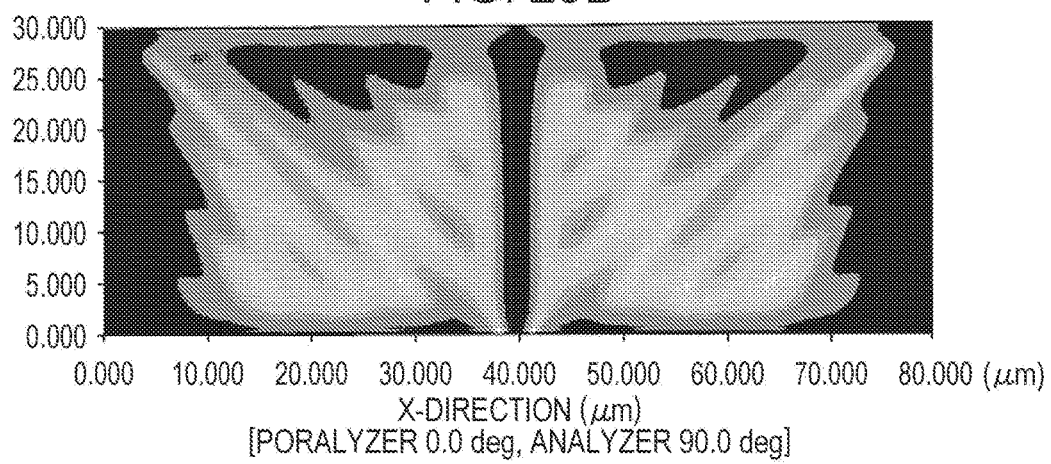
FIG. 29B is an image showing a transmittance simulation result in Example 1-B.
Figure 29C:
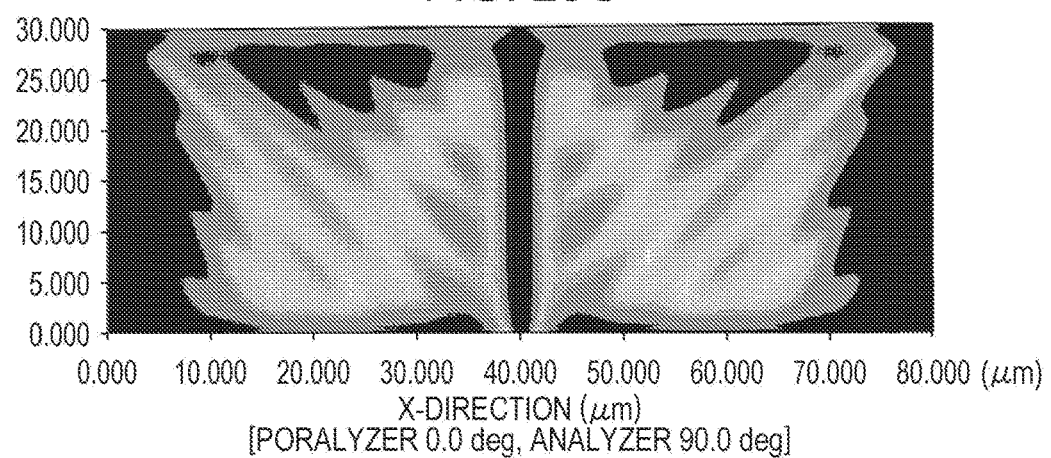
FIG. 29C is an image showing a transmittance simulation result in Example 1-C.

A color filter layer may be formed on the first substrate 20. Specifically, the color filter layer 23 is formed on the TFT layer 30 instead of the flattened layer 22 based on an existing method after the TFT layer 30 is formed on the first substrate 20 as described above. In so doing, a COA (Color Filter On Array) structure can be obtained. Then, a conductive material layer may be formed on the color filter layer 23 including the connection hole 35 after the connection hole 35 is formed on the color filter layer 23 above one of the source/drain electrodes 34 (see FIG. 28B).

Figure 4A:
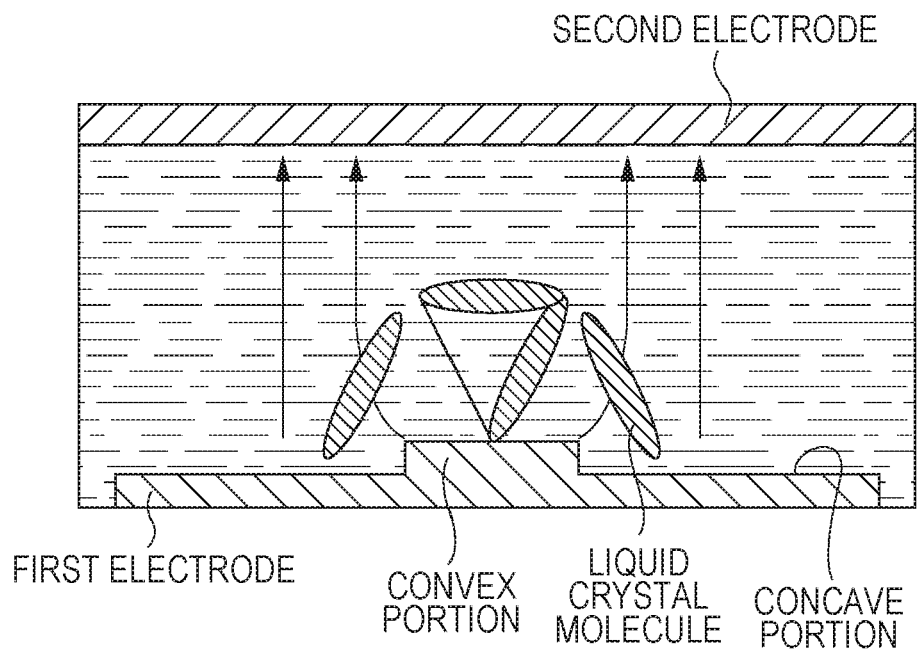
FIG. 4A is a conceptual diagram showing a behavior of liquid crystal molecules in a liquid crystal display device in the related art.
Figure 4B:
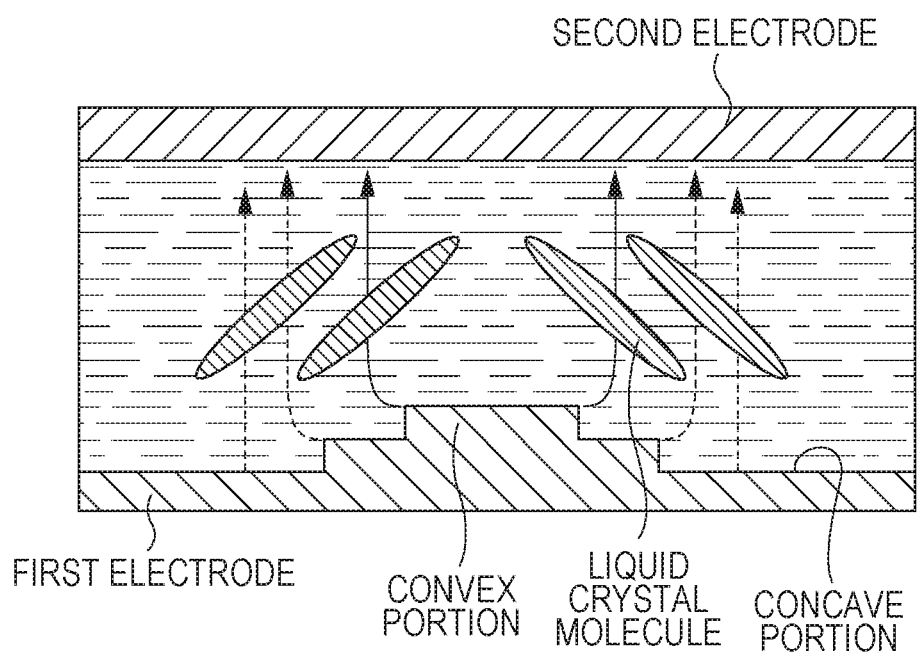
FIG. 4B is a conceptual diagram showing a behavior of liquid crystal molecules in the liquid crystal display device according to Example 1.

In a liquid crystal display device in the related art, a stepped portion is not formed on the convex stem portion. For this reason, orientation regulating force for the liquid crystal molecules at the center portion of the convex stem portion is weak, and a tilt state of the liquid crystal molecules at the center portion of the convex stem portion is not stable as shown in a conceptual diagram in FIG. 4A which shows a behavior of the liquid crystal molecules. On the other hand, since the plurality of stepped portions are formed on the convex stem portion 143 in Example 1 as described above, that is, since the plurality of top surfaces 143A and 143B are formed at the convex stem portion 143, the electric field is the highest at the center portion of the convex stem portion 143, and the electric field is lowered toward the edge portion of the convex stem portion 143. For this reason, it is possible to enhance the orientation regulating force for the liquid crystal molecules at the center portion of the convex stem portion 143 and reliably regulate the tilt state of the liquid crystal molecules at the center portion of the convex stem portion 143 as shown in a conceptual diagram in FIG. 4B which shows a behavior of the liquid crystal molecules. For this reason, it is possible to reliably suppress the occurrence of the problem that a dark line is generated at a part of an image corresponding to the center portion of the convex stem portion 143 during display of the image. That is, it is possible to provide a liquid crystal display device capable of realizing further a uniform high transmittance while maintaining a satisfactory voltage responsive characteristic, reduce the cost of a light source configuring a back light and power consumption, and also enhance reliability of the TFT.

EXAMPLE 2

Figure 5:
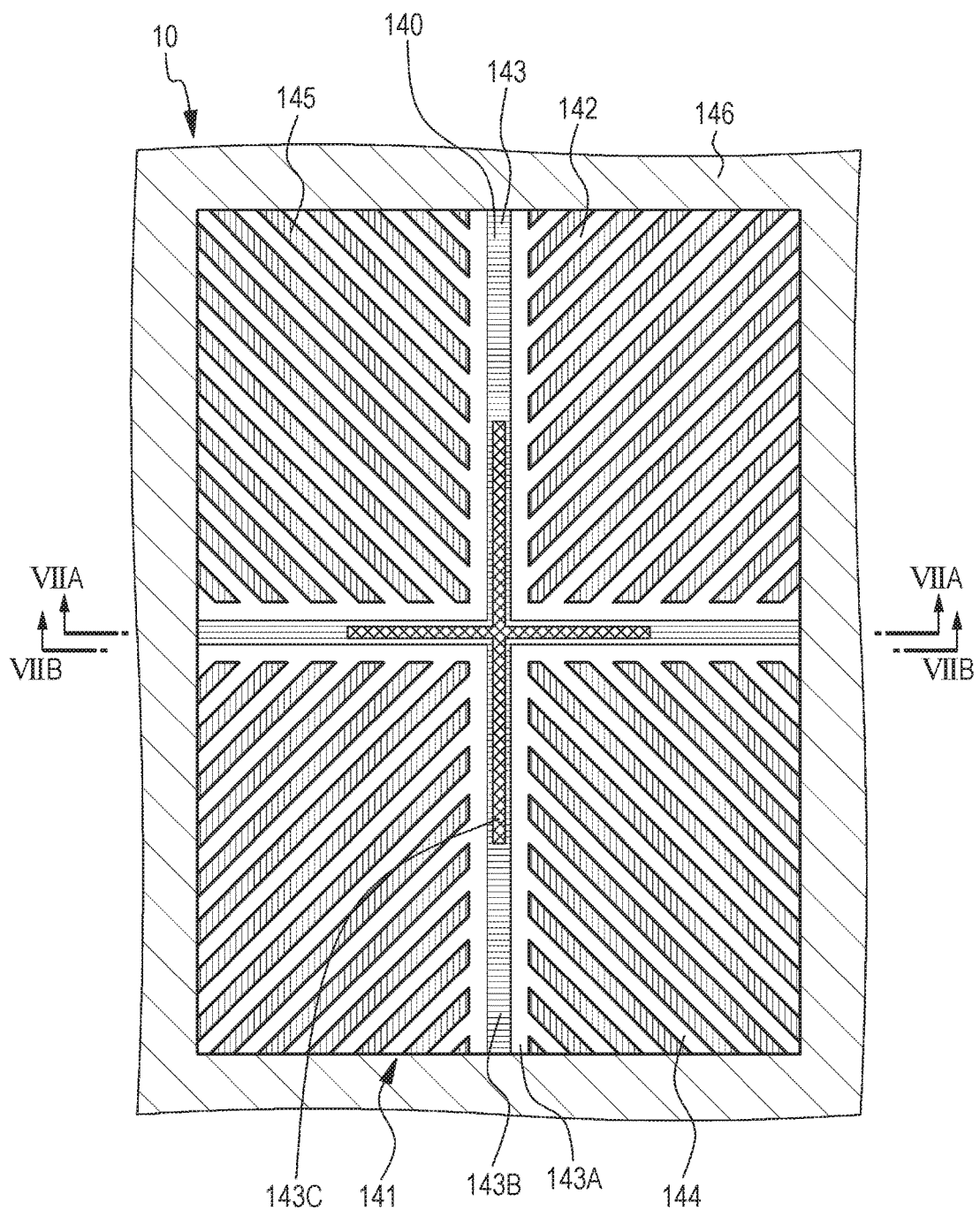
FIG. 5 is a planar view schematically showing a first electrode corresponding to a pixel, which configures a liquid crystal display device according to Example 2.
Figure 7A:
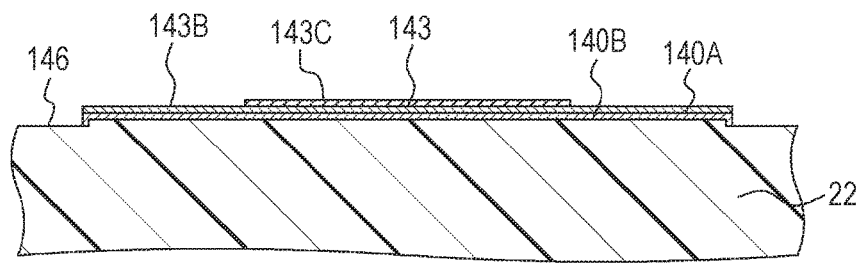
FIG. 7A is a partial cross-sectional view schematically showing the first electrode and the like taken along the arrow VIIA-VIIA in FIG. 5 in the liquid crystal display device according to Example 2.
Figure 7B:
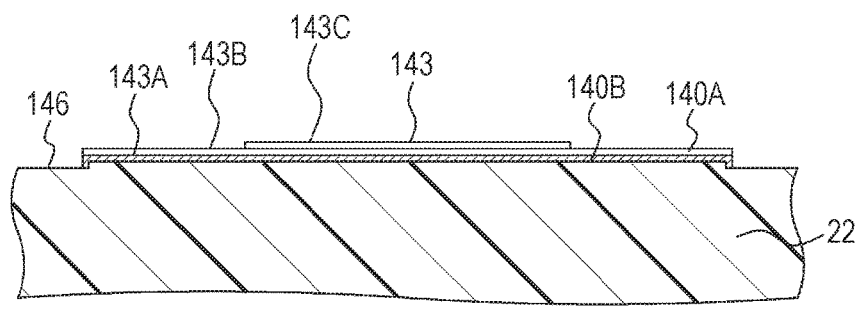
FIG. 7B is a partial cross-sectional view schematically showing the first electrode and the like taken along the arrow VIIB-VIIB in FIG. 5 in the liquid crystal display device according to Example 2.

Example 2 is a modification of Example 1. FIG. 5 is a planar view schematically showing a first electrode corresponding to a pixel configuring a liquid crystal display device according to Example 2. FIGS. 7A and 7B are partial cross-sectional views schematically showing the first electrode and the like taken along the arrow VIIA-VIIA and the arrow VIIB-VIIB in FIG. 5.

In Example 2, a top surface of a convex stem portion 143 is configured by a top surface 143C at a center portion of the convex stem portion 143, a top surface 143B positioned on both sides of the top surface 143C, and a top surface 143A positioned outside the top surface 143B. Three stepped portions are present at the convex stem portion 143 as described above, and when a concave portion 145 is regarded as a reference, the top surface 143A, the top surface 143B, and the top surface 143C are higher in this order. In addition, a cross-sectional shape of the convex stem portion 143 when the convex stem portion 143 is cut by a virtual vertical plane which is in parallel with an extending direction of the convex stem portion 143 is a cross-sectional shape in which the stepped portion declines from the center portion (the top surface 143C) of the cross-sectional shape of the convex stem portion 143 toward an end portion of the cross-sectional shape of the convex stem portion 143 (the top surface 143B and the top surface 143A). In the drawing, the top surface 143C is cross-hatched. A height difference between the top surface 143C and the top surface 143B of the convex stem portion 143 and a height difference between the top surface 143B and the top surface 143A is set to 0.20 micrometers on average. Other specifications of the convex stem portion 143, the branched convex portion 144, and the concave portion 145 are the same as those in Table 1.

Since a configuration and a structure of the liquid crystal display device according to Example 2 can be the same as those of the liquid crystal display device according to Example 1 other than the above points, detailed description thereof will be omitted.

EXAMPLE 3

Figure 6:
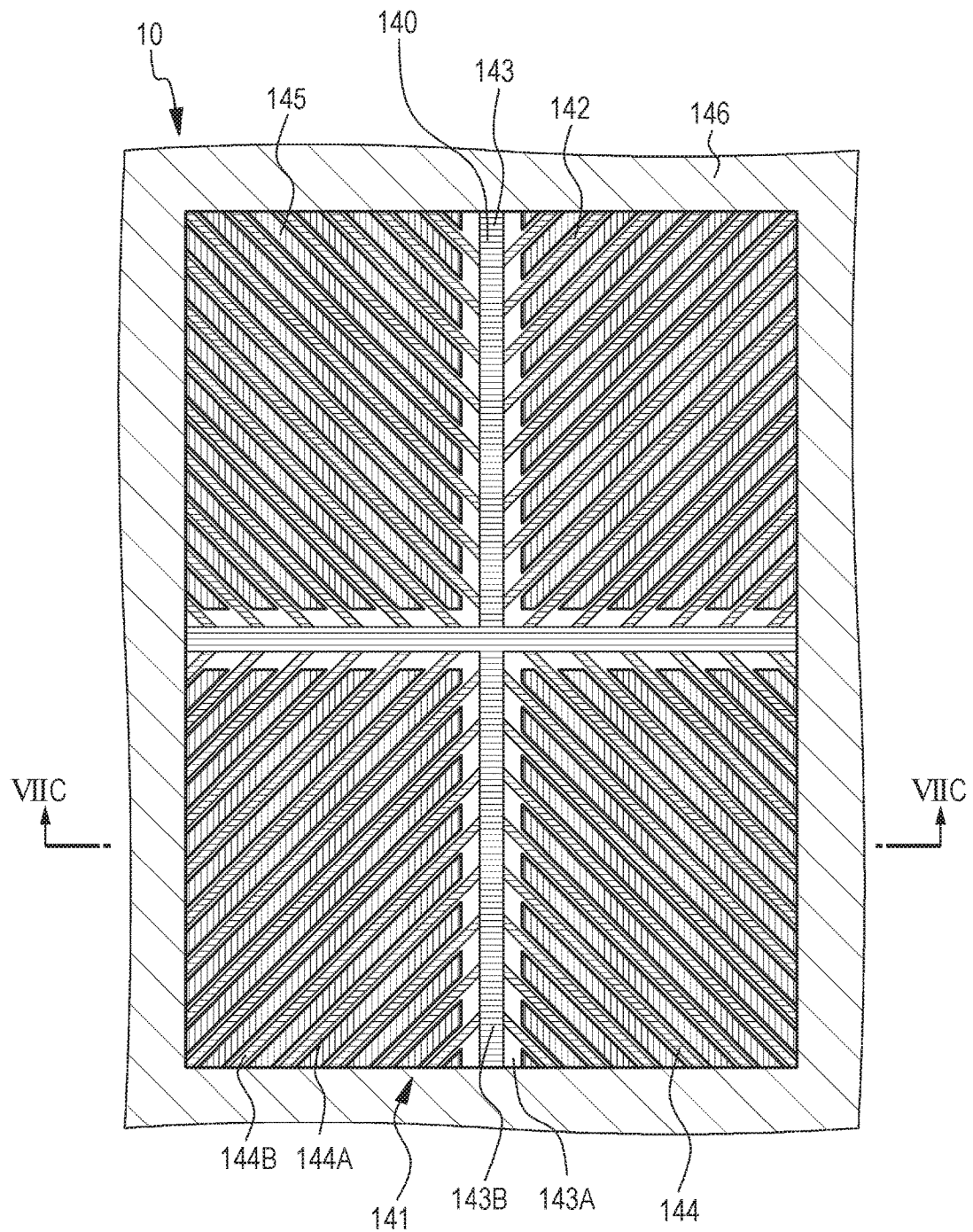
FIG. 6 is a planar view schematically showing a first electrode corresponding to a pixel, which configures a liquid crystal display device according to Example 3.
Figure 7C:
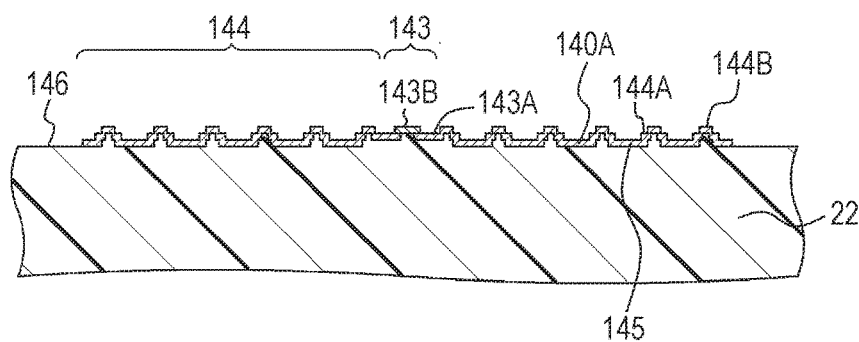
FIG. 7C is a partial end surface view schematically showing the first electrode and the like taken along the arrow VIIC-VIIC in FIG. 6 in the liquid crystal display device according to Example 3.
Figure 7D:
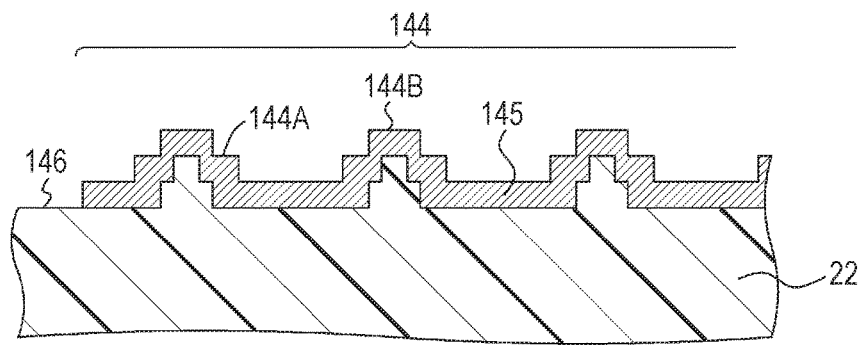
FIG. 7D is a partial end surface view schematically showing a par of FIG. 7C in an enlarged manner.

Example 3 is also a modification of Example 1. FIG. 6 is a planar view schematically showing a first electrode corresponding to a pixel configuring a liquid crystal display device according to Example 3. FIG. 7C is a partial end surface view schematically showing the first electrode and the like taken along the arrow XIIC-XIIC in FIG. 6, and FIG. 7D shows a partial end surface view schematically showing a part of FIG. 7C in an enlarged manner.

Figure 8:
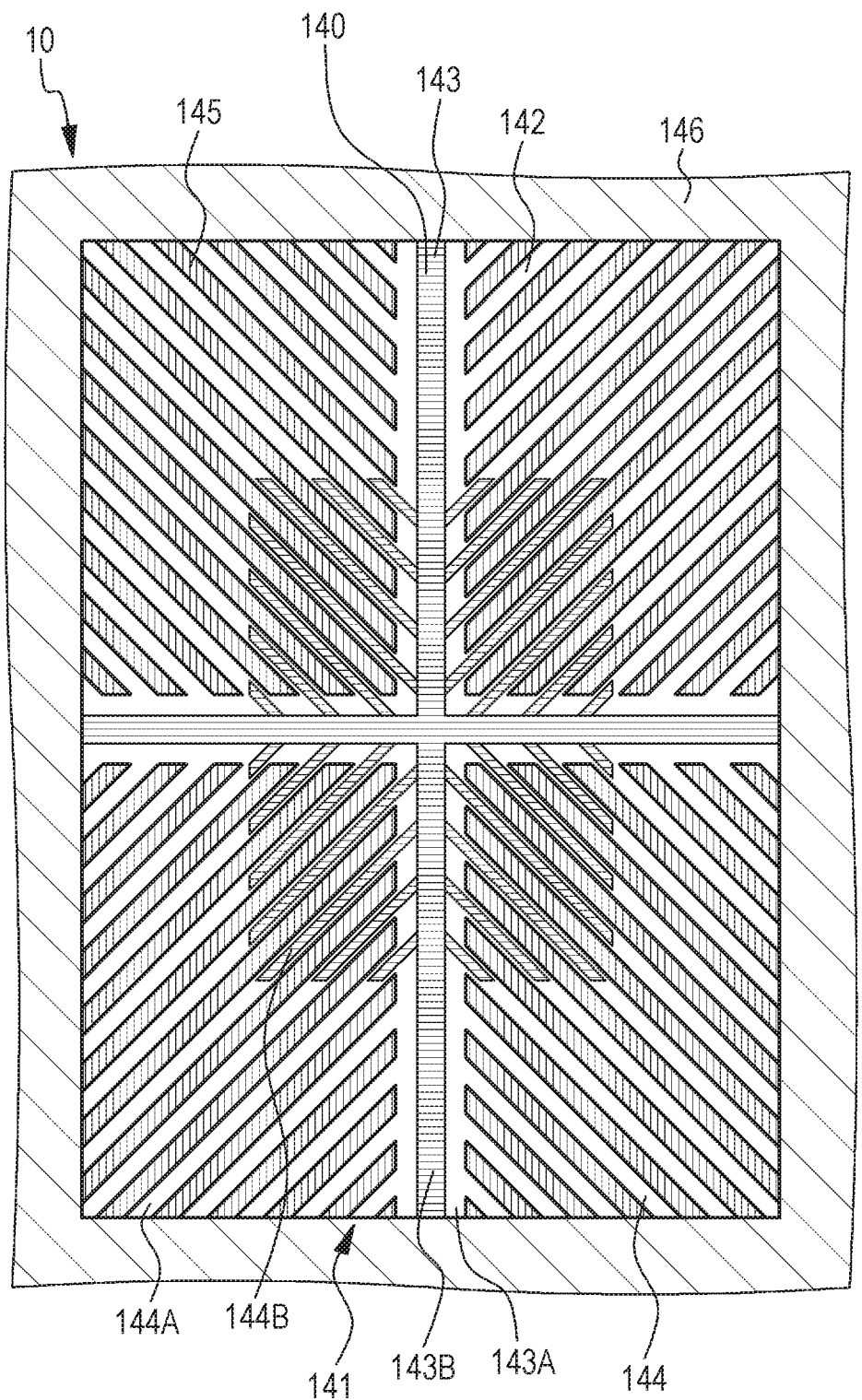
FIG. 8 is a planar view schematically showing a modified example of the first electrode corresponding to a pixel, which configures the liquid crystal display device according to Example 3.
Figure 14:
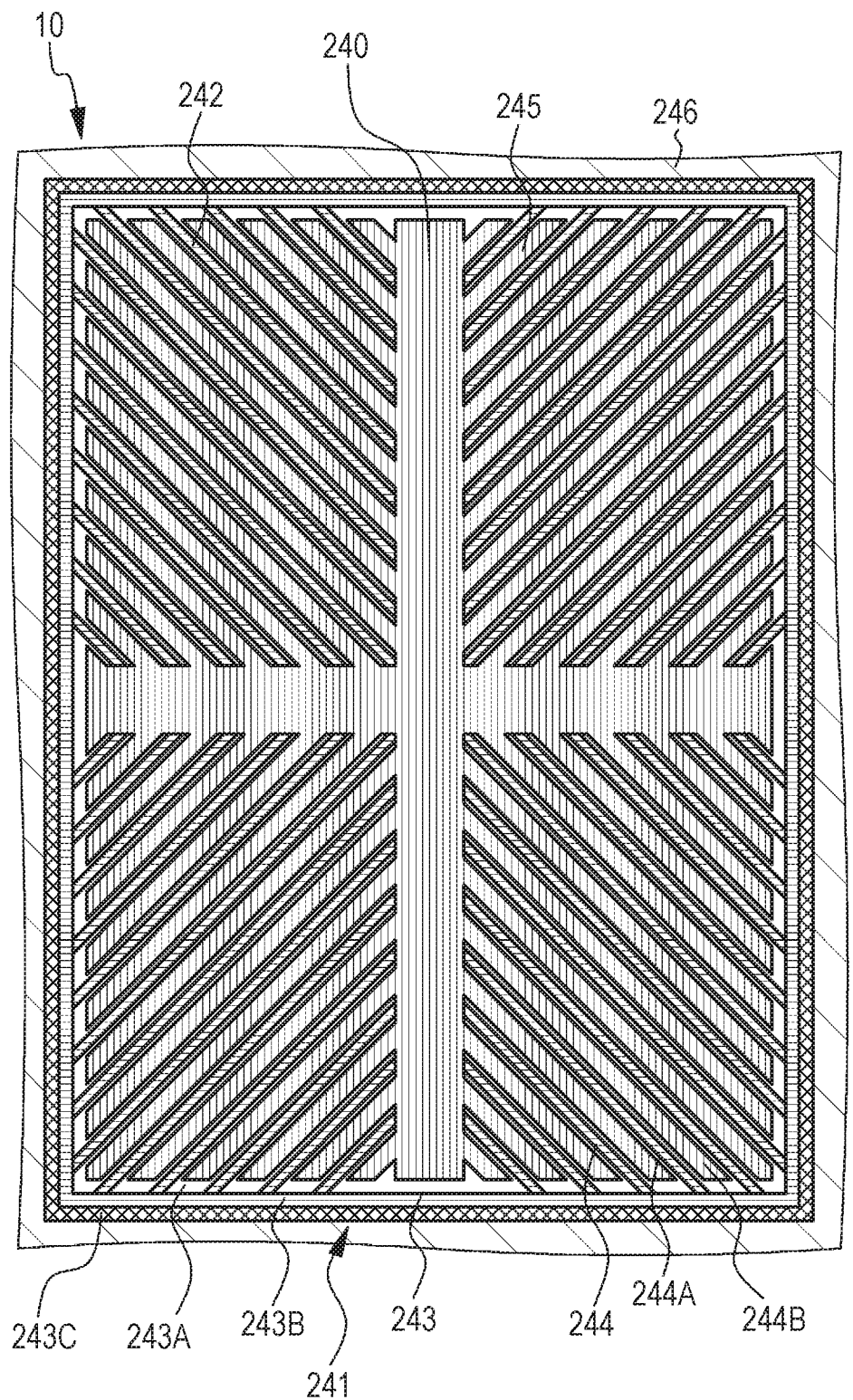
FIG. 14 is a planar view schematically showing a first electrode corresponding to a pixel configuring a liquid crystal display device according to Example 6.

In Example 3, a cross-sectional shape of a branched convex portion 144 when the branched convex portion 144 is cut by a virtual vertical plane which is orthogonal to an extending direction of the branched convex portion 144 is a cross-sectional shape in which the stepped portion declines from the center of the cross-sectional shape of the branched convex portion 144 toward the edge of the cross-sectional shape of the branched convex portion 144. Specifically, a top surface of the branched convex portion 144 is configured by a top surface 144B extending from the convex stem portion 143 and a top surface 144A positioned on both sides of the top surface 144B. Two stepped portions are present at the branched convex portion 144 as described above, and when the concave portion 145 is regarded as a reference, the top surface 144A and the top surface 144B are higher in this order. In the drawing, the top surface 144B is hatched in the horizontal direction. In FIGS. 6, 8, and 14, a boundary between the convex stem portion and the branched convex portion is represented by a solid line. A height difference between the top surface 143B and the top surface 143A of the branched convex portion 144 is set to 0.20 micrometers on average. Other specifications of the convex stem portion 143, the branched convex portion 144, and the concave portion 145 are the same as those in Table 1. The top surface 143B of the convex stem portion 143 and the top surface 144B of the branched convex portion 144 are in the same level.

Since a configuration and a structure of the liquid crystal display device according to Example 3 can be the same as those of the liquid crystal display device according to Example 1 other than the above points, detailed description thereof will be omitted.

Figure 9:
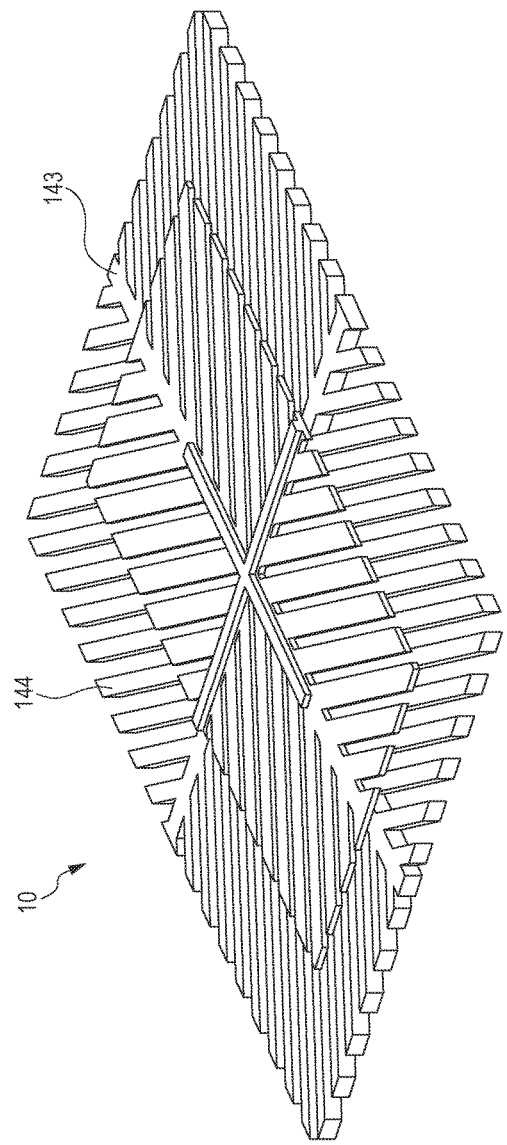
FIG. 9 is a perspective view schematically showing another modified example of the first electrode corresponding to a pixel, which configures the liquid crystal display device according to Example 3.

In addition, the cross-sectional shape of the branched convex portion 144 when the branched convex portion 144 is cut by the virtual vertical plane which is in parallel with the extending direction of the branched convex portion 144 can also be a cross-sectional shape in which the stepped portion declines from the cross sectional shape of the branched convex portion 144 on the side of the convex stem portion toward the end portion of the cross-sectional shape of the branched convex portion 144 as shown in FIG. 8 which is a planar view schematically showing the first electrode corresponding to a pixel configuring the liquid crystal display device. In addition, a combination with the convex stem portion 143 described in Example 2 can also be made as shown in FIG. 9 which is a perspective view schematically showing the first electrode corresponding to a pixel configuring the liquid crystal display device.

EXAMPLE 4

Figure 10:
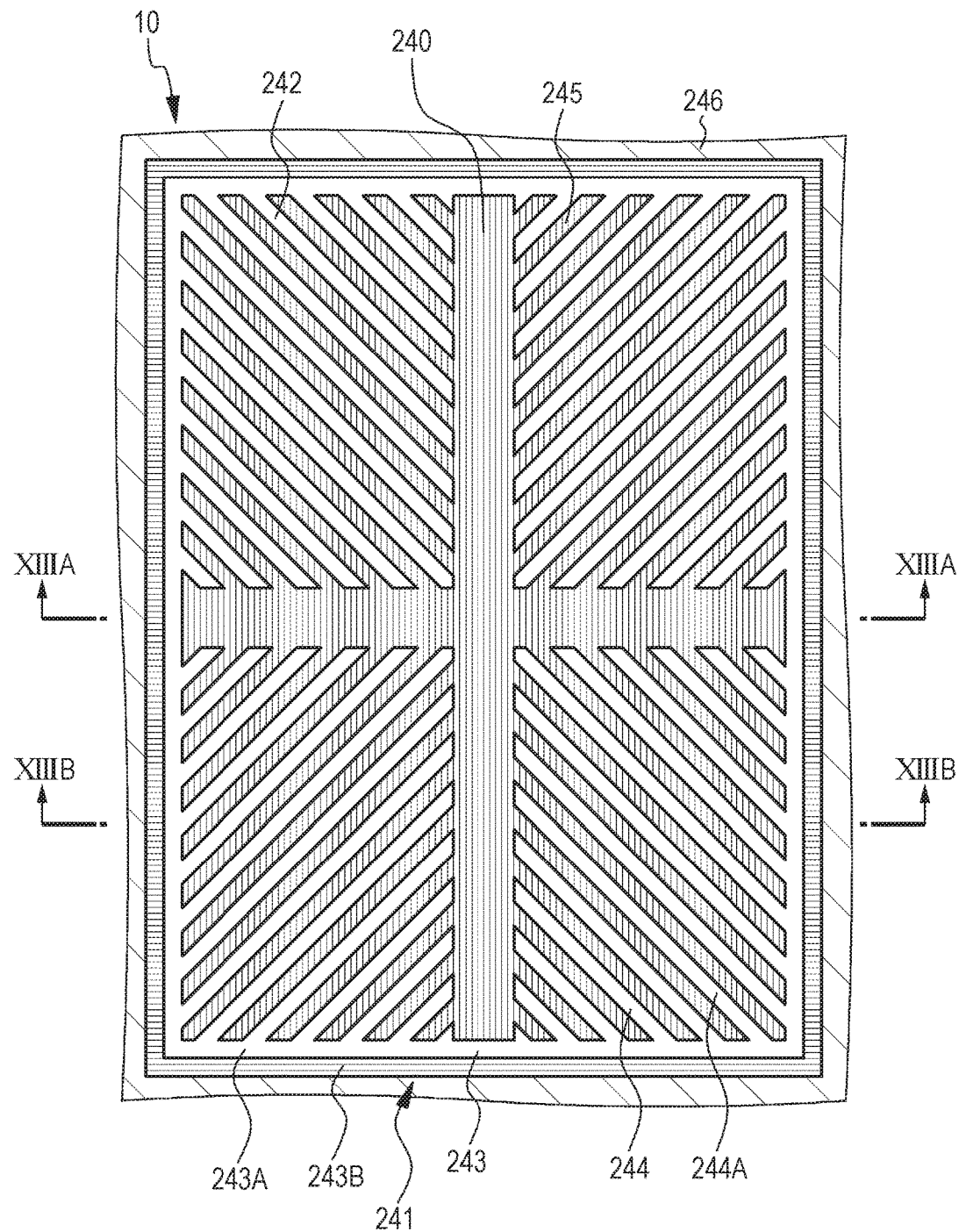
FIG. 10 is a planar view schematically showing a first electrode corresponding to a pixel, which configures a liquid crystal display device according to Example 4.
Figure 11:
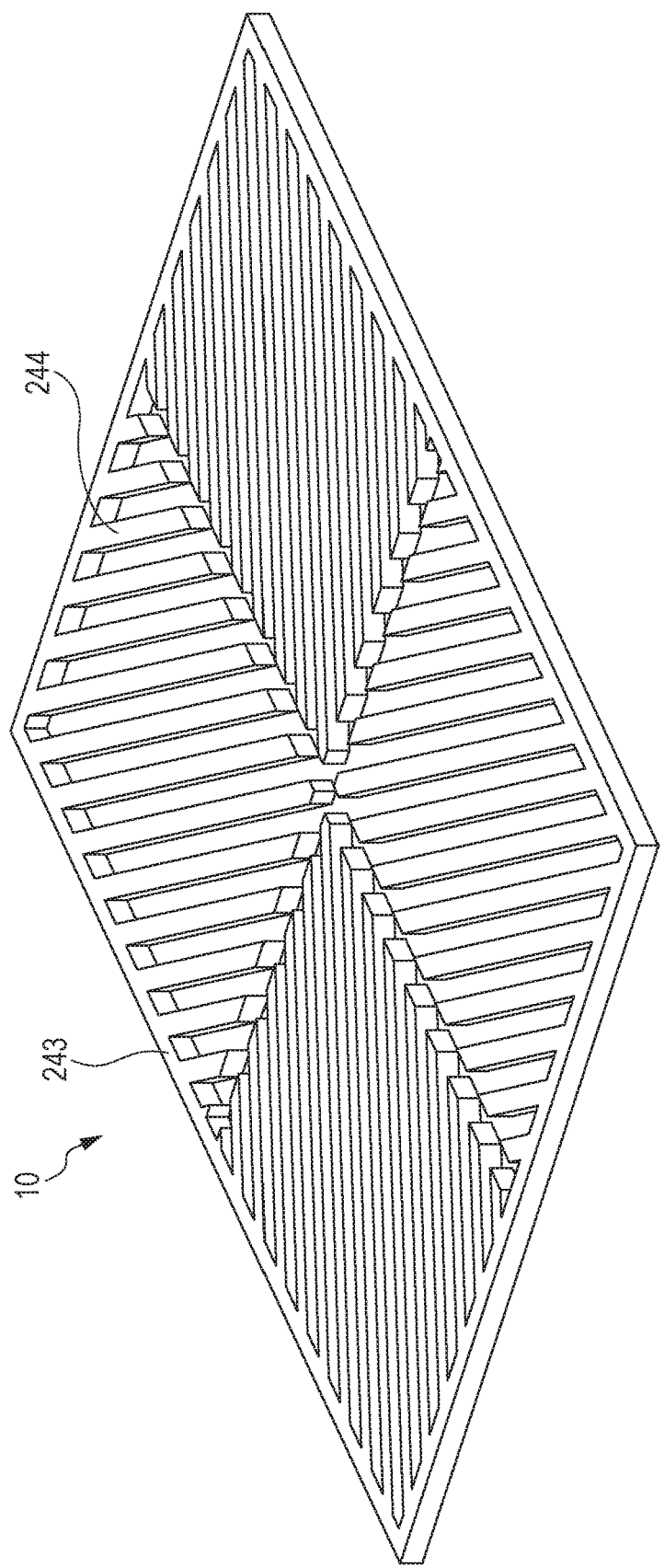
FIG. 11 is a perspective view schematically showing the first electrode corresponding to a pixel, which configures the liquid crystal display device according to Example 4 shown in FIG. 10.
Figure 13A:
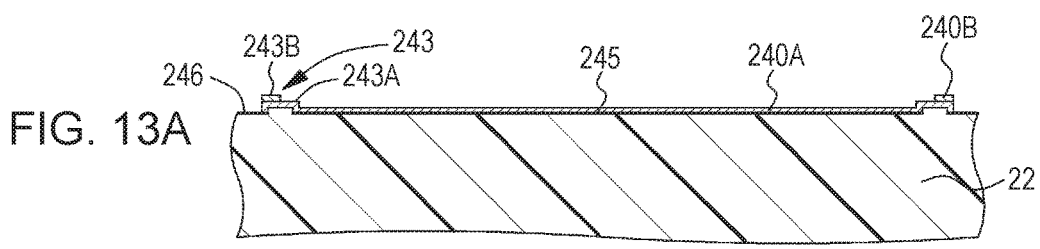
FIG. 13A is a partial end surface view schematically showing a first electrode and the like taken along the arrow XIIIA-XIIIA in FIG. 10 in the liquid crystal display device according to Example 4.
Figure 13B:
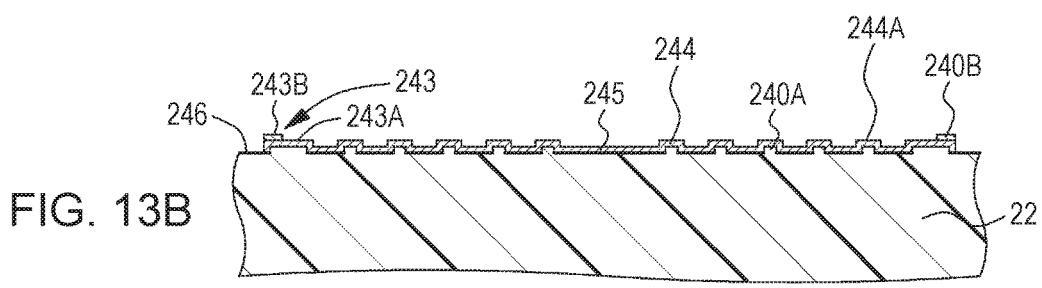
FIG. 13B is a partial end surface view schematically showing the first electrode and the like taken along the arrow XIIIB-XIIIB in FIG. 10 in the liquid crystal display device according to Example 4.
Figure 13C:
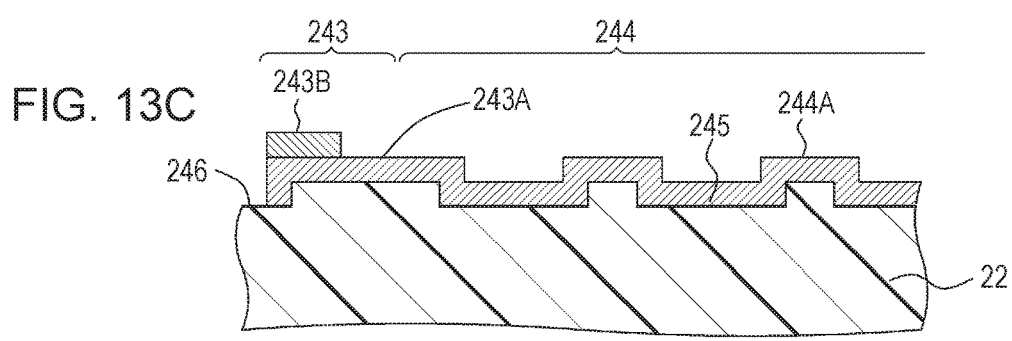
FIG. 13C is a partial end surface view schematically showing a part of FIG. 13B in an enlarged manner.
Figure 13D:
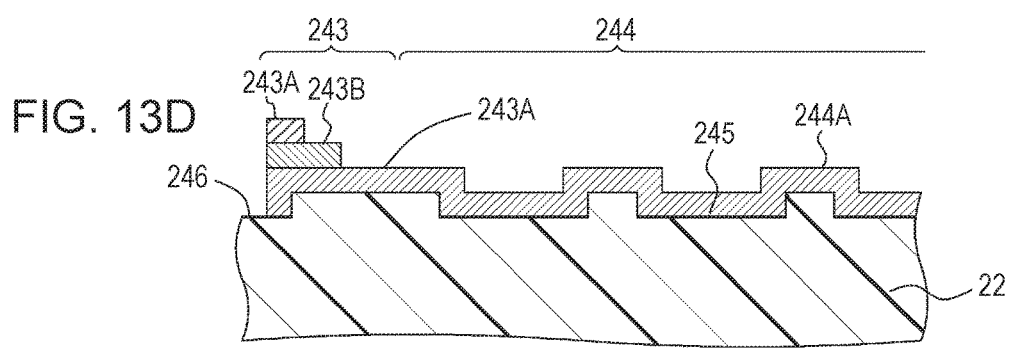
FIG. 13D is a partial end surface view schematically showing a part of a first electrode taken along the arrow XIIID-XIIID in FIG. 12 in the liquid crystal display device according to Example 5 in an enlarged manner.

Although Example 4 is also a modification of Example 1, Example 4 relates to a liquid crystal display device according to Mode 1-B of the present disclosure. FIG. 10 is a planar view schematically showing a first electrode corresponding to a pixel configuring the liquid crystal display device according to Example 4, and FIG. 11 is a perspective view schematically showing the same. FIGS. 13A and 13B are partial end surface views schematically showing the first electrode and the like taken along the arrow XIIIA-XIIIA and the arrow XIIIB-XIIIB in FIG. 10, and FIG. 13C is a partial end surface view schematically showing a part of FIG. 13B in an enlarged manner.

Even in the liquid crystal display device according to Example 4, a plurality of concave and convex portions 241 (convex portions 242 and concave portions 245) are formed in a first electrode 240, and a plurality of stepped portions are formed on the convex portions 242 included on the first electrode 240. Specifically, in the liquid crystal display device according to Example 4, the concave and convex portions 241 are configured by a convex stem portion (main convex portion) 243 which is formed in a frame shape at a pixel circumferential portion and a plurality of branched convex portions (sub convex portions) 244 which extend from the convex stem portion 243 toward the inside of the pixel. In addition, when an (X, Y) coordinate system in which straight lines in parallel with the pixel circumferential portion respectively correspond to an X axis and a Y axis is assumed in the liquid crystal display device according to Example 4, the plurality of branched convex portions 244 occupying a first quadrant extend in parallel with a direction in which a value of a Y coordinate increases when a value of an X coordinate increases, the plurality of branched convex portions 244 occupying a second quadrant extend in parallel with a direction in which a value of a Y coordinate increases when a value of an X coordinate decreases, the plurality of branched convex portions 244 occupying a third quadrant extend in parallel with a direction in which a value of a Y coordinate decreases when a value of an X coordinate decreases, and the plurality of branched convex portions 244 occupying a fourth quadrant extend in parallel with a direction in which a value of a Y coordinate decreases when a value of an X coordinate increases.

In addition, a cross-sectional shape of the convex stem portion 243 when the convex stem portion 243 is cut by a virtual vertical plane which is orthogonal to an extending direction of the convex stem portion 243 is a cross-sectional shape in which the stepped portion declines from an outer edge of the cross-sectional shape of the convex stem portion 243 toward an inner edge of the cross-sectional shape of the convex stem portion. Specifically, a top surface of the convex stem portion 243 is configured by a top surface 243B in the vicinity of the outer edge of the convex stem portion 243 and a top surface 243A in the vicinity of the inner edge. Two stepped portions are present at the convex stem portion 243 as described above, and when a concave portion 245 is regarded as a reference, the top surface 243A and the top surface 243B are higher in this order. In addition, a top surface of the branched convex portion 244 will be referred to as a reference numeral 244A, and the top surface 243A of the convex stem portion 243 and the top surface 244A of the branched convex portion 244 are in the same level. In the drawing, the top surface 243B of the convex stem portion 243 is hatched in the horizontal direction, and the concave portion 245 is hatched in the vertical direction. A shape of the concave portion 245 positioned at the center potion of the pixel is substantially a cross shape. Specifications of the convex stem portion 243, the branched convex portion 244, and the concave portion 243 are as shown in Table 4 below.

[Table 4]

Height Difference between Top Surface 243B and Top Surface 243A of Convex Stem Portion 243: 0.20 micrometers on Average Height Difference between Top Surface 243A of Convex Stem Portion 243 and Concave Portion 245: 0.20 micrometers on Average Height Difference between Top Surface 244A of Branched Convex Portion 244 and Concave Portion 245: 0.20 micrometers on Average Width of Convex Stem Portion 243 (Width of Top Surface 243A of Convex Stem Portion 243): 8.0 micrometers Width of Top Surface 243B of Convex Stem Portion 243: 4.0 micrometers Width of Branched Convex Portion 244 (Width of Top Surface 244A of Branched Convex Portion 244): 2.5 micrometers Interval between Branched Convex Portion 244 and Branched Convex Portion 244 (Space): 2.5 micrometers Width of Cross-Shaped Concave Portion Provided at Center Portion of Pixel: 4.0 micrometers Since a configuration and a structure of the liquid crystal display device according to Example 4 can be the same as those of the liquid crystal display device according to Example 1 other than the above points, detailed description thereof will be omitted.

Since the plurality of stepped portions are formed on the convex stem portion 243 in Example 4, the electric field is the highest at the outer edge portion of the convex stem portion 243, and the electric field is lowered toward the inner edge portion of the convex stem portion 243. As a result, it is possible to enhance the orientation regulating force for the liquid crystal molecules at the convex stem portion 243 and reliably define the tilt state of the liquid crystal molecules at the convex stem portion 243. For this reason, it is possible to reliably suppress the occurrence of the problem that a dark line is generated at a part of an image corresponding to the convex stem portion 243 during display of the image. That is, it is possible to provide a liquid crystal display device capable of realizing further uniform high transmittance while maintaining a satisfactory voltage responsive characteristic, reduce the cost of a light source configuring a back light and power consumption, and also enhance reliability of the TFT.

EXAMPLE 5

Figure 12:
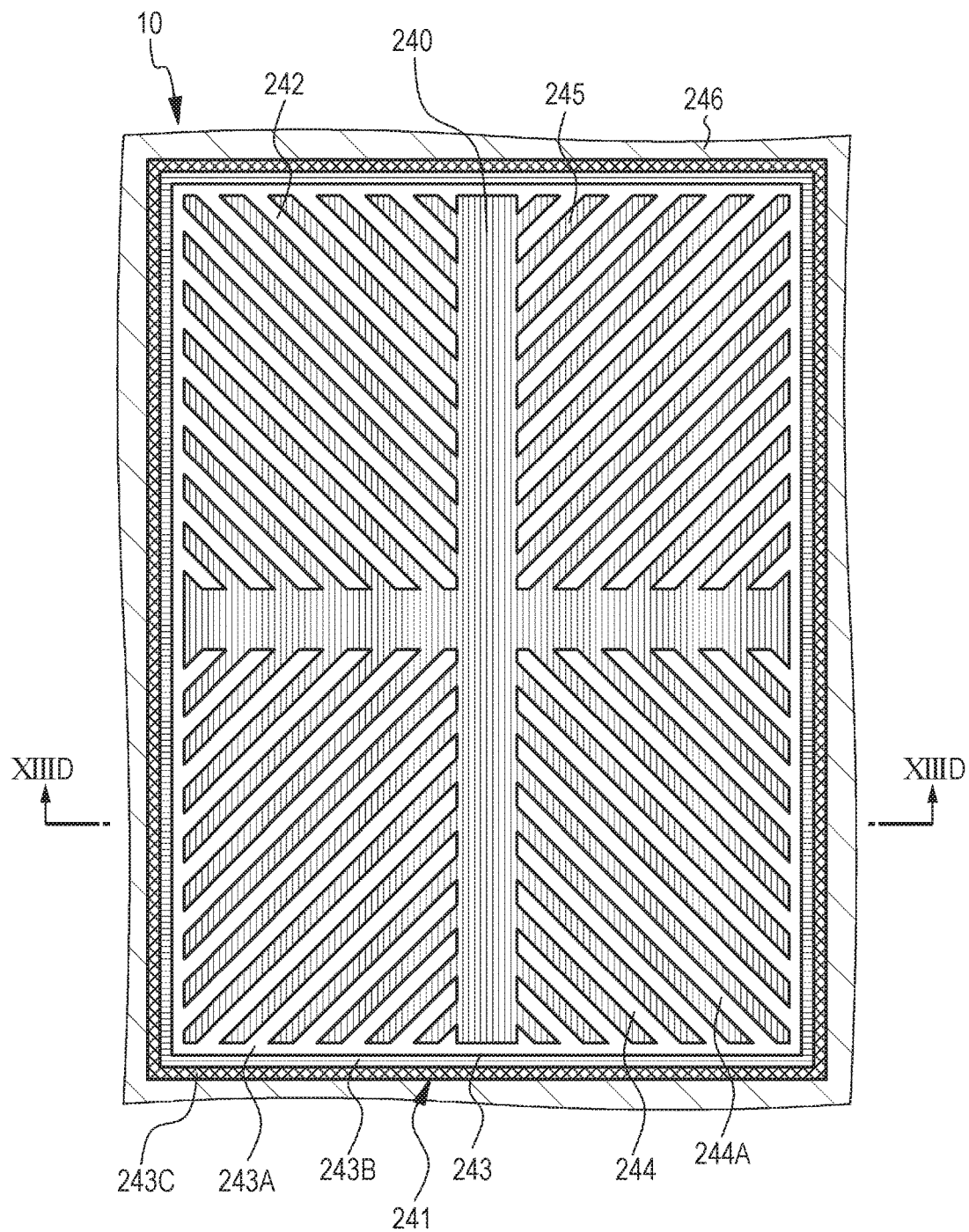
FIG. 12 is a planar view schematically showing a first electrode corresponding to a pixel, which configures a liquid crystal display device according to Example 5.

Example 5 is a modification of Example 4. FIG. 12 is a planar view schematically showing a first electrode corresponding a pixel configuring a liquid crystal display device according to Example 5, and FIG. 13 is a partial end surface view schematically showing the first electrode taken along the arrow XIIID-XIIID in FIG. 12.

In Example 5, a top surface of a convex stem portion 243 is configured by a top surface 243C in the vicinity of an outer edge of the convex stem portion 243 and a top surface 243B and a top surface 243A located toward an inner edge. Three stepped portions are present at the convex stem portion 243 as described above, and when a concave portion 245 is regarded as a reference, the top surface 243A, the top surface 243B, and the top surface 243C are higher in this order. In the drawing, the top surface 243C is cross-hatched. A height difference between the top surface 243C and the top surface 243B and a height difference between the top surface 243B and the top surface 243A of the convex stem portion 243 are set to 0.20 micrometers on average. Other specifications of the convex stem portion 243, the branched convex portion 244, and the concave portion 245 are the same as those in Table 4.

Since a configuration and a structure of the liquid crystal display device according to Example 5 can be the same as those of the liquid crystal display device according to Example 4 other than the above points, detailed description thereof will be omitted.

EXAMPLE 6

Example 6 is a modification of Example 5. FIG. 14 is a planar view schematically showing a first electrode corresponding to a pixel configuring a liquid crystal display device according to Example 6.

In Example 6, a cross-sectional shape of a branched convex portion 244 when the branched convex portion 244 is cut by a virtual vertical plane which is orthogonal to an extending direction of the branched convex portion 244 is a cross-sectional shape in which a stepped portion declines from the center of the cross-sectional shape of the branched convex portion 244 toward the edge of the cross-sectional shape of the branched convex portion 244. Specifically, a top surface of the branched convex portion 244 is configured by a top surface 244B which extends from a top surface 243B of a convex stem portion 243 and a top surface 244A positioned on both sides of the top surface 244B. In addition, when a concave portion 245 is regarded as a reference, two stepped portions are present at the branched convex portion 244, and the top surface 244A and the top surface 244B are higher in this order. In the drawing, the top surface 244B is hatched in the horizontal direction. A height difference between the top surface 243B and the top surface 243A of the branched convex portion 244 is set to 0.28 micrometers on average. Other specifications of the convex stem portion 243, the branched convex portion 244, and the concave portion 245 are the same as those in Table 4. The top surface 243B of the convex stem portion 243 and the top surface 244B of the branched convex portion 244 are in the same level.

Figure 15:
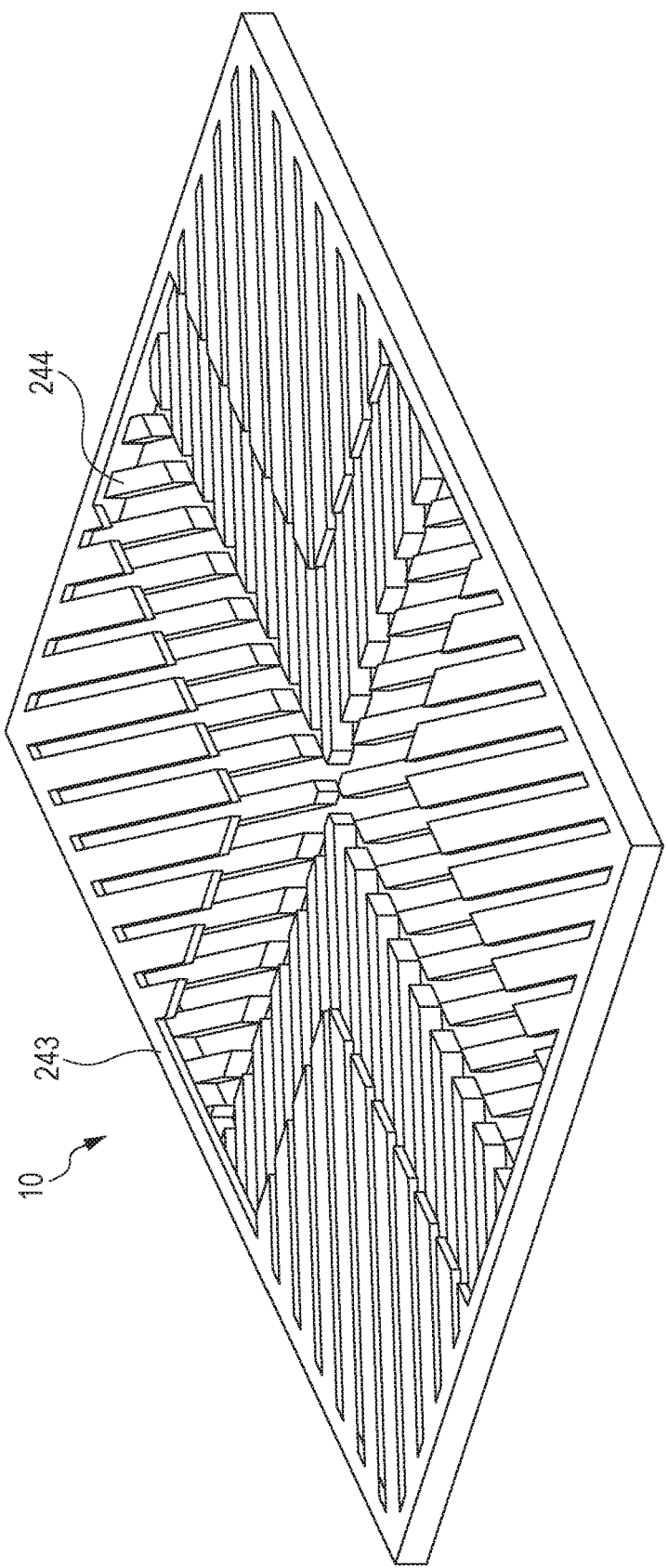
FIG. 15 is a perspective view schematically showing a modified example of a first electrode corresponding to a pixel configuring the liquid crystal display device according to Example 6.

In addition, it is possible to employ a configuration in which the cross-sectional shape of the branched convex portion 244 when the branched convex portion 244 is cut by a virtual vertical plane which is in parallel with an extending direction of the branched convex portion 244 is a cross-sectional shape in which the stepped portion declines from the cross-sectional shape of the branched convex portion 244 on the side of the convex stem portion toward the end portion of the cross-sectional shape of the branched convex portion 244 as in FIG. 15 which is a perspective view schematically showing a modified example of the first electrode corresponding to a pixel configuring the liquid crystal display device according to Example 6.

Since a configuration and a structure of the liquid crystal display device according to Example 6 can be the same as those of the liquid crystal display device according to Example 4 other than the above points, detailed description thereof will be omitted. In addition, the top surface of the convex stem portion 243 can be configured by the top surface 243B and the top surface 243A positioned on both sides of the top surface 243B in the same manner as in Example 4.

EXAMPLE 7

Figure 16:
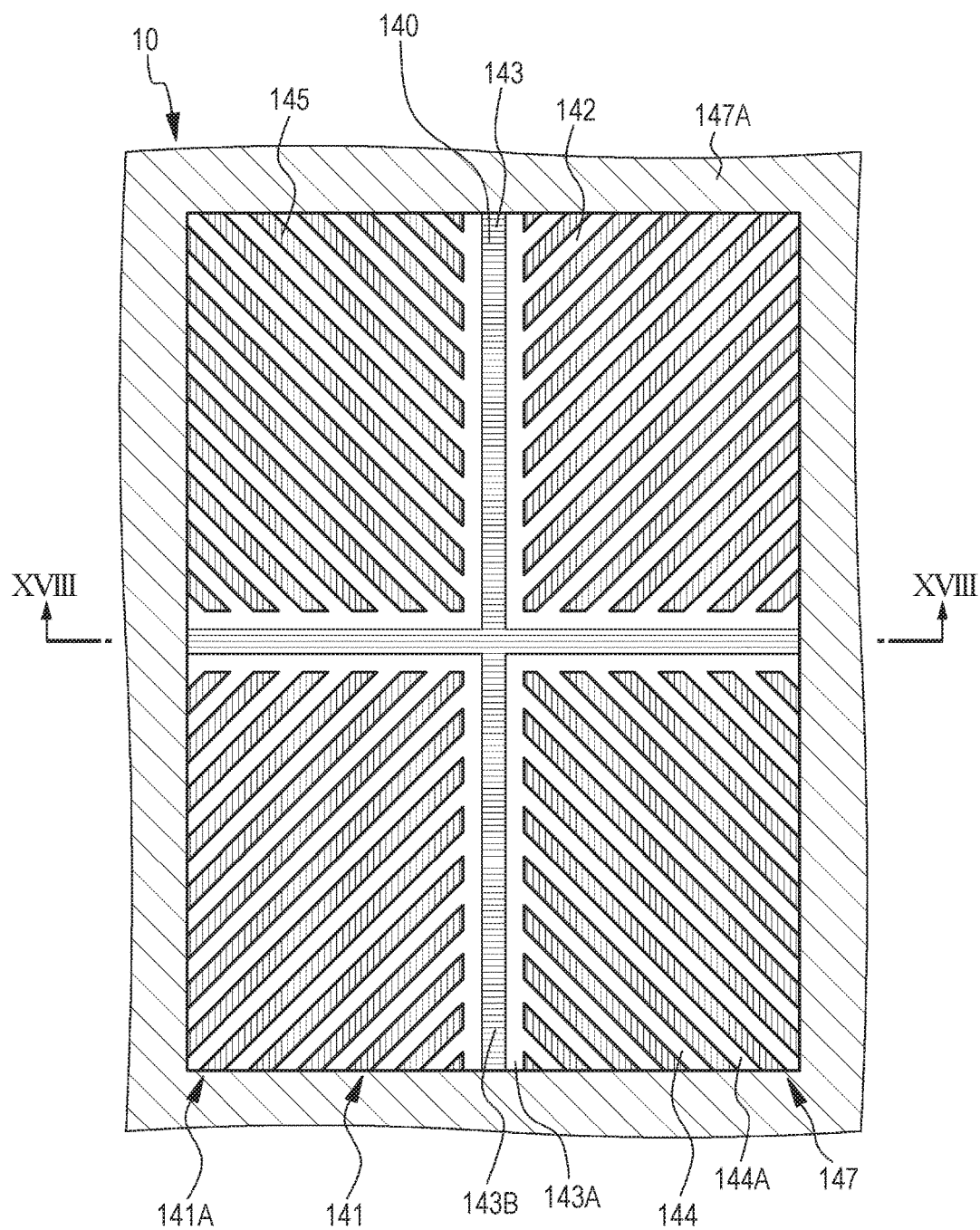
FIG. 16 is a planar view schematically showing a first electrode corresponding to a pixel configuring a liquid crystal display device according to Example 7.
Figure 17:
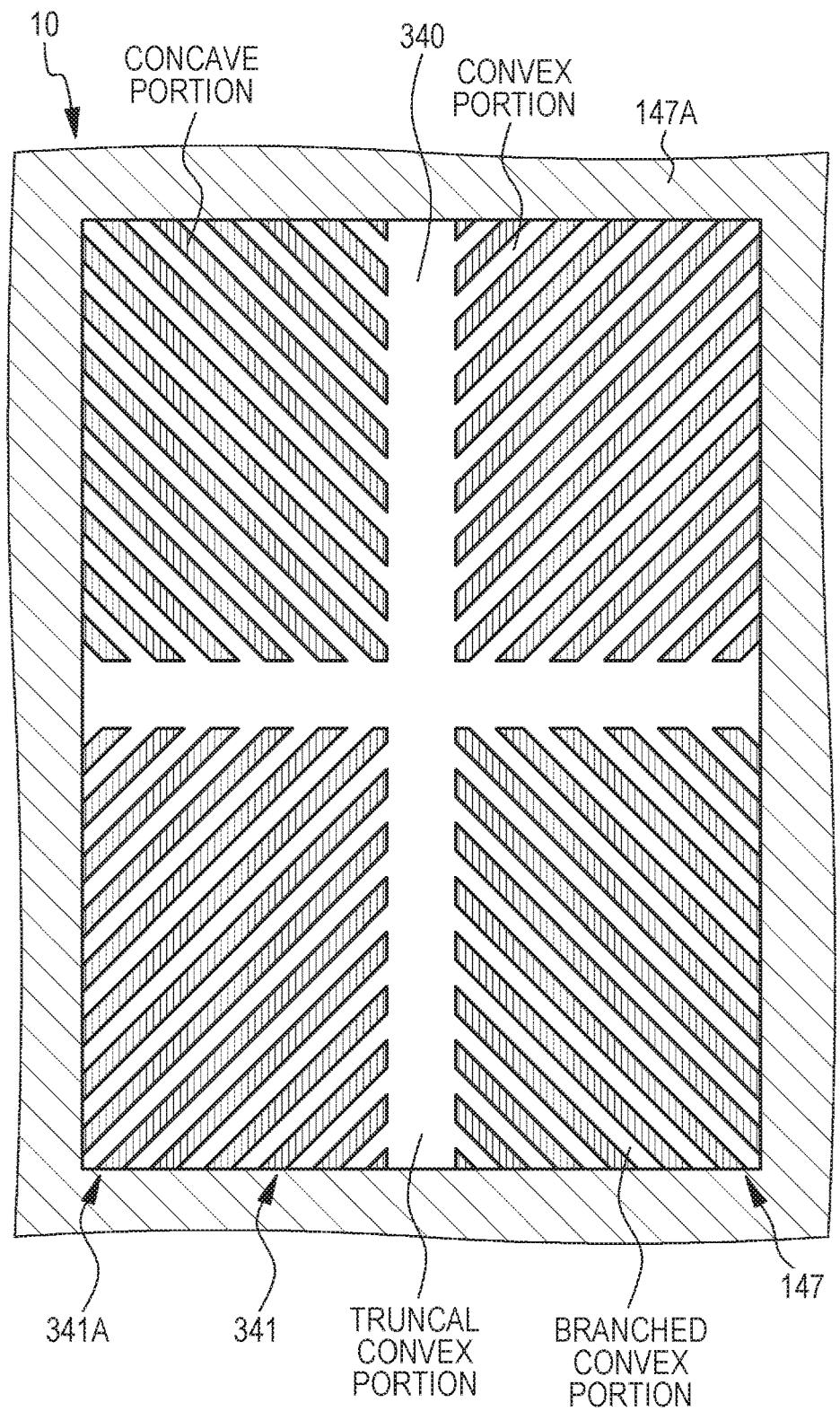
FIG. 17 is a planar view schematically showing a modified example of a first electrode corresponding to a pixel configuring the liquid crystal display device according to Example 7.
Figure 18:
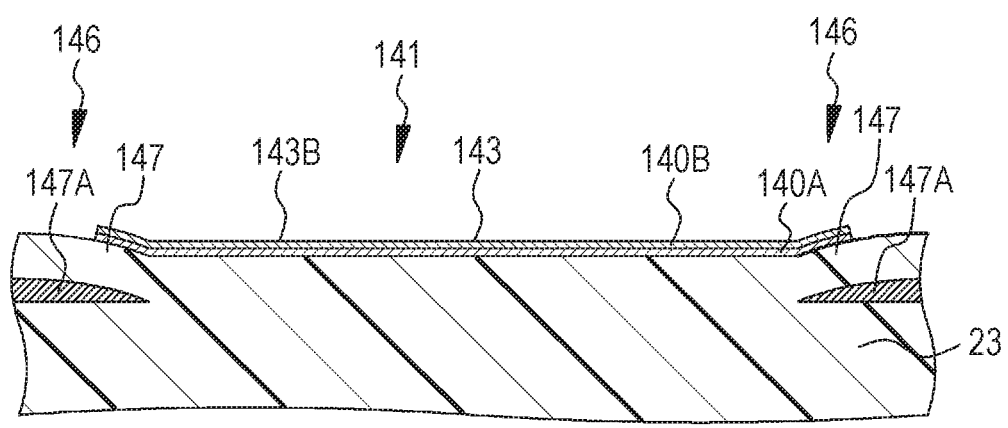
FIG. 18 is a partial cross-sectional view schematically showing the first electrode and the like taken along the arrow XVIIIA-XVIIIB in FIG. 16 in the liquid crystal display device according to Example 7.

Example 7 is a modification of the liquid crystal display devices described in Examples 1 to 6 and relates to a liquid crystal display device according to Mode 2 of the present disclosure. FIG. 16 is a planar view schematically showing a first electrode corresponding to a pixel configuring a liquid crystal display device according to Example 7, and an example shown in FIG. 16 is a modification of Example 1. Alternatively, FIG. 17 is a planar view schematically showing a modified example of the first electrode corresponding to a pixel configuring the liquid crystal display device according to Example 7, and a plurality of stepped portions are not formed in a first electrode 340 while a plurality of concave and convex portions 341 are formed therein. FIG. 18 is a partial cross-sectional view schematically showing the first electrode and the like taken along the arrow XVIIIA-XVIIIA in FIG. 16.

In the liquid crystal display device according to Example 7, a plurality of concave and convex portions 141 and 341 are included on the first electrodes 140 and 340, a convex structure 147 is formed from a part of a first substrate positioned between pixel 10 and a pixel 10 to a part of the first substrate corresponding to a pixel circumferential portion, and circumferential portions 141A and 341A of the concave and convex portions 141 and 341 are formed on the convex structure 147. Specifically, the convex structure 147 is formed based on a black matrix 147A formed on the color filter layer 23. The black matrix 147A is formed of a photo-curable resin to which carbon has been added. In addition, specifications of a convex stem portion 143, a branched convex portion 144, and a convex portion 145 are set as shown in Table 1, and a height difference between a top surface 143B and a top surface 143A of the convex stem portion 143 is set to 0.20 micrometers on average. In addition, heights from a flattened layer 22 to end portions of the concave and convex portions 141 and 341 are 0.3 micrometers on average.

Since the circumferential portions 141A and 341A of the concave and convex portions 141 and 341 are formed on the convex structure 147 in the liquid crystal display device according to Example 7, a further strong electric field is generated in the circumferential portion as compared with a case in which the circumferential portion of the concave and convex portion is flat. As a result, it is possible to enhance the orientation regulating force for liquid crystal molecules in the circumferential portions 141A and 341A of the concave portions 141 and 341 and reliably define the tilt state of the liquid crystal molecules at the circumferential portions 141A and 341A of the concave and convex portions 141 and 341. Therefore, it is possible to maintain a satisfactory voltage responsive characteristic.

In addition, the convex structure is not limited to the configuration in which the convex portion is formed based on the black matrix and can be configured by components of the liquid crystal display device formed on or above the first substrate 20, such as various signal lines, auxiliary capacity electrodes, a gate electrode, source/drain electrodes, and various kinds of wiring. In such a case, it is possible to form the convex structure in the flattened layer 22 due to an influence of a thickness of the components of the liquid crystal display device by optimizing a thickness of the flattened layer 22.

EXAMPLE 8

Figure 19:
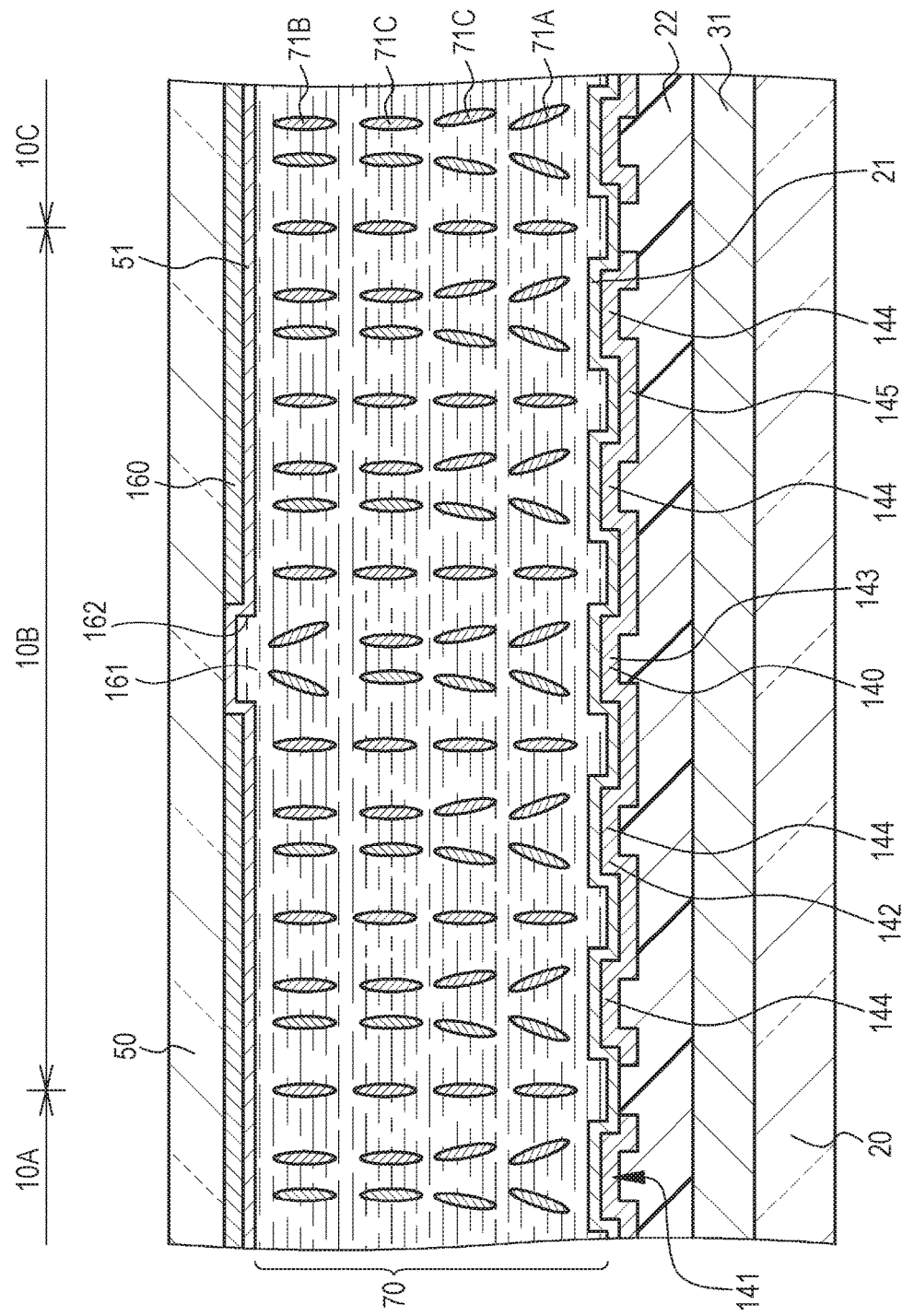
FIG. 19 is a partial end surface view schematically showing a liquid crystal display device according to Example 8.
Figure 20:
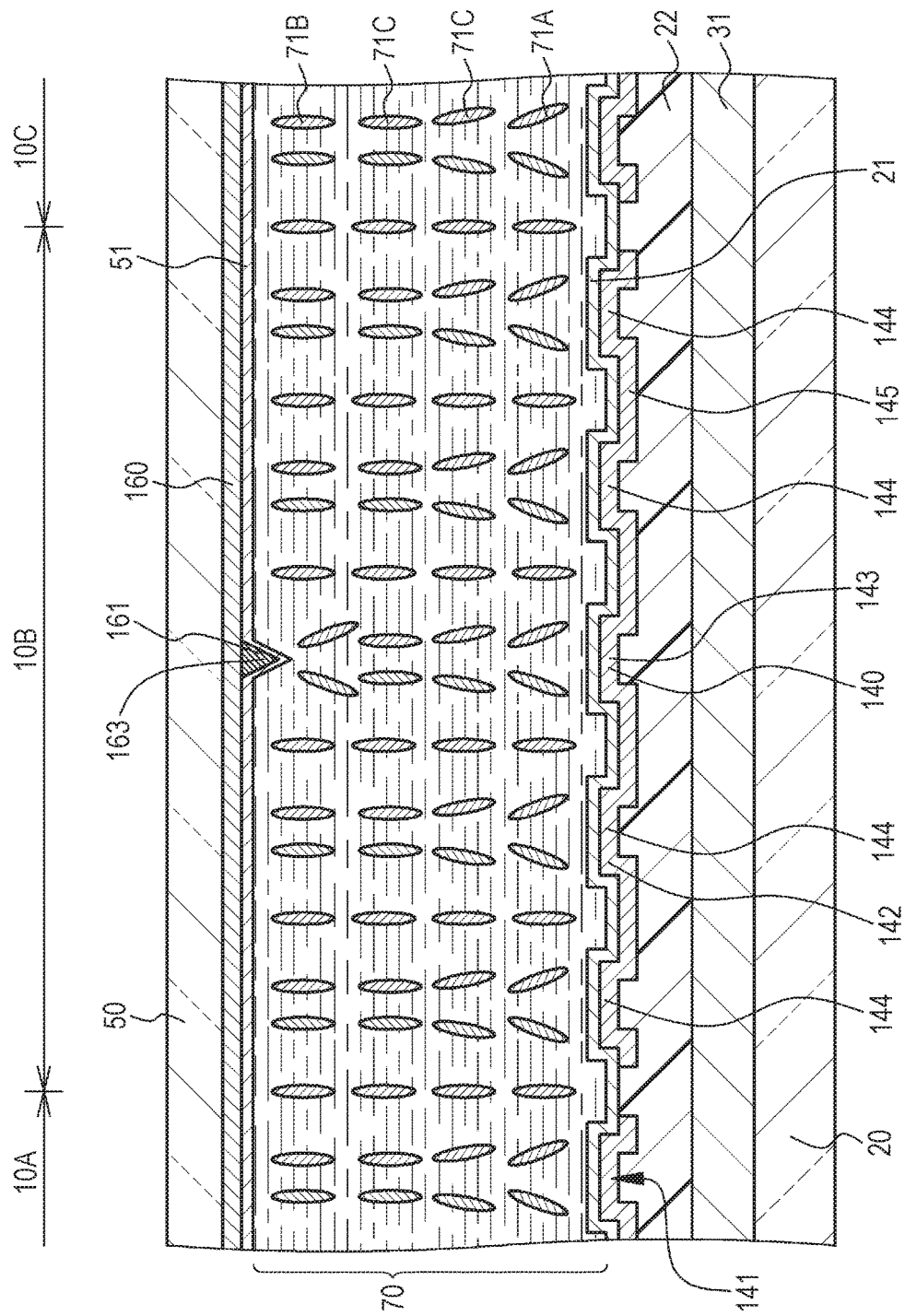
FIG. 20 is a partial end surface view schematically showing a modified example of the liquid crystal display device according to Example 8.
Figure 26B:
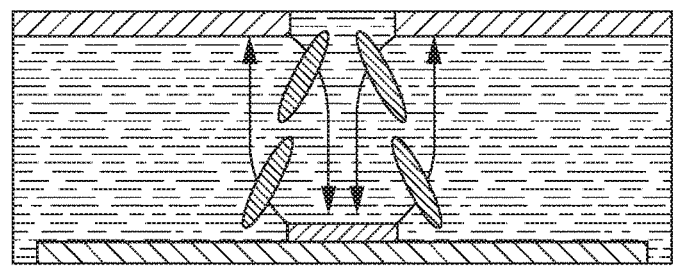
FIG. 26B is a conceptual diagram showing a behavior of the liquid crystal molecules in the liquid crystal display device according to Example 8.

Example 8 relates to a liquid crystal display device according to Mode 3 of the present disclosure and to modifications of Examples 1 to 3 (the liquid crystal display devices according to Mode 1-A of the present disclosure) and a modification of Example 7 (the liquid crystal display device according to Mode 2-A of the present disclosure). FIGS. 19 and 20 are partial end surface views schematically showing a liquid crystal display device according to Example 8. In addition, FIGS. 26B and 26C are conceptual diagrams showing behaviors of liquid crystal molecules in the liquid crystal display device according to Example 8.

In the liquid crystal display device according to Example 8, a plurality of concave and convex portions 141 are formed in a first electrode 140, and the concave and convex portions 141 are configured by convex stem portions 143 which pass through a pixel center portion and extend in a cross shape and a plurality of branched convex portions 144 which extend from the convex stem portions 143 toward a pixel circumferential portion, as shown in FIGS. 2, 5, 6, 8, 9, 16, and 17. In addition, as shown in FIG. 19 or 20, an orientation regulating portion 161 is formed at a part of a second electrode 160 corresponding to the convex stem portions 143.

Figure 26C:
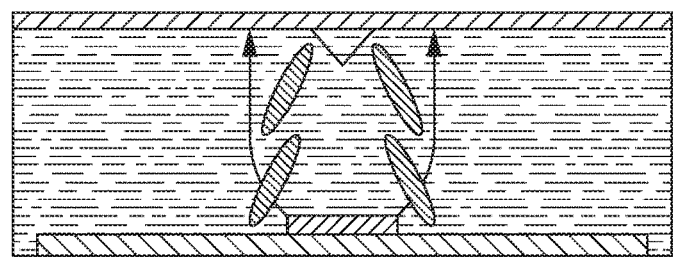
FIG. 26C is a conceptual diagram showing a behavior of the liquid crystal molecules in the liquid crystal display device according to Example 8.

Specifically, the orientation regulating portion 161 is configured by a slit portion 162 with a size of 4.0 micrometers provided at the second electrode 160 (see FIGS. 19 and 26B) or configured by a protruding portion (rib) 163 provided at the second electrode 160 (see FIGS. 20 and 26C). More specifically, the protruding portion 163 is formed of a negative photoresist material (Optmer AL manufactured by JSR Corporation) with a width of 1.4 micrometers and a height of 1.2 micrometers. In addition, specifications of the convex stem portion 143, the branched convex portion 144, and the concave portion 145 are set as shown in Table 1 below, and a height difference between a top surface 143B and a top surface 143A of the convex stem portion 143 is set to 0.20 micrometers on average. A planar shape of the slit portion 162 or the protruding portion (rib) 163 is a cross shape, and a cross-sectional shape of the protruding portion 163 is an isosceles triangle. The second electrode 160 is not formed on the slit portion 162 or the protruding portion 163.

A characteristic of the liquid crystal display device shown in FIG. 19 (see FIG. 17 for a planar view schematically showing a modified example of the first electrode corresponding to a pixel), which includes the orientation regulating portion 161 configured by the slit portion 162 with a size of 4.0 micrometers provided in the second electrode 160, was evaluated, and a result shown in Table 3 was obtained. In addition, the liquid crystal display devices according to Example 8 and Comparative Example exhibited similar responsive speeds.

Since the orientation regulating portion 161 configured by the slit portion 162 is formed at a part of the second electrode 160 corresponding to the convex stem portions 143 in the liquid crystal display device according to Example 8, an electric field generated by the second electrode 160 is deformed in the vicinity of the orientation regulating portion 161. Alternatively, since the orientation regulating portion 161 configured by the protruding portion (rib) 163 is formed, directions in which the liquid crystal molecules lie down in the vicinity of the protruding portion 163 are defined. As a result, it is possible to enhance the orientation regulating force for the liquid crystal molecules in the vicinity of the orientation regulating portion 161 and reliably define the tilt state of the liquid crystal molecules in the vicinity of the orientation regulating portion 161. For this reason, it is possible to reliably suppress an occurrence of a problem that a dark line is generated at a part of an image corresponding to the convex stem portions during display of the image. That is, it is possible to provide a liquid crystal display device capable of realizing further uniform high transmittance while maintaining a satisfactory voltage responsive characteristic, reduce the cost of a light source configuring a back light and power consumption, and also enhance reliability of the TFT. In addition, the orientation regulating portion 161 can be configured by a part of the second electrode 160 in a protruding shape.

EXAMPLE 9

Figure 21:
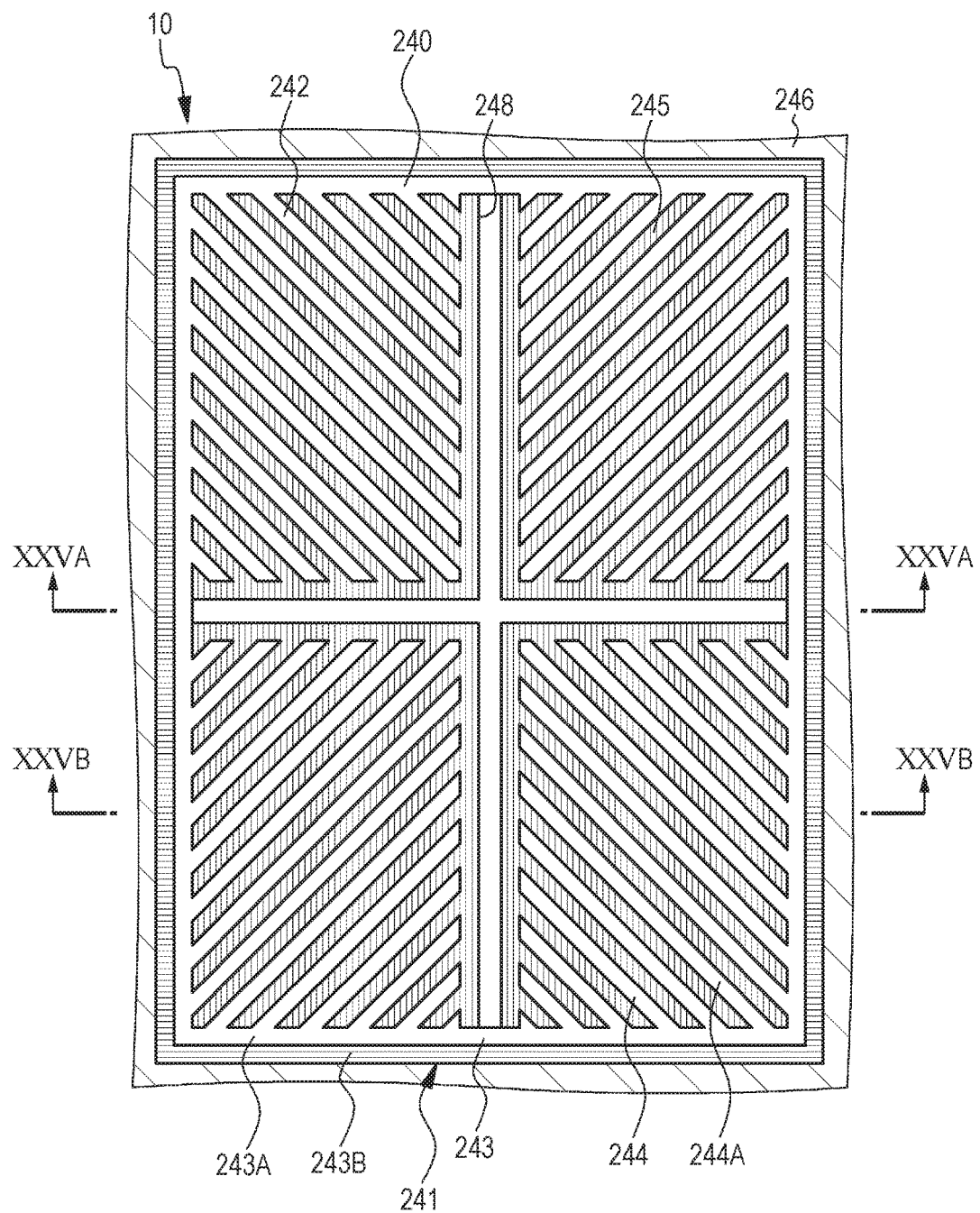
FIG. 21 is a planar view schematically showing a first electrode corresponding to a pixel configuring a liquid crystal display device according to Example 9.
Figure 22:
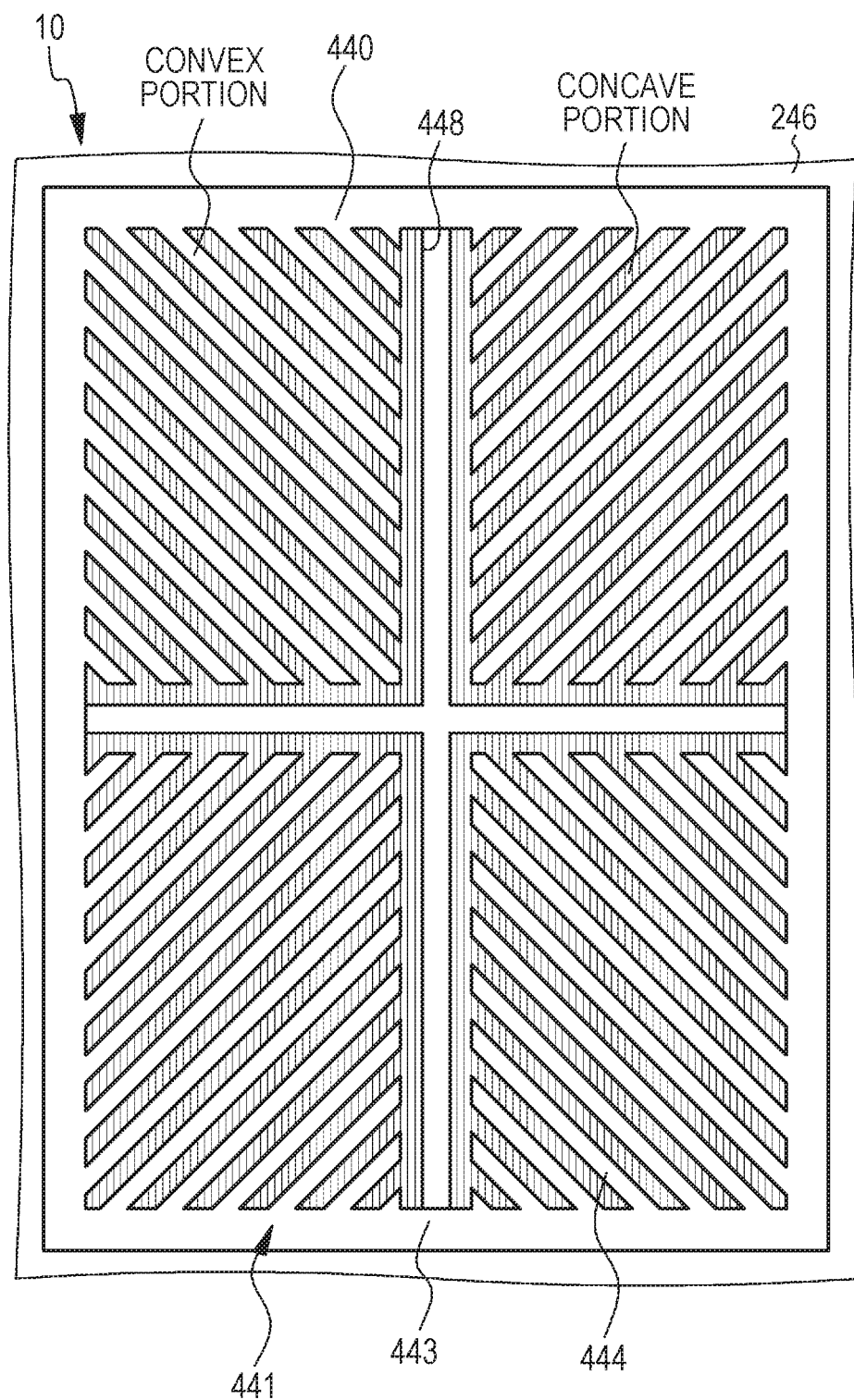
FIG. 22 is a planar view schematically showing a modified example of a first electrode corresponding to a pixel configuring the liquid crystal display device according to Example 9.
Figure 23:
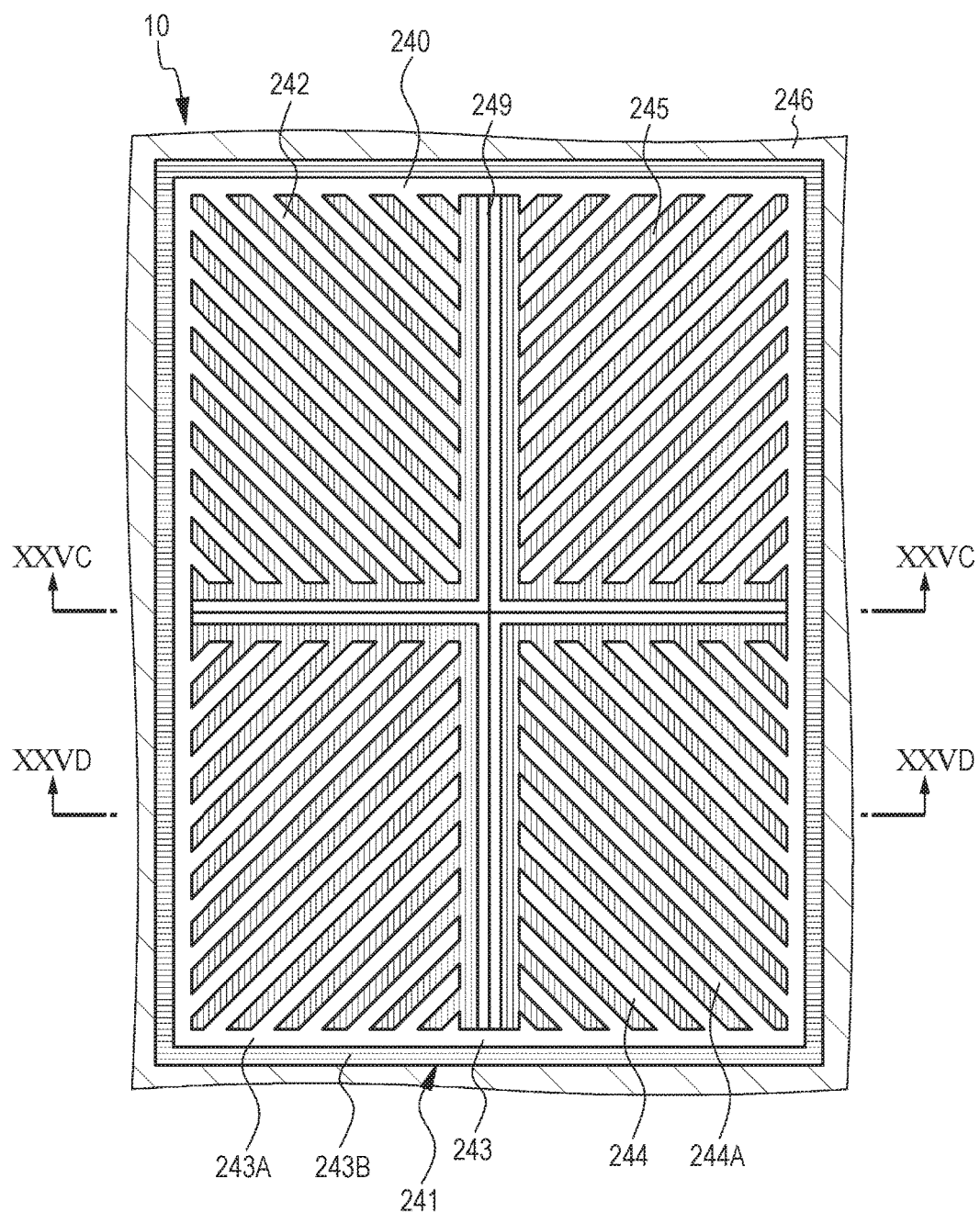
FIG. 23 is a planar view schematically showing another modified example of a first electrode corresponding to a pixel configuring the liquid crystal display device according to Example 9.
Figure 24:
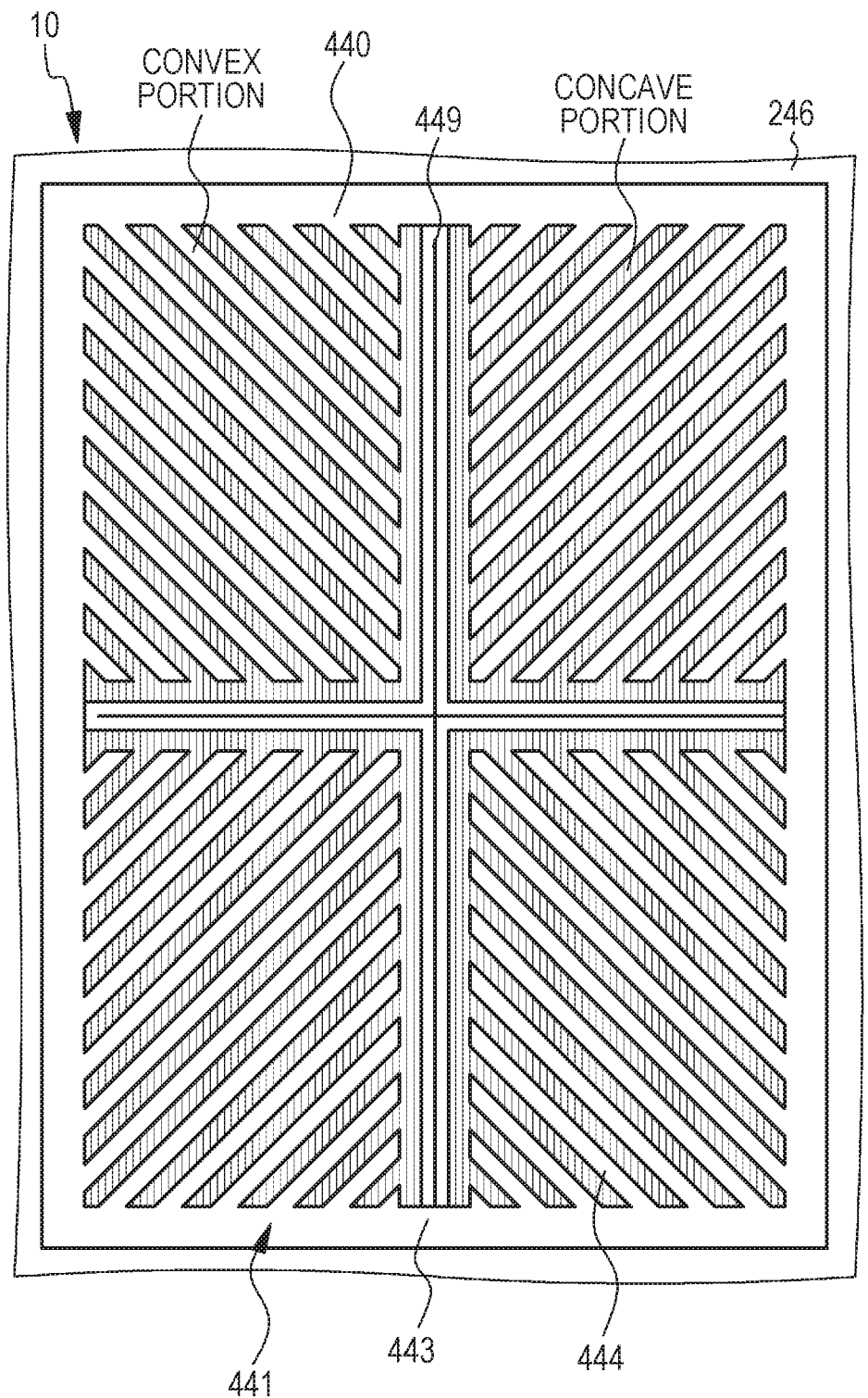
FIG. 24 is a planar view schematically showing a still another modified example of a first electrode corresponding to a pixel configuring the liquid crystal display device according to Example 9.

Example 9 relates to a liquid crystal display device according to Mode 4 of the present disclosure and to modifications of Examples 4 to 6 (the liquid crystal display devices according to Mode 1-B of the present disclosure) and a modification of Example 7 (the liquid crystal display device according to Mode 2-B of the present disclosure). FIGS. 21 and 23 are planer views schematically showing a first electrode corresponding to a pixel configuring a liquid crystal display device according to Example 9, and examples shown in FIGS. 21 and 23 are modifications of Example 4. Alternatively, FIGS. 22 and 24 are planar views schematically showing modified examples of the first electrode corresponding to a pixel configuring the liquid crystal display device according to Example 9, and a plurality of stepped portions are not included on the first electrode 440 while a plurality of concave and convex portions 441 are included thereon in the liquid crystal display device. FIGS. 25A and 25B are partial cross-sectional views schematically showing the first electrode and the like taken along the arrow IIXVA-IIXVA and the arrow IIXVB-IIXVB in FIG. 21, and FIGS. 25C and 25D are partial cross-sectional views schematically showing the first electrode and the like taken along the arrow IIXVC-IIXVC and the arrow IIXVD-IIXVD in FIG. 23.

In the liquid crystal display device according to Example 9, a plurality of concave and convex portions 241 or 441 are formed in a first electrodes 240 or 440, the concave and convex portions 241 or 441 are configured by convex stem portions 243 or 443 formed in a frame shape at a pixel circumferential portion and a plurality of branched convex portions 244 or 444 which extend from the convex stem portions 243 or 443 toward the inside of the pixel. A slit portion 248 or a 448 (see FIGS. 21 and 23) which passes through a pixel center portion and is in parallel with the pixel circumferential portion or a protruding portion (rib) 249 or 449 (see FIGS. 22 and 24) is formed on the first electrode 240 or 440. That is, the slit portion 248 or 448 or the protruding portion 249 or 449 is formed at a part of a cross-shaped concave portion provided at the center portion of the pixel. A planar shape of the slit portion 248 or 448 or the protruding portion 249 or 449 is a cross shape. In addition, specifications of the convex stem portion 243, the branched convex portion 244, and the concave portion 245 are set as shown in Table 4. A width of the slit portion 248 or 448 is set to 4.0 micrometers. In addition, a width of the protruding portion 249 or 449 formed of a negative photoresist material (Optmer AL manufactured by JSR Corporation) is set to 1.4 micrometers, and a height thereof is set to 1.2 micrometers. A cross-sectional shape of the protruding portion 249 or 449 is an isosceles triangle. The first electrode 240 or 440 is not formed on the slit portion 248 or 448 or the protruding portion 249 or 449.

Since the slit portion or the protruding portion which passes through the pixel center portion and is in parallel with the pixel circumferential portion is formed on the first electrode in the liquid crystal display device according to Example 9, an electric field generated by the first electrode is deformed in the vicinity of the slit portion or the protruding portion as compared with a case in which a flat concave portion with no slit portion or protruding portion is formed on the first electrode(when the slit portion is formed), or otherwise, directions in which the liquid crystal molecules lie down are defined (when the protruding portion is formed). As a result, it is possible to enhance the orientation regulating force for the liquid crystal molecules in the vicinity of the slit portion or the protruding portion and reliably define the tilt state of the liquid crystal molecules in the vicinity of the slit portion or the protruding portion. For this reason, it is possible to reliably suppress an occurrence of a problem that a dark line is generated at a part of an image corresponding to the convex stem portion during display of the image. That is, it is possible to provide a liquid crystal display device capable of realizing further uniform high transmittance while maintaining a satisfactory voltage responsive characteristic, reduce the cost of a light source configuring a back light and power consumption, and also enhance reliability of the TFT. In addition, it is possible to employ a configuration of the protruding portion 249 or 449 in which a cross-shaped convex portion which passes through the pixel center portion is formed on the first electrode 240 or 440 so as to be surrounded by a concave portion. Such a cross-shaped convex portion can be provided by forming a cross-shaped convex portion below the first electrode 240 or 440 or can be provide by the same method as the method of forming the concave and convex portions in the first electrode 240 or 440. Alternatively, a cross-shaped concave portion which passes through the pixel center portion may be provided instead of the slit portion 248 or 448 or the protruding portion (rib) 249 or 449.

Although the above description was given of the present disclosure based on the preferred examples, the present disclosure is not limited to the examples, and various modifications can be made. The planar shape of the branched concave portion is not limited to a V shape described in the examples, and various patterns in which the branched convex portion extends in a plurality of directions, such as a stripe shape and a ladder shape, can be employed. The planar shape of the end portion of the branched convex portion when the branched convex portion is viewed as a whole may be a linear shape or a stepped shape. Furthermore, the planar shape of the end portion of each branched convex portion may be a linear shape, may be configured by a combination of line segments, or may depict a curve such as a circular arc. In addition, a black matrix may be formed such that a projected image of a part of the first substrate positioned between pixels and a projected image of the black matrix overlap each other from above the end portion of the concave and convex portion.

Although the description was given of the liquid crystal display device (liquid crystal display element) in a VA mode in the examples, the present disclosure is not necessarily limited thereto and can be applied to other display modes such as an ECB mode (horizontally oriented positive liquid crystal mode with no twist), an IPS (In Plane Switching) mode, an FFS (Fringe Field Switching) mode, and an OCB (Optically Compensated Band) mode. In such cases, the same effects can be achieved.

According to the present disclosure it is possible, however, to achieve an especially larger effect of improving a responsive characteristic in the VA mode than in the IPS mode or the FFS mode as compared with a case in which a pre-tilt treatment is not performed. In addition, although the description was mainly given of the transmission type liquid crystal display device (liquid crystal display element) in the examples, the present disclosure is not necessarily limited to the transmission type and can be applied to a reflection type, for example. In a case of the reflection type, the pixel electrode is formed of an electrode material with a light reflectivity, such as aluminum.

In addition, the present disclosure can also be configured as follows.

(1) A liquid crystal display device including: a plurality of aligned pixels, each of which includes a first substrate and a second substrate, a first electrode which is formed on a facing surface of the first substrate facing the second substrate, a first oriented film which covers the first electrode and the facing surface of the first substrate, a second electrode which is formed on a facing surface of the second substrate facing the first substrate, a second oriented film which covers the second electrode and the facing surface of the second substrate, and a liquid crystal layer which is provided between the first oriented film and the second oriented film and includes liquid crystal molecules, wherein a pre-tilt is applied to the liquid crystal molecules by at least the first oriented film, wherein a plurality of concave and convex portions are included on the first electrode, and wherein a plurality of stepped portions are formed at the convex portions included on the first electrode.

(2) The device according to (1), wherein the concave and convex portions are configured by convex stem portions which pass through a pixel center portion and extend in a cross shape and a plurality of branched convex portions which extend from the convex stem portions toward a pixel circumferential portion.

(3) The device according to (2), wherein a cross-sectional shape of each convex stem portion when the convex stem portion is cut by a virtual vertical plane which is orthogonal to an extending direction of the convex stem portion is a cross-sectional shape in which the stepped portion declines from a center portion of the cross-sectional shape of the convex stem portion toward an edge of the cross-sectional shape of the convex stem portion.

(4) The device according to any one of (2) and (3), wherein a cross-sectional shape of each convex stem portion when the convex stem portion is cut by a virtual vertical plane which is in parallel with an extending direction of the convex stem portion is a cross-sectional shape in which the stepped portion declines from a center portion of the cross-sectional shape of the convex stem portion toward an end portion of the cross-sectional shape of the convex stem portion.

(5) The device according to any one of (2) to (4), wherein a cross-sectional shape of each branched convex portion when the branched convex portion is cut by a virtual vertical plane which is orthogonal to an extending direction of the branched convex portion is a cross-sectional shape in which the stepped portion declines from a center of the cross-sectional shape of the branched convex portion toward an edge of the cross-sectional shape of the branched convex portion.

(6) The device according to any one of (2) to (5), wherein a cross-sectional shape of each branched convex portion when the branched convex portion is cut by a virtual vertical plane which is in parallel with an extending direction of the branched convex portion is a cross-sectional shape in which the stepped portion declines from the cross-sectional shape of the branched convex portion on a side of the convex stem portion toward an end portion of the cross-sectional shape of the branched convex portion.

(7) The device according to any one of (2) to (6), wherein an orientation regulating portion is formed at a part of the second electrode corresponding to the convex stem portions.

(8) The device according to (1), wherein the concave and convex portions are configured by a convex stem portion which is formed in a frame shape at a pixel circumferential portion and a plurality of branched convex portions which extend from the convex stem portion toward the inside of the pixel.

(9) The device according to (8), wherein a cross-sectional shape of the convex stem portion when the convex stem portion is cut by a virtual vertical plane which is orthogonal to an extending direction of the convex stem portion is a cross-sectional shape in which the stepped portion declines from an outer edge of the cross-sectional shape of the convex stem portion toward an inner edge of the cross-sectional shape of the convex stem portion.

(10) The device according to any one of (8) and (9), wherein a cross-sectional shape of each branched convex portion when the branched convex portion is cut by a virtual vertical plane which is orthogonal to an extending direction of the branched convex portion is a cross-sectional shape in which the stepped portion declines from a center of the cross-sectional shape of the branched convex portion toward an edge of the cross-sectional shape of the branched portion.

(11) The device according to any one of (8) to (10), wherein a cross-sectional shape of each branched convex portion when the branched convex portion is cut by a virtual vertical plane which is in parallel with an extending direction of the branched portion is a cross-sectional shape in which the stepped portion declines from the cross-sectional shape of the branched convex portion on a side of the convex stem portion toward an end portion of the cross-sectional shape of the branched convex portion.

(12) The device according to any one of (8) to (11), wherein a slit portion or a protruding portion which passes through a pixel center portion and is in parallel with the pixel circumferential portion is formed on the first electrode.

(13) The device according to any one of (2) to (12), wherein a convex structure is formed from a part of the first substrate positioned between pixels and a part of the first substrate corresponding to the pixel circumferential portion, and wherein the circumferential portion of the concave and convex portions are formed on the convex structure.

(14) A liquid crystal display device including: a plurality of aligned pixels, each of which includes a first substrate and a second substrate, a first electrode which is formed on a facing surface of the first substrate facing the second substrate, a first oriented film which covers the first electrode and the facing surface of the first substrate, a second electrode which is formed on a facing surface of the second substrate facing the first substrate, a second oriented film which covers the second electrode and the facing surface of the second substrate, and a liquid crystal layer which is provided between the first oriented film and the second oriented film and includes liquid crystal molecules, wherein a pre-tilt is applied to the liquid crystal molecules by at least the first oriented film, wherein a plurality of concave and convex portions are included on the first electrode, wherein a convex structure is formed from a part of the first substrate positioned between pixels to a part of the first substrate corresponding to a pixel circumferential portion, and wherein a circumferential portion of the concave and convex portions are formed on the convex structure.

(15) The device according to (14), wherein the concave and convex portions are configured by convex stem portions which pass through a pixel center portion and extend in a cross shape and a plurality of branched convex portions which extend from the convex stem portions toward a pixel circumferential portion.

(16) The device according to (15), wherein an orientation regulating portion is formed at a part of the second electrode corresponding to the convex stem portions.

(17) The device according to (14), wherein the concave and convex portions are configured by a convex stem portion which is formed in a frame shape at a pixel circumferential portion and a plurality of branched convex portions which extend from the convex stem portion toward the inside of the pixel.

(18) The device according to (17), wherein a slit portion or a protruding portion which passes through a pixel center portion and is in parallel with the pixel circumferential portion is formed on the first electrode.

(19) A liquid crystal display device including: a plurality of aligned pixels, each of which includes a first substrate and a second substrate, a first electrode which is formed on a facing surface of the first substrate facing the second substrate, a first oriented film which covers the first electrode and the facing surface of the first substrate, a second electrode which is formed on a facing surface of the second substrate facing the first substrate, a second oriented film which covers the second electrode and the facing surface of the second substrate, and a liquid crystal layer which is provided between the first oriented film and the second oriented film and includes liquid crystal molecules, wherein a pre-tilt is applied to the liquid crystal molecules by at least the first oriented film, wherein a plurality of concave and convex portions are included on the first electrode, wherein the concave and convex portions are configured by convex stem portions which pass through a pixel center portion and extend in a cross shape and a plurality of branched convex portions which extend from the convex stem portions toward a pixel circumferential portion, and wherein an orientation regulating portion is formed at a part of the second electrode corresponding to the convex stem portions.

(20) A liquid crystal display device including: a plurality of aligned pixels, each of which includes a first substrate and a second substrate, a first electrode which is formed on a facing surface of the first substrate facing the second substrate, a first oriented film which covers the first electrode and the facing surface of the first substrate, a second electrode which is formed on a facing surface of the second substrate facing the first substrate, a second oriented film which covers the second electrode and the facing surface of the second substrate, and a liquid crystal layer which is provided between the first oriented film and the second oriented film and includes liquid crystal molecules, wherein a pre-tilt is applied to the liquid crystal molecules by at least the first oriented film, wherein a plurality of concave and convex portions are included on the first electrode, wherein the concave and convex portions are configured by a convex stem portion which is formed in a frame shape at a pixel circumferential portion and a plurality of branched convex portions which extend from the convex stem portion toward the inside of the pixel, and wherein a slit portion or a protruding portion which passes through a pixel center portion and is in parallel with the pixel circumferential portion is formed on the first electrode.

(21) A liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate, wherein at least one of the convex portions includes a plurality of stepped portions.

(22) The liquid crystal display device according to (21), wherein the plurality of convex and concave portions includes convex stem portions that pass a pixel center portion and extend in a cross shape and a plurality of branched convex portions that extend from the convex stem portions toward a pixel circumferential portion.

(23) The liquid crystal display device according to (22), wherein the plurality of stepped portions are provided at the convex stem portions, each of the plurality of stepped portions comprising a first surface positioned at a center portion of one of the convex stem portions, a second surface positioned on both sides of the first surface, and a third surface positioned outside the second surface, and wherein a height of the first surface is greater than a height of the second surface, and a height of the second surface is greater than a height of the third surface.

(24) The liquid crystal display device according to (22), wherein the plurality of stepped portions are provided at the branched convex portions, each of the plurality of stepped portions comprising a first surface extending from one of the convex stem portions and a second surface positioned on both sides of the first surface, and wherein a height of the first surface is greater than a height of the second surface.

(25) The liquid crystal display device according to (24), wherein each of the plurality of stepped portions declines from a side of one of the convex stem portions toward an end portion of one of the branched convex portions.

(26) The liquid crystal display device according to (21), wherein the convex and concave portions comprise a convex stem portion formed in a frame shape at a pixel circumferential portion and a plurality of branched convex portions that extend from the convex stem portion toward the inside of a pixel.

(27) The liquid crystal display device according to (26), wherein the convex stem portion comprises a first surface located at an outer edge of the convex stem portion, a third surface located at an inner edge of the convex stem portion, and a second surface located between the first and third surfaces, and wherein a height of the first surface is greater than a height of the second surface, and a height of the second surface is greater than a height of the third surface.

(28) The liquid crystal display device according to (26), wherein each of the branched convex portions comprises a first surface that extends from a surface of the convex stem portion, and a second surface positioned on both sides of the first surface, and wherein a height of the first surface is greater than a height of the second surface.

(29) A liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate,
wherein a convex structure is formed from a part of the first substrate positioned between pixels to a part of the first substrate corresponding to a pixel circumferential portion, and
wherein a circumferential portion of the concave and convex portions is formed on the convex structure.

(30) The liquid crystal display device according to (29), wherein the convex structure comprises a black matrix formed on a color filter layer.

(31) The liquid crystal display device according to (29), wherein the plurality of convex and concave portions includes convex stem portions that pass a pixel center portion and extend in a cross shape, wherein a plurality of stepped portions are provided at the convex stem portions, each of the plurality of stepped portions comprising a first surface positioned at a center portion of one of the convex stem portions and a second surface positioned on both sides of the first surface, and wherein a height of the first surface is greater than a height of the second surface.

(32) A liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate,
wherein the convex and concave portions are configured by convex stem portions that pass through a pixel center portion and extend in a cross shape and a plurality of branched convex portions that extend from the convex stem portions toward a pixel circumferential portion, and wherein an orientation regulating portion is formed at a part of the second electrode corresponding to the convex stem portions.

(33) The liquid crystal display device according to (32), wherein the orientation regulating portion comprises a slit provided at the second electrode.

(34) The liquid crystal display device according to (32), wherein the orientation regulating portion comprises a protrusion provided at the second electrode.

(35) A liquid crystal display device comprising: a first substrate; a second substrate; a first electrode formed on a first surface of the first substrate, the first surface facing the second substrate, the first electrode including a plurality of convex and concave portions; a first oriented film formed on the first surface of the first substrate; a second electrode formed on a second surface of the second substrate, the second surface facing the first substrate; and a liquid crystal layer provided between the first substrate and the second substrate, wherein the convex and concave portions are configured by a convex stem portion that is formed in a frame shape at a pixel circumferential portion and a plurality of branched convex portions that extend from the convex stem portion toward the inside of a pixel, wherein at least one of a slit portion and a protruding portion is formed on the first electrode, and wherein the at least one of a slit portion and a protruding portion passes through a pixel center portion and is in parallel with the pixel circumferential portion.

(36) The liquid crystal display device according to (35), wherein the slit portion is formed on the first electrode, passes through a pixel center portion and is in parallel with the pixel circumferential portion.

(37) The liquid crystal display device according to (35), wherein the protruding portion is formed on the first electrode, passes through a pixel center portion and is in parallel with the pixel circumferential portion.

(38) A method of manufacturing a liquid crystal display device comprising: forming a first oriented film on a first electrode, the first electrode formed on a first surface of a first substrate; forming a second oriented film on a second electrode, the second electrode formed on a second surface of a second substrate, the second oriented film facing the first oriented film; sealing a liquid crystal layer between the first and second oriented films; applying a voltage between the first and second electrodes; and irradiating the first and second oriented films with an ultraviolet ray while applying the voltage.

(39) The method according to (38), comprising performing a heat treatment on each of the first and second oriented films.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 10, 10A, 10B, 10C: pixel
20: first substrate
21: first oriented film
22: flattened film
23: color filter layer
30: TFT layer
31: gate electrode
32: gate insulating layer
33: semiconductor layer (channel formation region)
34: source/drain electrodes
35: connection hole
50: second substrate
51: second oriented film
70: liquid crystal layer
71A, 71B, 71C: liquid crystal molecules
80: display region
81: source driver
82: gate driver
83: timing controller
84: power circuit
91: source line
92: gate line
93: TFT
94: capacitor
140, 240, 340, 440: first electrode
140A: first transparent conductive material layer
140B: second transparent conductive material layer
141, 241, 341, 441: concave and convex portion
141A, 341A: circumferential portion of concave and convex portion
142, 242: convex portion
143, 243, 443: convex stem portion (main convex portion)
143A, 143B, 143C, 243A, 243B: top surface of convex stem portion
144, 244, 444: branched convex portion (sub convex portion)
144A, 144B, 244A, 244B: top surface of branched convex portion
145, 245: concave portion
146, 246: part of first substrate positioned between pixels
147: convex structure
147A: black matrix
160: second electrode
161: orientation regulating portion
162: slit portion
163: protruding portion (rib)
248, 448: slit portion
249, 449: protruding portion (rib)

The invention claimed is:

1. A liquid crystal display device comprising:
   a first substrate;
   a second substrate;
   a first electrode provided on a first surface of the first substrate, the first surface facing the second substrate, the first electrode including a plurality of convex and concave portions;
   a second electrode provided on a second surface of the second substrate; and
   a liquid crystal layer provided between the first substrate and the second substrate,
   wherein at least one of the convex portions includes a plurality of stepped portions,
   wherein the stepped portions are provided at the convex stem portions, each of the plurality of stepped portions including a first surface at a center portion of one of the convex stem portions, a second surface on the first surface, and a third surface outside the second surface, and wherein the first surface is higher than the second surface, and the second surface is higher than of the third surface.

2. The liquid crystal display device according to claim 1, wherein the convex and concave portions includes a plurality of branched convex portions that extend from the convex stem portions toward a pixel circumferential portion.

3. The liquid crystal display device according to claim 1, wherein the plurality of stepped portions are provided at the branched convex portions, each of the plurality of stepped portions comprising a first surface extending from one of the convex stem portions and a second surface positioned on both sides of the first surface, and wherein a height of the first surface is greater than a height of the second surface.

4. The liquid crystal display device according to claim 3, wherein each of the plurality of stepped portions declines from a side of one of the convex stem portions toward an end portion of one of the branched convex portions.

5. The liquid crystal display device according to claim 1, wherein the convex and concave portions include a convex stem portion formed in a frame shape at a pixel circumferential portion and a plurality of branched convex portions that extend from the convex stem portion toward the inside of a pixel.

6. The liquid crystal display device according to claim 5, wherein the convex stem portion includes a first surface at an outer edge of the convex stem portion, a third surface at an inner edge of the convex stem portion, and a second surface located between the first and third surfaces, and wherein the first surface is higher than the second surface, and the second surface is higher than the third surface.

7. The liquid crystal display device according to claim 5, wherein each of the branched convex portions includes a first surface that extends from a surface of the convex stem portion, and a second surface on both sides of the first surface, and wherein the first surface is higher than the second surface.

8. The liquid crystal display device according to claim 1, further comprising an oriented film provided on the first surface of the first substrate.

9. A liquid crystal display device comprising:
a first substrate;
a second substrate;
a first electrode provided on a first surface of the first substrate, the first surface facing the second substrate, the first electrode including a plurality of convex and concave portions;
a second electrode provided on a second surface of the second substrate; and
a liquid crystal layer provided between the first substrate and the second substrate,
wherein a convex structure is provided from a part of the first substrate positioned between pixels to a part of the first substrate corresponding to a pixel circumferential portion,
wherein a circumferential portion of the concave and convex portions is provided on the convex structure,
wherein the convex structure includes a black matrix on a color filter layer; and
wherein the convex and concave portions include convex stem portions, and wherein a plurality of stepped portions are provided at the convex stem portions, and wherein each of the stepped portions including a first surface at a center portion of one of the convex stem portions and a second surface on the first surface, and wherein the first surface is higher than the second surface.

* * * * *